United States Patent
Samadani

(10) Patent No.: US 11,263,393 B1
(45) Date of Patent: *Mar. 1, 2022

(54) METHOD AND APPARATUS FOR STRUCTURED DOCUMENTS

(71) Applicant: Mehrdad Samadani, San Jose, CA (US)

(72) Inventor: Mehrdad Samadani, San Jose, CA (US)

(*) Notice: Subject to any disclaimer, the term of this patent is extended or adjusted under 35 U.S.C. 154(b) by 164 days.

This patent is subject to a terminal disclaimer.

(21) Appl. No.: 15/981,620

(22) Filed: May 16, 2018

Related U.S. Application Data

(63) Continuation of application No. 14/492,034, filed on Sep. 21, 2014, now Pat. No. 9,977,772.
(Continued)

(51) Int. Cl.
| | | |
|---|---|---|
| *G06F 40/18* | (2020.01) | |
| *G06F 3/0481* | (2013.01) | |
| *G06F 3/0486* | (2013.01) | |
| *G06F 40/103* | (2020.01) | |
| *G06F 40/137* | (2020.01) | |
| *G06F 40/151* | (2020.01) | |
| *G06F 40/166* | (2020.01) | |
| *G06F 40/189* | (2020.01) | |
| *G06F 3/0488* | (2013.01) | |
| *G06F 40/10* | (2020.01) | |
| *G06F 3/04883* | (2022.01) | |

(52) U.S. Cl.
CPC ............ *G06F 40/18* (2020.01); *G06F 3/0481* (2013.01); *G06F 3/0486* (2013.01); *G06F 3/04883* (2013.01); *G06F 40/10* (2020.01); *G06F 40/103* (2020.01); *G06F 40/137* (2020.01); *G06F 40/151* (2020.01); *G06F 40/166* (2020.01); *G06F 40/189* (2020.01)

(58) Field of Classification Search
CPC ........ G06F 17/24; G06F 17/246; G06F 17/21; G06F 17/211; G06F 17/212; G06F 17/2229; G06F 17/2241; G06F 17/245; G06F 3/0481; G06F 3/0489; G06F 3/04883; G06F 40/18; G06F 40/137; G06F 40/166; G06F 40/10; G06F 40/189; G06F 40/151; G06F 3/0486
See application file for complete search history.

(56) References Cited

U.S. PATENT DOCUMENTS

| | | | | |
|---|---|---|---|---|
| 5,442,742 A | * | 8/1995 | Greyson | ............... G06F 40/166 715/210 |
| 5,544,305 A | | 8/1996 | Ohmaye | |

(Continued)

OTHER PUBLICATIONS

Davies, S. et al., "Building the Memex Sixty Years Later: Trends and Directions in Personal Knowledge Bases," Technical Report CU-CS-997-05, Department of Computer Science, University of Colorado at Boulder, Aug. 2005 (59 pages).

*Primary Examiner* — Thu V Huynh
(74) *Attorney, Agent, or Firm* — Nixon Peabody LLP

(57) ABSTRACT

Methods and systems for organizing information in a grid. Aspects of this grid may be easily manipulated via user interface operations. This grid may be easily manipulated to create or edit a hierarchy. Grid elements may be expanded or collapsed alternatively to show or hide hidden elements. A canvas may contain objects that may be easily moved and/or repositioned via user interface operations.

15 Claims, 64 Drawing Sheets

```
+ Last year              XYZ Corp. launched XYZ Tool Shed 2.0
- Today                  XYZ Corp. announced new tools and resources
   + For                 Developers
   + Developer's Toolkit
   - XYZ Tool Shed 2.0   New features          ← 1904
      - Ability          upload new storefronts
      For               Small- and medium-sized businesses
      + Ability          Run stress tests on backend data servers
                                              1906      1902
  More info and to sign up  XYZ Tool Shed 2.0
+ UPDATE                 Sold out around 11:30 AM EST
```

Related U.S. Application Data

(60) Provisional application No. 61/919,688, filed on Dec. 20, 2013, provisional application No. 61/881,450, filed on Sep. 24, 2013.

(56) References Cited

U.S. PATENT DOCUMENTS

| | | | |
|---|---|---|---|
| 5,760,773 A | 6/1998 | Berman | |
| 5,881,381 A * | 3/1999 | Yamashita | G06F 17/246 715/209 |
| 6,292,810 B1 * | 9/2001 | Richards | G06F 17/246 707/999.1 |
| 6,525,749 B1 * | 2/2003 | Moran | G06F 3/04883 715/863 |
| 6,526,399 B1 * | 2/2003 | Coulson | G06F 17/246 |
| 6,606,105 B1 | 8/2003 | Quartetti | |
| 6,829,744 B1 * | 12/2004 | Kizaki | G06F 40/103 715/223 |
| 7,797,621 B1 * | 9/2010 | Danner | G06F 40/18 715/220 |
| 9,736,218 B2 * | 8/2017 | Brown | H04L 67/06 |
| 2003/0159128 A1 * | 8/2003 | Kunzler | G06F 8/20 717/109 |
| 2003/0182621 A1 | 9/2003 | Mazza | |
| 2003/0197729 A1 * | 10/2003 | Denoue | G06Q 10/10 715/751 |
| 2005/0022111 A1 * | 1/2005 | Collet | G06F 17/211 715/205 |
| 2006/0117051 A1 * | 6/2006 | Chin | G06F 17/245 |
| 2006/0212790 A1 | 9/2006 | Perantatos | |
| 2007/0050697 A1 | 3/2007 | Lewis-Bowen | |
| 2007/0300159 A1 * | 12/2007 | Kordun | G06Q 10/10 715/733 |
| 2009/0024942 A1 * | 1/2009 | Pendergast | G06F 3/1204 715/764 |
| 2010/0251093 A1 * | 9/2010 | Broman | G06F 40/166 715/227 |
| 2010/0325173 A1 * | 12/2010 | Haley | G06F 16/288 707/804 |
| 2012/0192047 A1 * | 7/2012 | Slatter | G06F 40/186 715/202 |
| 2013/0055077 A1 * | 2/2013 | Hagel-Sorensen | G06F 3/0482 715/273 |
| 2014/0164896 A1 * | 6/2014 | Schlereth | G06F 17/246 715/217 |

* cited by examiner

Last year, XYZ Corp. launched XYZ Tool Shed 2.0 to enable developers on both desktop and mobile platforms to make the most of the next generation of web technologies when developing projects. Today, XYZ Corp. has announced new tools and resources to help developers test their software on multiple platforms at once.

To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

XYZ Corp. notes that there is a "limited supply" of the Developer's Toolkit USB sticks that provide the free tools and resources. As company is aware that "there's a big demand from startups looking to save on costs to purchase software and licensing," these kits will likely go fast. UPDATE: And they did go fast. XYZ Corp. just tweeted that the kits sold out around 11:30am EST, noting "we'll try to make similar offers available in the near future."

If you're a developer looking to get your hands on XYZ Corp.'s new tools and resources, visit XYZ Tool Shed 2.0 for more info and to sign up.

FIG. 1

```
+ Last year              XYZ Corp. launched XYZ Tool Shed 2.0
− Today                  XYZ Corp. announced new tools and resources
   + For                 Developers
   − Developer's Toolkit
      + Free             Limited supply − will go fast
        Delivered        Via USB stick
   + XYZ Tool Shed 2.0   New features More info and to sign up   XYZ Tool Shed 2.0
+ UPDATE                 Sold out around 11:30 AM EST
```

FIG. 2C

```
+ Last year              XYZ Corp. launched XYZ Tool Shed 2.0
− Today                  XYZ Corp. announced new tools and resources
   + For                 Developers
   + Developer's Toolkit
   − XYZ Tool Shed 2.0   New features
      − Ability          upload new storefronts
        For              Small- and medium-sized businesses
      + Ability          Run stress tests on backend data servers More info and to sign up   XYZ Tool Shed 2.0
+ UPDATE                 Sold out around 11:30 AM EST
```

FIG. 2D

| | | |
|---|---|---|
| + Last year | XYZ Corp. launched XYZ Tool Shed 2.0 | |
| − Today | XYZ Corp. announced new tools and resources | |
|   + For | Developers | |
|   + Developer's Toolkit | | ⎫ |
|   − XYZ Tool Shed 2.0 | New features | ⎬ 810 |
|     − Ability | upload new storefronts | ⎭ |
|       For | Small- and medium-sized businesses | |
|     + Ability | Run stress tests on backend data servers | |
| | | |
| More info and to sign up | XYZ Tool Shed 2.0 | 812 |
| + UPDATE | Sold out around 11:30 AM EST | |

```
For                  Developers
Developer's Toolkit
XYZ Tool Shed 2.0    New features
Ability              upload new storefronts
```

FIG. 8C

| | |
|---|---|
| + Last year | XYZ Corp. launched XYZ Tool Shed 2.0 |
| − Today | XYZ Corp. announced new tools and resources |
|    + For | Developers |
|      New features | ← 912 |
|    + Developer's Toolkit | |
|    − XYZ Tool Shed 2.0 | |
|      − Ability | upload new storefronts |
|        For | Small- and medium-sized businesses |
|      + Ability | Run stress tests on backend data servers |
| More info and to sign up | XYZ Tool Shed 2.0 |
| + UPDATE | Sold out around 11:30 AM EST |

FIG. 9C

```
           + Last year              XYZ Corp. launched XYZ Tool Shed 2.0
           − Today                  XYZ Corp. announced new tools and resources
              + For                 Developers
1304          + Developer's Toolkit
              − XYZ Tool Shed 2.0   ┌ New features ─────────────────┐
                 − Ability          │ upload new storefronts        │
                    For             └ Small- and medium-sized businesses
                 + Ability          Run stress tests on backend data servers   1302

More info and to sign up   XYZ Tool Shed 2.0
           + UPDATE                     Sold out around 11:30 AM EST
```

FIG. 13A

```
           + Last year              XYZ Corp. launched XYZ Tool Shed 2.0
           − Today                  XYZ Corp. announced new tools and resources
              + For                 Developers
1314          + Developer's Toolkit                              1316
              − XYZ Tool Shed 2.0
                 − Ability          upload new storefronts
                    For             Small- and medium-sized businesses
1312             + Ability          Run stress tests on backend data servers
                 ┌ New features ┐
                 └──────────────┘   1318

More info and to sign up   XYZ Tool Shed 2.0
           + UPDATE                     Sold out around 11:30 AM EST
```

FIG. 13B

| | |
|---|---|
| + Last year | XYZ Corp. launched <u>XYZ Tool Shed 2.0</u> |
| − Today | XYZ Corp. announced new tools and resources |
|   + For | Developers |
|   + Developer's Toolkit | |
|   − XYZ Tool Shed 2.0 | |
|     − Ability | upload new storefronts |
|       For | Small- and medium-sized businesses |
|     + Ability | Run stress tests on backend data servers |
| | ⌐ New features ¬    1322 |
| More info and to sign up | <u>XYZ Tool Shed 2.0</u> |
| + UPDATE | Sold out around 11:30 AM EST |

FIG. 13C

```
+ Last year              XYZ Corp. launched XYZ Tool Shed 2.0
– Today                  XYZ Corp. announced new tools and resources
  + For                  Developers
  + Developer's Toolkit                        ┌─ 1404
  – XYZ Tool Shed 2.0    New features ◄──┘
    – Ability            upload new storefronts
       For               ┆ Small- and medium-sized businesses ┆
    + Ability            Run stress tests on backend data servers
                                                              ↖
  More info and to sign up   XYZ Tool Shed 2.0                  1402
+ UPDATE                 Sold out around 11:30 AM EST
```

FIG.14A

```
+ Last year              XYZ Corp. launched XYZ Tool Shed 2.0
– Today                  XYZ Corp. announced new tools and resources
  + For                  Developers
  + Developer's Toolkit
  – XYZ Tool Shed 2.0    ┆ New features Small- and medium-sized businesses ┆
    – Ability            upload new storefronts
       For                                    ┌─ 1412
    + Ability            Run stress tests on backend data servers   1414

More info and to sign up   XYZ Tool Shed 2.0
+ UPDATE                 Sold out around 11:30 AM EST
```

FIG.14B

```
+ Last year              XYZ Corp. launched XYZ Tool Shed 2.0
– Today                  XYZ Corp. announced new tools and resources
   + For                 Developers      1424
   + Developer's Toolkit                ⤸
   – XYZ Tool Shed 2.0   New features Small- and medium-sized businesses
      – Ability          upload new storefronts
1422 ⤳ ┊For      ┊
      + Ability          Run stress tests on backend data servers More info and to sign up   XYZ Tool Shed 2.0
+ UPDATE                 Sold out around 11:30 AM EST
```

FIG.14C

```
+ Last year              XYZ Corp. launched XYZ Tool Shed 2.0
– Today                  XYZ Corp. announced new tools and resources
   + For                 Developers      1434
   + Developer's Toolkit                ⤸
   – XYZ Tool Shed 2.0   ┊New features For Small- and medium-sized businesses┊
      – Ability          upload new storefronts
1432 ⤳
      + Ability          Run stress tests on backend data servers More info and to sign up   XYZ Tool Shed 2.0
+ UPDATE                 Sold out around 11:30 AM EST
```

FIG.14D

```
+ Last year              XYZ Corp. launched XYZ Tool Shed 2.0
− Today                  XYZ Corp. announced new tools and resources
   + For                 Developers
   + Developer's Toolkit
   − XYZ Tool Shed 2.0   New features              ⟵ 1504
      − Ability          upload new storefronts
         For             Small- and medium-sized businesses
      + Ability          Run stress tests on backend data servers
                                                              1502
   More info and to sign up   XYZ Tool Shed 2.0
+ UPDATE                 Sold out around 11:30 AM EST
```

FIG.15A

```
+ Last year              XYZ Corp. launched XYZ Tool Shed 2.0
− Today                  XYZ Corp. announced new tools and resources
   + For                 Developers                            1514
   + Developer's Toolkit
   − XYZ Tool Shed 2.0   New features For Small- and medium-sized businesses
      − Ability          upload new storefronts
                                                              1512
      + Ability          Run stress tests on backend data servers More info and to sign up   XYZ Tool Shed 2.0
+ UPDATE                 Sold out around 11:30 AM EST
```

FIG.15B

| | |
|---|---|
| + Last year | XYZ Corp. launched XYZ Tool Shed 2.0 |
| – Today | XYZ Corp. announced new tools and resources |
|   + For | Developers |
| | New ← 1822 |
| + Developer's Toolkit | |
| – XYZ Tool Shed 2.0 | features |
|   – Ability | upload new storefronts |
|     For | Small- and medium-sized businesses |
|   + Ability | Run stress tests on backend data servers |
| More info and to sign up | XYZ Tool Shed 2.0 |
| + UPDATE | Sold out around 11:30 AM EST |

Last year, XYZ Corp. launched XYZ Tool Shed 2.0 to enable developers on both desktop and mobile platforms to make the most of the next generation of web technologies when developing projects. Today, XYZ Corp. has announced new tools and resources to help developers test their software on multiple platforms at once.

To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

XYZ Corp. notes that there is a "limited supply" of the Developer's Toolkit USB sticks that provide the free tools and resources. As company is aware that "there's a big demand from startups looking to save on costs to purchase software and licensing," these kits will likely go fast. UPDATE: And they did go fast. XYZ Corp. just tweeted that the kits sold out around 11:30am EST, noting "we'll try to make similar offers available in the near future."

If you're a developer looking to get your hands on XYZ Corp.'s new tools and resources, visit XYZ Tool Shed 2.0 for more info and to sign up.

Last year, [          ] to enable developers on both desktop and mobile platforms to make the most of the next generation of web technologies when developing projects. Today, XYZ Corp. has announced new tools and resources to help developers test their software on multiple platforms at once.

To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

XYZ Corp. notes that there is a "limited supply" of the Developer's Toolkit USB sticks that provide the free tools and resources. As company is aware that "there's a big demand from startups looking to save on costs to purchase software and licensing," these kits will likely go fast. UPDATE: And they did go fast. XYZ Corp. just tweeted that the kits sold out around 11:30am EST, noting "we'll try to make similar offers available in the near future."

If you're a developer looking to get your hands on XYZ Corp.'s new tools and resources, visit XYZ Tool Shed 2.0 for more info and to sign up.

2012　　2002　　2000

XYZ Corp. launched XYZ Tool Shed 2.0

FIG. 20B

, to enable developers on both desktop and mobile platforms to make the most of the next generation of web technologies when developing projects.  , XYZ Corp. has  to help developers test their software on multiple platforms at once.

To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

XYZ Corp. notes that there is a "limited supply" of the Developer's Toolkit USB sticks that provide the free tools and resources. As company is aware that "there's a big demand from startups looking to save on costs to purchase software and licensing," these kits will likely go fast.  : And they did go fast. XYZ Corp. just tweeted that the kits , noting "we'll try to make similar offers available in the near future."

If you're a developer looking to get your hands on XYZ Corp.'s new tools and resources, visit XYZ Tool Shed 2.0 for

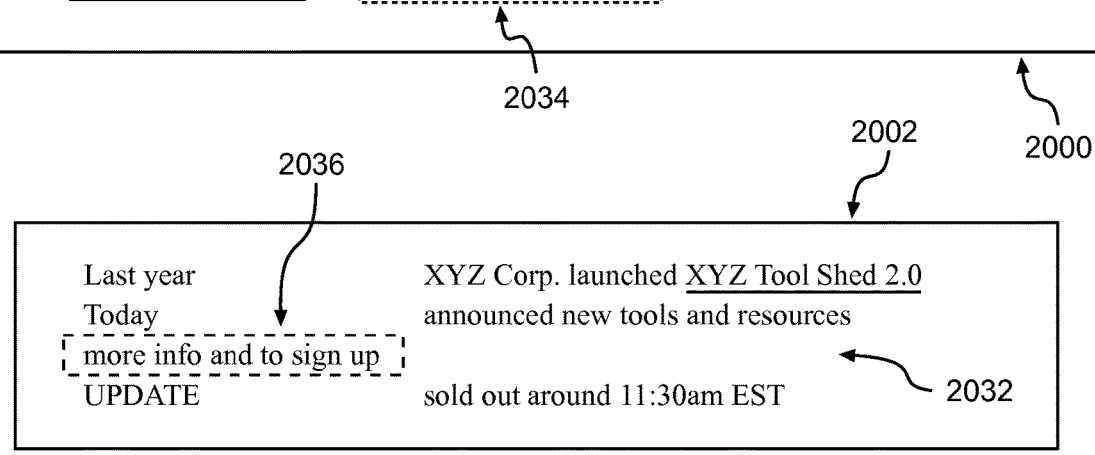

Last year        XYZ Corp. launched XYZ Tool Shed 2.0
Today        announced new tools and resources
more info and to sign up
UPDATE        sold out around 11:30am EST

, to enable developers on both desktop and mobile platforms to make the most of the next generation of web technologies when developing projects. [    ] has to help developers test their software on multiple platforms at once.

To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

XYZ Corp. notes that there is a "limited supply" of the Developer's Toolkit USB sticks that provide the free tools and resources. As company is aware that "there's a big demand from startups looking to save on costs to purchase software and licensing," these kits will likely go fast.          : And they did go fast. XYZ Corp. just tweeted that the kits          , noting "we'll try to make similar offers available in the near future."

If you're a developer looking to get your hands on XYZ Corp.'s new tools and resources, visit                  for 2002
2000

| Last year | XYZ Corp. launched XYZ Tool Shed 2.0 |
| Today | XYZ Corp. announced new tools and resources |
| more info and to sign up | XYZ Tool Shed 2.0 |
| UPDATE | sold out around 11:30am EST |

| | |
|---|---|
| + Last year | XYZ Corp. launched XYZ Tool Shed 2.0 |
| − Today | XYZ Corp. announced new tools and resources |
|   + For | Developers |
|   + Developer's Toolkit | |
|   − XYZ Tool Shed 2.0 | New features     ⟵ 2122 |
|     − Ability | upload |
| 2124 ⟶ [new storefronts] | |
|     For | Small- and medium-sized businesses |
|   + Ability | Run stress tests on backend data servers |
| More info and to sign up | XYZ Tool Shed 2.0 |
| + UPDATE | Sold out around 11:30 AM EST |

FIG. 21C

```
+ Last year              XYZ Corp. launched XYZ Tool Shed 2.0
– Today                  XYZ Corp. announced new tools and resources
   + For                 Developers
   + Developer's Toolkit
   – XYZ Tool Shed 2.0   New features        2204              2202
2206   – Ability         upload new storefronts
       ↳ For             Small- and medium-sized businesses
       + Ability         Run stress tests on backend data servers More info and to sign up   XYZ Tool Shed 2.0
+ UPDATE                 Sold out around 11:30 AM EST
```

FIG. 22A

```
+ Last year              XYZ Corp. launched XYZ Tool Shed 2.0
– Today                  XYZ Corp. announced new tools and resources
   + For                 Developers
   + Developer's Toolkit
   – XYZ Tool Shed 2.0   New features                          2218
2214   – Ability         upload new storefronts    2216
       ↳ For             Small-
                         and medium-sized businesses
2212   + Ability         Run stress tests on backend data servers More info and to sign up   XYZ Tool Shed 2.0
+ UPDATE                 Sold out around 11:30 AM EST
```

FIG. 22B

```
+ Last year              XYZ Corp. launched XYZ Tool Shed 2.0
- Today                  XYZ Corp. announced new tools and resources
    + For                Developers
    + Developer's Toolkit
    - XYZ Tool Shed 2.0  New features
        - Ability        upload new storefronts
            For          Small- and medium-sized businesses
        + Ability        Run stress tests on backend data servers
                                                                    2302

More info and to sign up  XYZ Tool Shed 2.0
+ UPDATE                    Sold out around 11:30 AM EST
```

Last year, XYZ Corp. launched XYZ Tool Shed 2.0 to enable developers on both desktop and mobile platforms to make the most of the next generation of web technologies when developing projects. Today, XYZ Corp. has announced new tools and resources to help developers test their software on multiple platforms at once.

OK   CANCEL

– Last year, XYZ Corp. launched XYZ Tool Shed 2.0 to enable d...
    Last
    year,
    XYZ
    Corp.
    launched ← 2632
    XYZ Tool Shed 2.0
    to
    enable
    developers
    on
    both
    desktop
    and

FIG. 26D

– Last year, XYZ Corp. launched XYZ Tool Shed 2.0 to enable d...
    Last
    year,
    XYZ Corp. launched XYZ Tool Shed 2.0 ← 2644
    } 2646 ← 2642
    to
    enable
    developers
    on
    both
    desktop
    and

FIG. 26E

| 1:<A,1> | 2:<B,1> | 3:<B,2> | 4:<C,1> | 5:<C,3> |

| 1:<B,1> | 2:<A,2> | 3:<A,1> | 4:<C,2> | 5:<B,2> | 6:<A,4> |

METHOD AND APPARATUS FOR STRUCTURED DOCUMENTS

CROSS REFERENCED TO RELATED APPLICATION

This application is a continuation of U.S. patent application Ser. No. 14/492,034 entitled "Method And Apparatus For Structured Documents" and filed 21 Sep. 2014, which claims priority to U.S. Provisional Application No. 61/881,450, entitled "Method And Apparatus For Structured Documents", filed 24 Sep. 2013, and U.S. Provisional Application No. 61/919,688, entitled "Method and Apparatus For Structured Documents", filed 20 Dec. 2013, the entire disclosures of all of which are hereby incorporated by reference.

TECHNICAL FIELD

This subject matter relates generally to apparatus, processes, and systems for implementing structured documents.

BACKGROUND

A text document is a flat, sequential structure. It requires that ideas, with all their parts and interrelationships, be woven into a linear thread and packed onto the flat surface of the medium. The author has to lay out scraps of information in a sequential mosaic, while the reader must parse the structure out of the page and visualize in his own mind the author's meaning. The connection between the author and the reader is through a wall of text with little transparency as to any structure or relationship among the ideas.

Prior art systems have employed various means to represent and organize unstructured textual information. Certain note-taking applications blend long-form text with the ability to spatially arrange snippets of text on a two-dimensional canvas. Others group snippets of text into categories which can be searched in various ways. Concept- and cognitive-mapping tools typically eschew long-form text in favor of a graphical representation of information; they model knowledge as a web of simple concepts connected via links. Outliners are a class of note-taking applications that enable the organization of information in hierarchies.

Some outliners allow items to have typed attributes, displayed in columns, giving the effect of a hierarchical table. Spreadsheets may provide means to group rows and columns to form quasi-hierarchical structures that may be collapsed/expanded to hide/show the rows and columns. Certain word processing applications provide tables or grids that may be used to organize textual information.

Certain note-taking and information management tools provide means to link various information items. In various systems relying on flat files as a storage mechanism, links may be created among items residing in the same file. Links across file boundaries are typically implemented via the familiar hyperlink mechanism. Tools relying on a relational database backend may allow semantic links among two or more objects stored anywhere in the database.

BRIEF SUMMARY

In accordance with one embodiment a structured document comprises a method and apparatus for organizing information in a hierarchical grid rather than weaving it into a linear narrative. Various additional embodiments, including additions and modifications to the above embodiments, are described herein.

In accordance with one embodiment, the present invention comprises a method of making a structured text processor by executing a text processor application program which has been stored in a general purpose digital computer system's memory, to impart text processing functionality to the general purpose digital computer system by changing the state of one or more central processing units within the computer system when a set of program instructions of the text processor application program are executed, thereby changing the visual state of a graphical user interface that is in communication with the computer system, wherein the program instructions comprise: storing within the memory a data structure D representing four or more rows, each row comprising a representation of a sequence of two or more cells, each cell comprising a sequence of zero or more characters representing human-readable text, wherein each row is one or both of the following: (a) a parent row, and/or (b) a child row; wherein, for each child row, the data structure comprises a digital representation of one or more parent-child associations from a parent row to a child row; wherein the four or more rows represented within the data structure comprise a first parent row, a second parent row, a first child row, and a second child row; wherein the parent-child associations comprise an association from the first parent row to the first child row, and an association from the first child row to the second child row; and wherein the rows are visibly represented on the graphical user interface as a sequence of visual cells, one or more cells displaying all or part of the sequence of characters representing the human-readable text; and changing the memory such that the digital representation of the association from the first parent row to the first child row is replaced by a digital representation of an association from the second parent row to the first child row, wherein the step is performed in response to a user input signal comprising a user input signal selected from the group consisting of: (a) dragging a visual representation of the first child row from one location to another on the graphical user interface; and (b) selecting via a gesture or a pointing device an area on the graphical user interface; and (c) pressing a simultaneous combination of one or more keys, buttons, or switches on a user input device; and wherein, as a result of the step, the parent-child association from the first child row to the second child row is maintained; and changing the memory such that data structure D is modified (modification M1), wherein, after the modification, the data structure comprises a representation of a sequence of cells for a target row comprising a cell X comprising a sequence S' of zero or more characters; and wherein, prior to the modification, either (i) the data structure does not comprise a representation of X, or (ii) X comprises a sequence S of zero or more characters, wherein S is different from S'; and wherein the step is performed in response to a user input signal comprising a user input signal selected from the group consisting of: (a) dragging a visual representation of a sequence W1 of one or more characters from one location to another on the graphical user interface, wherein W1 is a subsequence selected from the sequence of characters in a cell Z1, wherein Z1 is different from X; and (b) dragging a visual representation of a cell from one location to another on the graphical user interface.

In accordance with one embodiment, the present invention comprises a method of making a structured text processor by executing a text processor application program which has been stored in a general purpose digital computer system's memory, to impart text processing functionality to the general purpose digital computer system by changing the state of one or more central processing units within the computer system when a set of program instructions of the text processor application program are executed, thereby changing the visual state of a graphical user interface that is in communication with the computer system, wherein the program instructions comprise: storing within the memory a data structure D representing three or more rows, each row comprising a representation of a sequence of two or more cells, each cell comprising a sequence of zero or more characters representing human-readable text, wherein the rows are visibly represented on the graphical user interface as a sequence of visual cells, one or more cells displaying all or part of the sequence of characters representing the human-readable text, wherein the three or more rows represented within the data structure comprise a row R1, a row R2, and a row R3; and hiding R3 such that its visual representation is not displayed on the graphical user interface, and R1 and R2 are visibly represented on the graphical user interface as being adjacent to each other; and displaying on the graphical user interface a visual element that, when selected, will cause the visual representation of R3 to be displayed on the graphical user interface such that the visual representations for R1 and R2 are no longer adjacent on the graphical user interface, and are separated from one another by the visual representation of R3; and changing the memory such that data structure D is modified (modification M2), wherein, after the modification, the data structure comprises a representation of a sequence of cells for a target row comprising a cell Y comprising a sequence T' of zero or more characters; and wherein, prior to the modification, either (i) the data structure does not comprise a representation of Y, or (ii) Y comprises a sequence T of zero or more characters, wherein T is different from T'; and wherein the step is performed in response to a user input signal comprising dragging a visual representation of a sequence W of one or more characters from one location to another on the graphical user interface, wherein W is a subsequence selected from the sequence of characters in a cell Z, wherein Z is different from Y.

In accordance with one embodiment, the present invention comprises a method of making a structured text processor by executing a text processor application program which has been stored in a general purpose digital computer system's memory, to impart text processing functionality to the general purpose digital computer system by changing the state of one or more central processing units within the computer system when a set of program instructions of the text processor application program are executed, thereby changing the visual state of a graphical user interface that is in communication with the computer system, wherein the program instructions comprise: storing within the memory a data structure D representing three or more rows, each row comprising a representation of a sequence of two or more cells, each cell comprising a sequence of zero or more characters representing human-readable text, wherein the rows are visibly represented on the graphical user interface as a sequence of visual cells, one or more cells displaying all or part of the sequence of characters representing the human-readable text; and changing the memory such that data structure D is modified (modification M1), wherein, after the modification, the data structure comprises a representation of a sequence of cells for a target row comprising a cell X comprising a sequence S' of zero or more characters; and wherein, prior to the modification, either (i) the data structure does not comprise a representation of X, or (ii) X comprises a sequence S of zero or more characters, wherein S is different from S'; and wherein, prior to the modification, the three or more rows represented within data structure D comprise a row P1 and a row P2; and wherein, prior to the modification, P1 and P2 are visibly represented on the graphical user interface as being adjacent to each other; and wherein, prior to the modification, there is no hidden row H1 such that when displayed, P1 and P2 would no longer be adjacent, and would be separated from one another on the graphical user interface by H1; and wherein, prior to the modification, row P1 comprises a representation of a cell C1 and row P2 comprises a representation of a cell C2; and wherein, after the modification, the three or more rows represented within data structure D comprise a row Q1, a row Q2, and a row Q3; and wherein, after the modification, row Q1 comprises a representation of cell C1, and row Q2 comprises a representation of cell C2, and row Q3 comprises a representation of cell X; and wherein, after the modification, rows Q1 and Q3 are visibly represented on the graphical user interface as being adjacent to each other, and rows Q2 and Q3 are visibly represented on the graphical user interface as being adjacent to each other; and wherein the step is performed in response to a user input signal comprising a user input signal selected from the group consisting of: (a) dragging a visual representation of a sequence W1 of one or more characters from one location to another on the graphical user interface, wherein W1 is a subsequence selected from the sequence of characters in a cell Z1, wherein Z1 is different from X; and (b) dragging a visual representation of a cell from one location to another on the graphical user interface; and changing the memory such that data structure D is modified (modification M2), wherein, after the modification, the data structure comprises a representation of a sequence of cells for a target row comprising a cell Y comprising a sequence T' of zero or more characters; and wherein, prior to the modification, either (i) the data structure does not comprise a representation of Y, or (ii) Y comprises a sequence T of zero or more characters, wherein T is different from T'; and wherein the step is performed in response to a user input signal comprising dragging a visual representation of a sequence W of one or more characters from one location to another on the graphical user interface, wherein W is a subsequence selected from the sequence of characters in a cell Z, wherein Z is different from Y.

In accordance with one embodiment, the present invention comprises a method of making a structured text processor by executing a text processor application program which has been stored in a general purpose digital computer system's memory, to impart text processing functionality to the general purpose digital computer system by changing the state of one or more central processing units within the computer system when a set of program instructions of the text processor application program are executed, thereby changing the visual state of a graphical user interface that is in communication with the computer system, wherein the program instructions comprise: storing within the memory a data structure D representing three or more rows, each row comprising a representation of a sequence of two or more cells, each cell comprising a sequence of zero or more characters representing human-readable text, wherein the rows are visibly represented on the graphical user interface as a sequence of visual cells, one or more cells displaying all or part of the sequence of characters representing the human-readable text; and changing the memory such that data structure D is modified (modification M1), wherein, after the modification, the data structure comprises a representation of a sequence of cells for a target row comprising a cell X comprising a sequence S' of zero or more characters; and wherein, prior to the modification, either (i) the data structure does not comprise a representation of X, or (ii) X comprises a sequence S of zero or more characters, wherein S is different from S'; and wherein the step is performed in response to a user input signal comprising a user input signal selected from the group consisting of: (a) dragging a visual representation of a sequence W1 of one or more characters from one location to another on the graphical user interface, wherein W1 is a subsequence selected from the sequence of characters in a cell Z1, wherein Z1 is different from X; and (b) dragging a visual representation of a cell from one location to another on the graphical user interface; and changing the memory such that data structure D is modified (modification M2), wherein, after the modification, the data structure comprises a representation of a sequence of cells for a target row comprising a cell Y comprising a sequence T' of one or more characters; and wherein, prior to the modification, either (i) the data structure does not comprise a representation of Y, or (ii) Y comprises a sequence T of zero or more characters, wherein T is different from T'; and wherein, at the time immediately prior to the modification, the visual representation of a cell Z3 comprises a cursor for user input, wherein the sequence of characters on at least one side of the cursor comprises T', and wherein Z3 is different from Y; and wherein the step is performed in response to a user input signal selected from the group consisting of: (a) selecting via a gesture or a pointing device an area on the graphical user interface; and (b) pressing a simultaneous combination of one or more keys, buttons, or switches on a user input device.

BRIEF DESCRIPTION OF THE DRAWINGS

The accompanying drawings, which are incorporated into this specification, illustrate one or more example embodiments of the inventions disclosed herein, together with the detailed description. The drawings are illustrative only, and that what is depicted therein may be adapted, based on this disclosure, in view of the common knowledge within this field.

In the drawings:

FIG. 1 is an exemplary article.

FIG. 2B-FIG. 2D show the document with various rows expanded.

FIG. 8C shows the case where the cells have been copied to the new location.

FIG. 9C shows the case where the operation results in the cell being placed in a different column on the new row.

FIG. 13A and FIG. 13B illustrate a scenario where a cell is dragged and dropped on a row, resulting in the insertion of a new child row. FIG. 13C shows a case where the operation results in the cell being placed in another column on the new row.

FIG. 14A-FIG. 14D illustrate scenarios where content from one cell is inserted into another cell. FIG. 14A and FIG. 14B show a cell being appended to (i.e., inserted at the end of) another. FIG. 14C and FIG. 14D show a cell being inserted into the middle portion of another cell.

FIG. 15A and FIG. 15B illustrate a scenario where the content from multiple cells is inserted into another cell.

FIG. 18A-FIG. 18C illustrate a scenario where dragging text from a cell results in the insertion of a row.

FIG. 19B-FIG. 19D show three exemplary states the editor may be in at the end of the operation.

FIG. 20A-FIG. 20G illustrate an exemplary scenario where content is converted from one format to another.

FIG. 21A-FIG. 21E illustrate a scenario where content in a cell is split via keyboard command. FIG. 21B-FIG. 21D show exemplary scenarios where the operation has resulted in the insertion of a new row. FIG. 21E shows an exemplary scenario where a column has been inserted as the result of the operation.

FIG. 22A-FIG. 22B illustrate another example where content in a cell is split via keyboard command.

FIG. 23A and FIG. 23B show the selected content and the initial state of the editor. FIG. 23C shows the state of the editor with the modified content, and FIG. 23D shows the structured document reflecting the changes.

FIG. 26A-FIG. 26E illustrate an exemplary scenario where textual content is split among a plurality of cells. FIG. 26A shows an exemplary scenario where imported content (e.g., via drag and drop) has been automatically split along sentence boundary and placed in two cells.

FIG. 26B and FIG. 26C show a scenario where the content in one cell has been split into words.

FIG. 26D and FIG. 26E show a scenario where the content in selected cells have been combined.

FIG. 29B shows the structured document with a virtual column added on the right. FIG. 29C shows the scenario where the source rows are hidden.

DETAILED DESCRIPTION

The following detailed description is illustrative only and is not intended to be in any way limiting. Other embodiments of the present inventions will readily suggest themselves to such skilled persons having the benefit of this disclosure, in light of what is known in the relevant arts.

In the interest of clarity, not all of the routine features of the embodiments described herein are shown and described. In the implementation of any such actual embodiments, numerous implementation-specific decisions must be made in order to achieve the specific goals of the developer, such as compliance with regulatory, safety, social, environmental, health, and business-related constraints, and that these specific goals will vary from one implementation to another and from one developer to another. Moreover, such a developmental effort might be complex and time-consuming, but would nevertheless be a routine undertaking of engineering for those of ordinary skill in the art having the benefit of this disclosure.

Throughout the present disclosure, relevant terms are to be understood consistently with their typical meanings established in the relevant art. However, without limiting the scope of the present disclosure, further clarifications and descriptions are provided for relevant terms and concepts as appropriate.

Figure 2A:
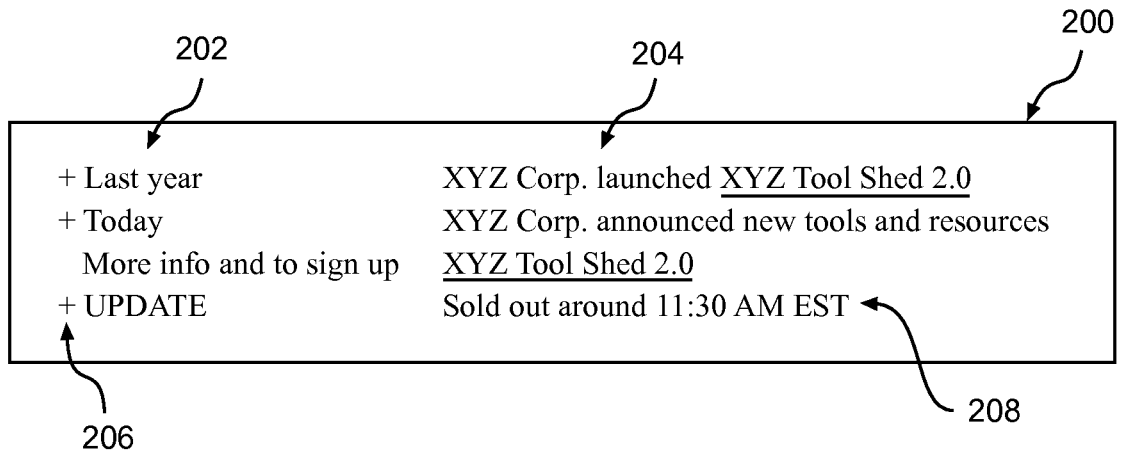
FIG. 2A shows the article of FIG. 1 written in a hierarchical format.
Figure 2B:
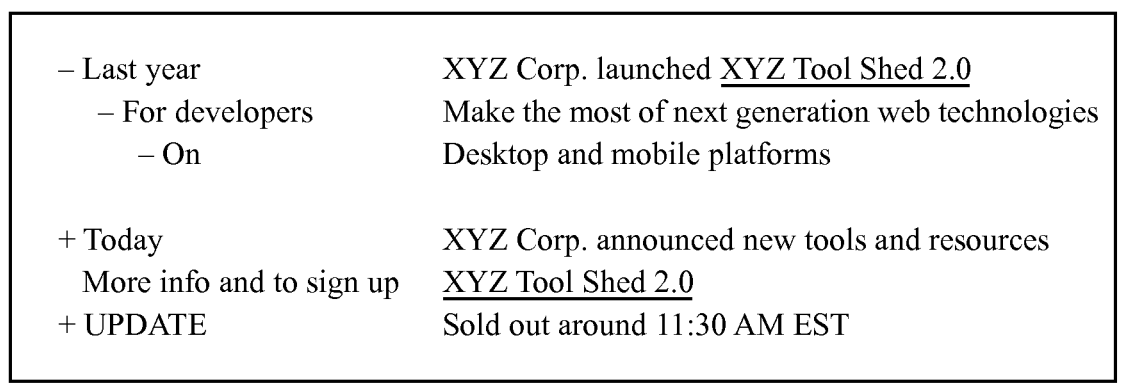
Figure 3:
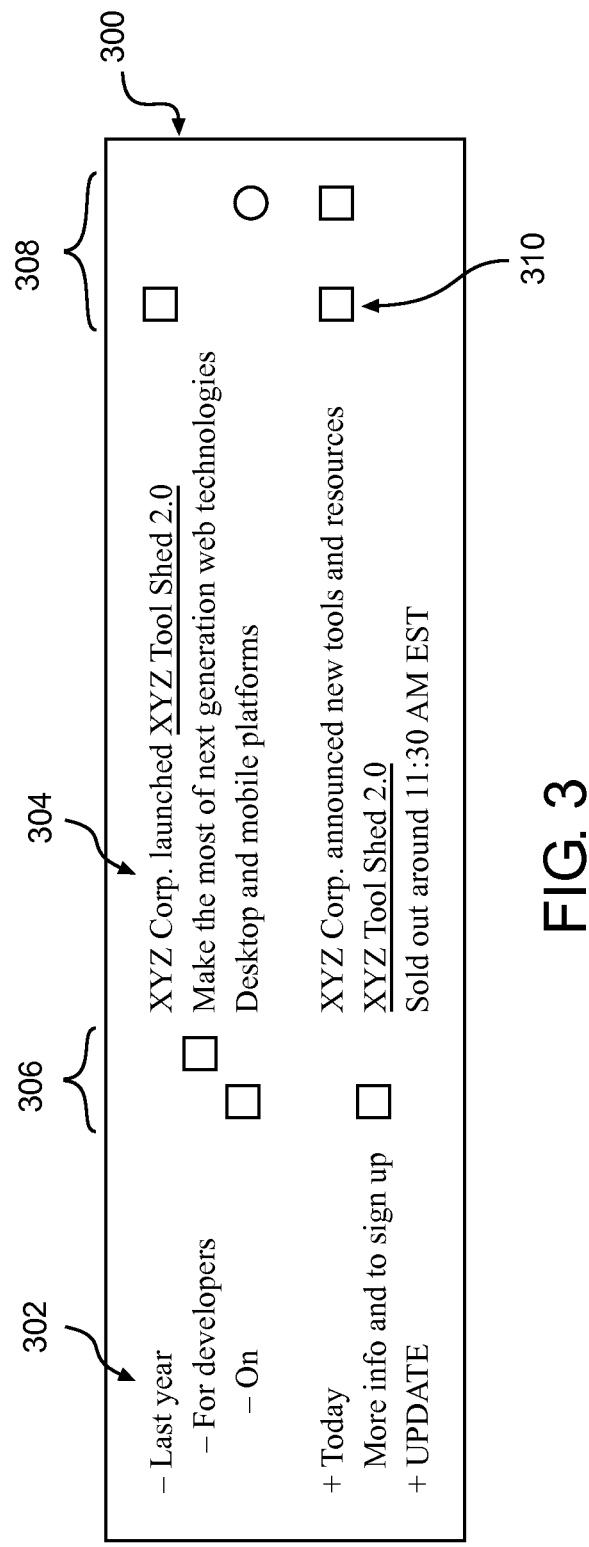
FIG. 3 shows a structured document containing textual and non-textual information.

Structured Text—FIGS. 1-3

FIG. 1 is an exemplary article. It consists of a wall of text with little transparency as to the information contained inside. FIGS. 2A-2D show the same information organized in a two-column hierarchy in accordance with one embodiment.

FIG. 2A—Structured text: article in a snapshot
FIG. 2B—Background, first line fully expanded
FIG. 2C—Today's announcement at a glance
FIG. 2D—Today's announcement, technical details In the exemplary embodiment of FIGS. 2A-2D, the display area 200 contains two text columns 202, 204. An icon 206 on an item, node, line, or row 208 denotes whether the row has any children. Clicking on the icon 206 with the mouse would alternately expand and collapse the row to show or hide its children respectively.

Traditional text weaves the various bits of information into a linear thread that must be parsed to extract its meaning. Structured text helps keep the various units of information separate and relies on a cellular, or grid, structure and hierarchical layering to organize its content. The hierarchy enables a stratification of information, while the grid structure enables a further breaking up of information for easier visual identification.

FIG. 3 illustrates an exemplary embodiment where the document in FIGS. 2A-2D is annotated with non-textual items. The display area 300 contains two text columns 302, 304 and two non-textual columns 306 sandwiched between them. Three more columns 308 are placed to the right. A non-textual item 310 in the document may be represented by an icon and may be moved, copied, or otherwise manipulated in a manner similar to textual information described below. In one embodiment, columns are typed and the placement of information is restricted to the columns of the appropriate type.

In various embodiments, an icon 310 in a non-textual column 306, 308 may represent an object such as a text block, image, diagram, file, structured document, date, annotation, link, or other types of information. In the exemplary embodiment of FIG. 3, an icon 310 may represent a block of traditional text, such as the full article presented in FIG. 1. The user may view and edit the content represented by an icon 310 by issuing the appropriate command such as a double click from the user interface.

Figure 4:
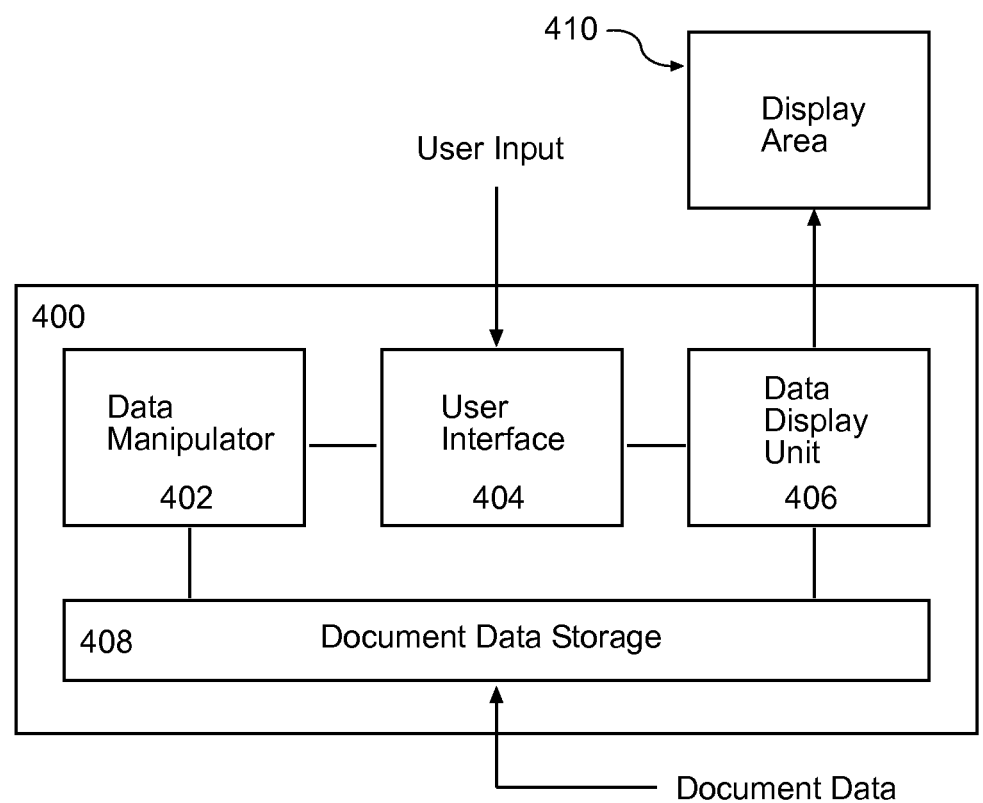
FIG. 4 is a block diagram of a data processing system, which can process a document such as the structured document shown in FIG. 2 and FIG. 3.

Data Processing System—FIG. 4

FIG. 4 is a functional block diagram of a data processing system 400 which can process a document such as the structured document 200 shown in FIGS. 2A-2D. In the illustrated embodiment of FIG. 4, the data processing system 400 includes a data manipulator 402, a user interface 404, and a data display unit 406.

The user interface 404 receives the input from the user and sends the input either to the data display unit 406 to be processed and displayed and/or to the data manipulator 402 to manipulate the data. The user input can be a command, content (e.g., text), or other related input. The data manipulator 402 receives document data (e.g., data from document 200), which may include text content, document structure data, and other related data such as metadata, from a document data storage 408, and manipulates the received document data according to the user input. The manipulated document data is then stored in the document data storage 408. The data display unit 406 receives the user input from the user interface 404 and the document data from the storage 408, and processes the user input and the document data to generate a visual representation of the document data. The data display unit 406 displays various components of the processed user input and the document data on a display area 410 in a manner that will be described in more detail below.

Figure 5:
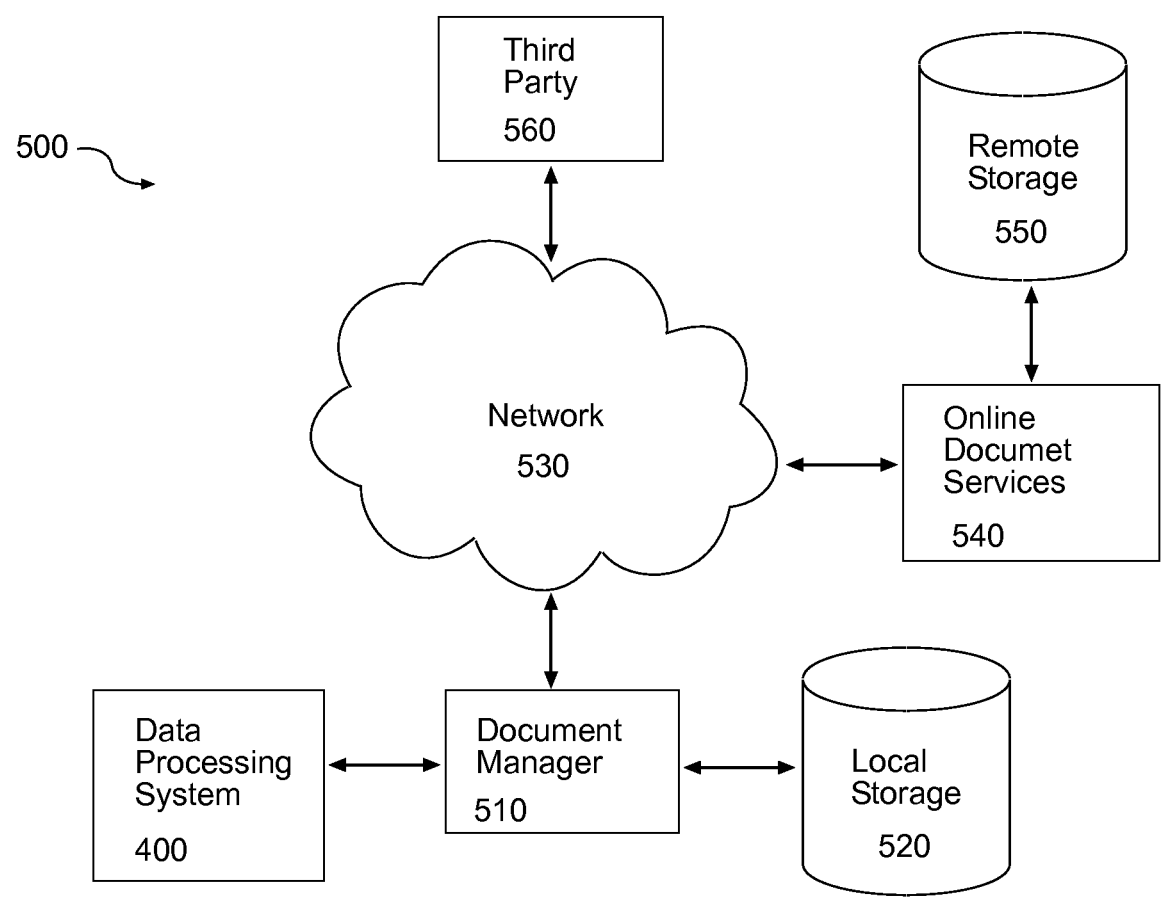
FIG. 5 illustrates a document management system in accordance with one embodiment.

Document Management System—FIG. 5

FIG. 5 is functional block diagram of a document management system that may be used to manage a collection of documents such as the exemplary structured document 200 shown in FIGS. 2A-2D. In the illustrated embodiment of FIG. 5, the data processing system 400 described in connection with FIG. 4 interacts with a document manager 510 to fetch and load document and related data.

In various embodiments, a structured document may contain references to objects that exist independently of it, such as records in a common system calendar, annotation definitions referenced by a plurality of structured documents, and links to other structured documents or to resources such as image, video and text files. The document manager 510 resolves these references as needed to locate the required data.

For example, in one embodiment, a structured document being displayed on the display area 410 may contain a link to another structured document. The user may issue a command to the user interface 404 to fetch and open the document referred to by that link. In response, the data processing unit 400 forwards the request to the document manager 510 depicted in FIG. 5, which in turn tries to locate the requested resource. If the requested document is not available in the local storage 520, the document manager 510 sends a request to the external server 540 for the requested document. Once the requested document is located in the local storage 520, or received from the external server 540, the document manager 510 passes the document to the data processing system 400, which in turn displays the document in the display area 410.

Although one local data store 520 and one remote data store 550 are shown in FIG. 5, it is to be understood that structured documents and other content and related data may be stored in a plurality of data stores and locations, including locally, remotely, or a combination thereof.

In various embodiments, the location from which to find and retrieve desired content may be specified by the user, or resolved automatically by the document manager 510. Whether stored locally or in a remote repository, the structured document and any referenced content may be stored as one or more files, or as one or more records in a database, or a combination of the two.

In one embodiment, the entirety of the information in a database may be represented as a single structured document. In that embodiment, the database is queried and various parts of the database are retrieved and displayed in response to user action.

In various embodiments, the document manager 510 may be a standalone configuration without a connection to a network 530, or a thin client delegating most operations to a remote server 540, or something in between.

In one embodiment, the remote storage 550 is managed by an online document service 540 running on a server computer having a server application for communicating with the document manager 510. The document manager 510 may include a client application operable to communicate with the online document service 540 via a network 530, such as the Internet.

The online document service 540 may include a plurality of services, such as user accounts, access control, online structured document editors, collaboration and management tools, and others. Additional client and/or server applications 560 may be in communication with the online document service 540 and/or the document manager 510 via the network 530.

Operation

FIGS. 2, 3, 6-29 illustrate graphical user interfaces (GUIs) for use in manipulating structured documents in accordance with one or more embodiments. The GUIs may be employed in a structured document editing system, such as that shown in FIG. 4. In general, a user can create, edit, store and otherwise manipulate parts of a structured document through the GUIs.

The operation of the data processing unit 400, and in particular, the operation of the data display unit 406 and its associated units with respect to the display area 410, is described below in detail in connection with FIGS. 2, 3, 6-29. Though the operation is described with reference to what is displayed to a user, it is to be understood that the display is generated by the units of the data processing 400 and document management 500 systems responding to user input and document data.

References are made below to specific keys on the keyboard, such as carriage return or CR, DELETE, CTRL, ALT, SHIFT and others. Furthermore, references are made below to combinations of keys on the keyboard, such as pressing the carriage return while simultaneously holding down the control key, or CTRL+CR. It is to be understood that such references are for clarity of exposition only and embodiments are not restricted to using those keys or combinations thereof. Furthermore, different computer systems may be equipped with keyboards comprising different sets of keys, or keys with different labels. It is to be understood that embodiments are not restricted to any specific computer architecture or manufacturer.

Though the operations are described with reference to specific user actions and editing outcomes, it is to be understood, however, that the operations are not limited to the specific details provided, and numerous other variations may be provided by embodiments.

Structured Text Editor

In various embodiments, a structured document is organized around cellular units of information. The cellular units or cells may be organized in grids or tables, or positioned on a canvas, or organized in other ways. The grid or canvas may be flat or hierarchical.

In the following, operations and features are discussed in reference to embodiments that organize information in hierarchical grids. However, the operations also apply to other forms of organization, as will become apparent below.

Some of the discussion in the following involves moving rows, cells, and/or their contents. It is to be understood however that the operations are not limited to moves and the discussion also applies to copying rows, cells, and/or their contents.

Rows

In various embodiments, rows may be selected, moved, copied, and otherwise manipulated. Rows may be manipulated by clicking on, or dragging, a specially designated region on the display, such as a row handle icon. In one embodiment, multiple rows may be selected so that they can be manipulated simultaneously.

Rows—Reorder and Restructure—FIGS. 6, 7

Figure 6A:
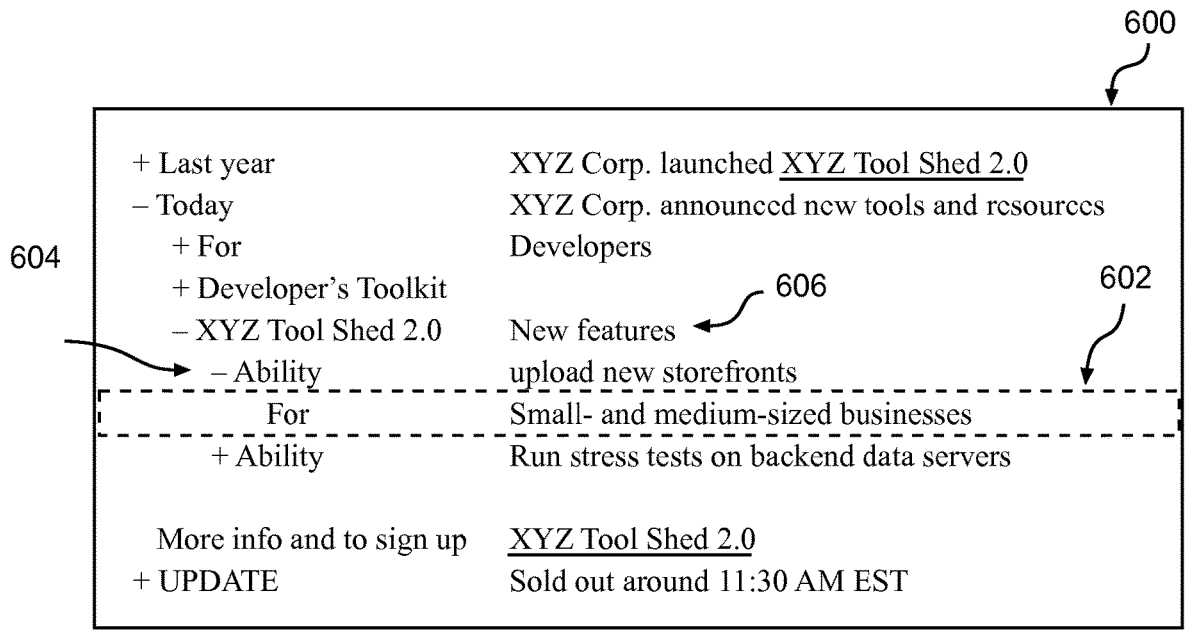
FIG. 6A and FIG. 6B illustrate a scenario where a row is dragged to another location.

FIG. 6A is an exemplary embodiment where one row has been selected 602. In the illustrative embodiment of FIG. 6A, the selection shading 602 spans the width of the display area 600 to indicate that a row has been selected. Various other means may be used to distinguish row selection from cell selection. For example, in one embodiment, selected rows are shaded in a different color from selected cells.

Figure 6B:
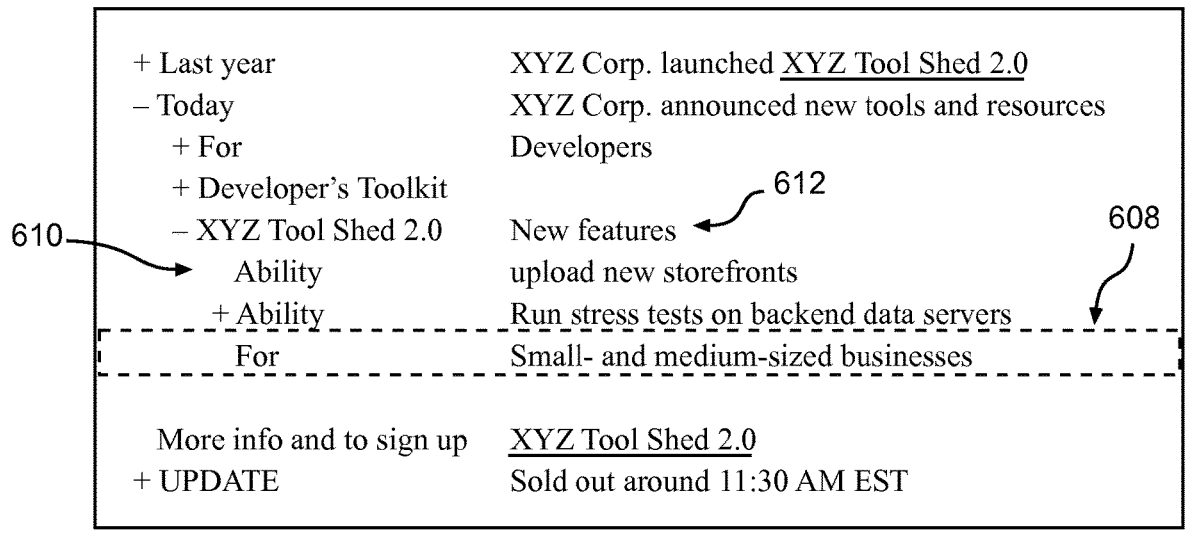

In various embodiments, rows may be manipulated via drag and drop. The user may drag rows to reorder them or drop them on other rows to restructure the hierarchical, or parent-child, relationships among them. For example, in FIG. 6A the user may drag the selection 602 and drop it on another row 606. As a result, the row is removed from its current parent 604 and is added as a new child of the target row 606. The result is illustrated in FIG. 6B. The selected row has been removed from its old parent 610, which now has no children. The selected row has been added as the last child of the target row 612. The selected row remains selected 608 to provide continuing visual feedback to the user.

Figure 7A:
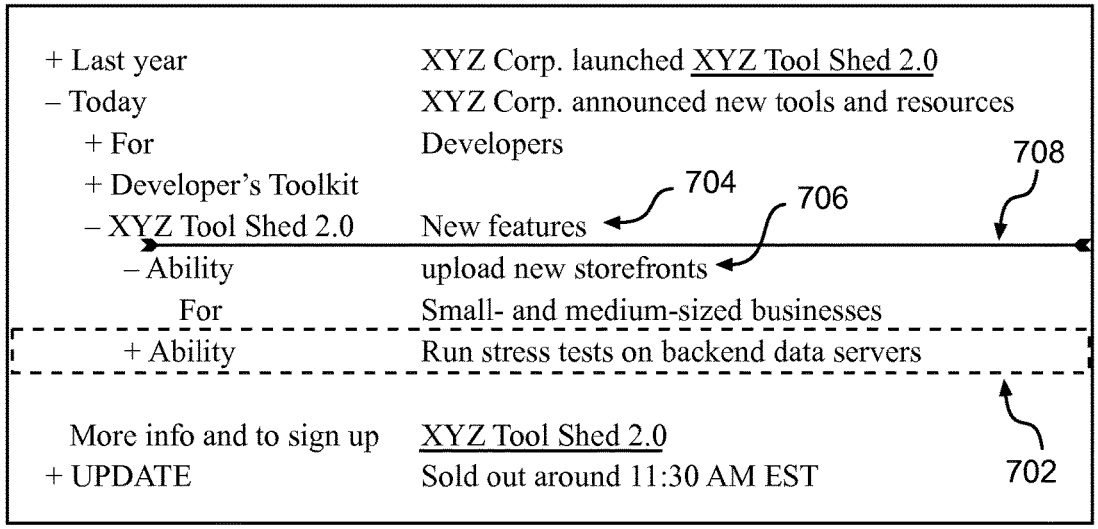
FIG. 7A and FIG. 7B illustrate another example of dragging a row to a new location.
Figure 7B:
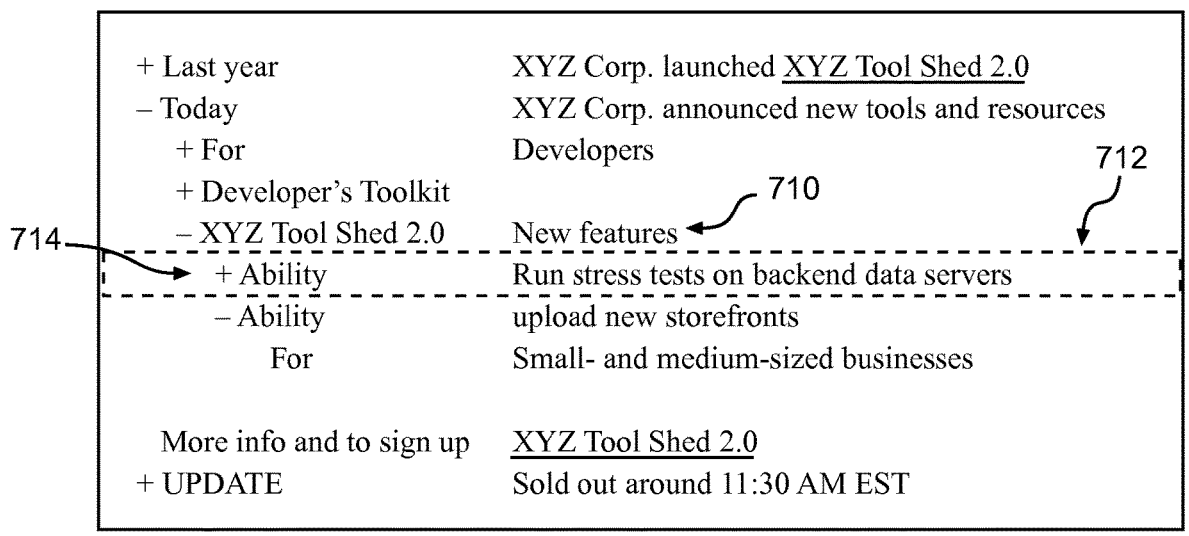

In one embodiment, if the mouse pointer is on a target row, and within a certain threshold distance from the top or the bottom of the target row at the time of the drop, the dragged rows are inserted above or below the target row, respectively. In the exemplary embodiment of FIG. 7A, a row has been selected 702 and dragged to the lower threshold region of another row 704, or the upper threshold region of the row 706 immediately below it 704. As a result, a line 708 is displayed on the boundary between the two rows 704,706 to provide visual feedback to the user. FIG. 7B illustrates what happens if the user initiates a drop operation at this point, for example by releasing the left mouse button. The row indicated by the selection 702 is removed from its current parent 704 and inserted as a child of its new parent 710. In the illustrative example of FIGS. 7A and 7B, the new parent 710 is the same as the old parent 704. The row indicated by the selection 702 is added as the first child of the new parent 710 and is selected 712 to provide continuing visual feedback to the user. In the exemplary embodiment of FIGS. 7A and 7B, moving a parent row 714 does not affect its relationship with its children. The hierarchical structure below the dragged row 714 remains unchanged.

Rows—Reorder and Restructure—Variations

The above description is illustrative only and is not intended to be in any way limiting. Various other embodiments are possible. For example, the representation of the hierarchical structure of the rows in memory, the ability to show/hide rows on the graphical user interface, and/or the restructuring behavior of the hierarchy in response to a row being dragged may vary across embodiments.

In various embodiments a parent row maintains references to its child rows in some way. The parent-child associations are stored in the underlying data structure in a relatively explicit way. In other embodiments, a parent row may not maintain references to its child rows. In one embodiment, the relationship between a parent row and its child rows is implied from the relative indentation of the rows as represented on the graphical user interface. The indentation level of a row may be represented in the underlying data structure as an attribute of the row, rather than a reference to/from its parent.

Various embodiments provide means to group rows and hide/show them when an appropriate icon or element on the graphical user interface is selected. Other embodiments may not. In particular, an embodiment may provide means to organize rows in hierarchies without also providing means to hide/show the rows on command. Conversely, an embodiment may provide means to hide/show rows without also providing means for creating a hierarchy and/or restructuring the rows. In one embodiment, means are provided to create and reorganize hierarchies, and to hide/show rows on command.

In one embodiment, means are provided to group rows and hide/show them when the appropriate icon is clicked. The icon is placed adjacent to a so-called summary row, which is the row immediately above or below the rows that are grouped together. Dragging the summary row to a new location does not move the grouped rows. The grouped rows are left behind and their associated hide/show icon appears next to whatever row that happens to be adjacent to them after the drag operation.

In one embodiment, each row has a level number associated with it. Dragging a row and dropping it on a group that is nested more deeply than the row's level number may cause the group hierarchy to restructure, possibly cleaving it so that the row may be placed at a nesting level suitable to it's level number.

In the latter two exemplary embodiments, the relationship between rows at different levels in the hierarchy is more tenuous than one may expect from a parent-child relationship. In the former embodiment, dragging a summary row breaks any implied associations between the summary row and the grouped rows. In the latter embodiment, adding a row to an existing hierarchy may disrupt the associations that already exist in the hierarchy by causing it to restructure.

Various embodiments implement a more robust type of parent-child association. The following exemplary embodiments illustrate a few examples.

In one embodiment, moving a row from one location to another leaves the parent-child relationships between the row and it's children, if any, intact.

In one embodiment, moving a row from one location to another does not change the hierarchical structure below the dragged row. The parent-child relationships for all the rows in the hierarchy below the dragged row remain unchanged. In other words, moving a row causes the entire subtree rooted at that row to be moved.

In one embodiment, moving a row from one location to another results in the parent-child relationship between the row and its old parent to be removed, and a parent-child relationship between the row and its new parent to be created. The parent-child relationships for all the other rows in the document remain unchanged.

In one embodiment, a top-level row (i.e., a row without a visible parent), such as any of the rows displayed in the exemplary embodiment of FIG. 2A, may become a child row by dragging it to an appropriate area on the display. For example, the row may be dragged to a target row and dropped, to make it a child of the target row.

In one embodiment, a child row may become a top-level row (i.e., a row without a visible parent) by dragging it to an appropriate area on the display. For example, the child row may be dragged to, and dropped on, the area within the appropriate threshold distance from the top or the bottom of a top-level target row. As a result, the dragged row is removed from its parent and inserted above or below the top-level target row, respectively.

In one embodiment, a row may be dragged to a location that is deeper (i.e., lower) in a hierarchy than the row has ever been during its lifetime. For example, a child row that has only had a top-level row for a parent during its lifetime thus far may be dragged to, and dropped on, a target row whose parent is a top-level row. As a result, the dragged row is added as a child of the target row. Upon completion of the operation, the dragged row is at a deeper level in a hierarchy than it has ever been before.

Rows—Cut, Copy, Paste

Standard editing operations such as cut, copy and paste may be performed on rows to edit the hierarchical structure. When copying rows, the user may specify shallow copy (i.e., copy only the selected row) or deep copy (i.e., copy the selected row and all its children). For example, in one embodiment, the user may hold down the CTRL key while dragging the mouse to indicate a shallow copy, and hold CTRL+SHIFT keys while dragging the mouse to indicate deep copy.

Cells

In various embodiments, the user may operate on individual cells or groups of cells. The user may select one or more cells and then move, copy, and otherwise manipulate them.

In one embodiment a group of selected cells may be moved by dragging them to another location in the document. At the time of the drop operation, the cell that was under the mouse at the start of the drag is moved to the cell under the mouse at the time of the drop, and the other selected cells are moved accordingly.

Cells—Move and Copy—FIG. 8

Figure 8A:
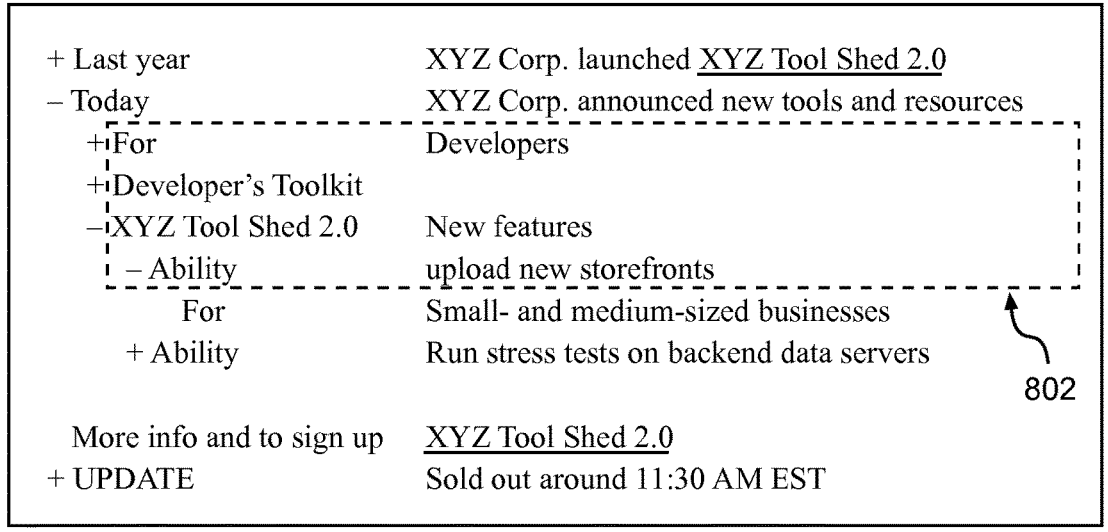
FIG. 8A and FIG. 8B illustrate a scenario where a group of cells are selected and dragged to another location.
Figure 8B:
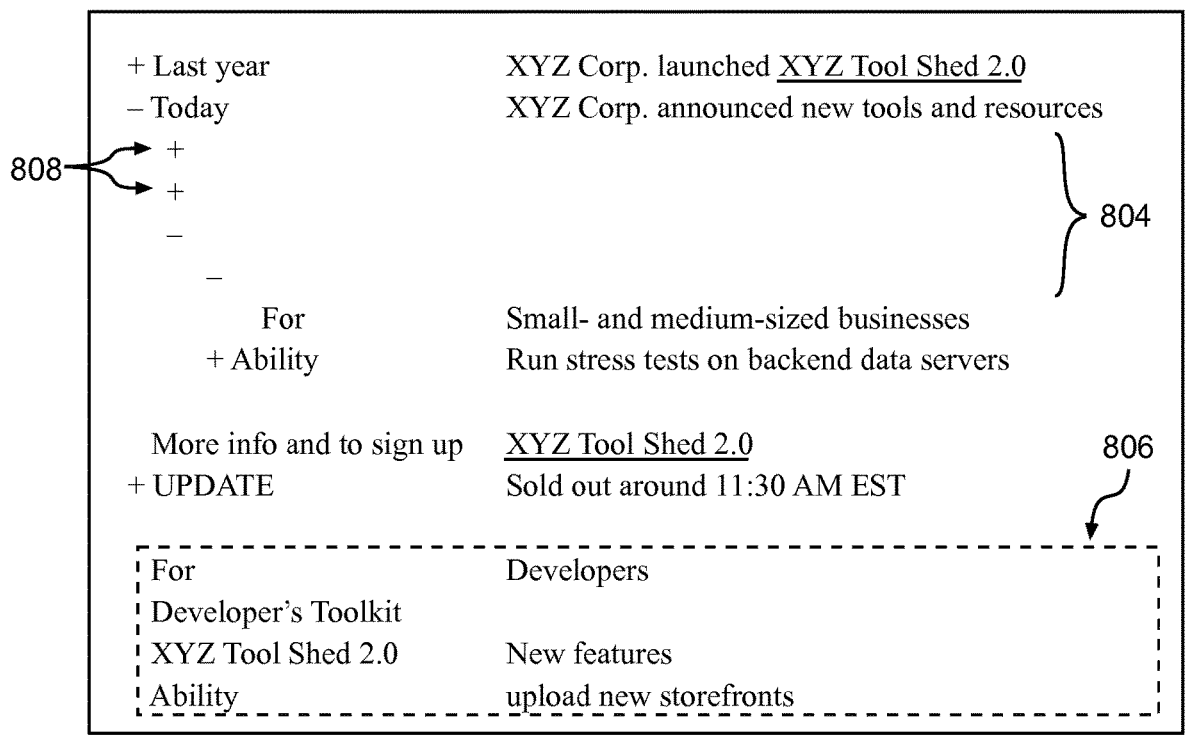

FIG. 8A is an exemplary embodiment where several cells have been selected 802. In various embodiments, cells may be manipulated via drag and drop. For example, in FIG. 8A the user may drag the selection 802 and drop it on another area on the display, such as the bottom of the page. The result is illustrated in FIG. 8B. The selected cells 802 are cleared 804 and their content is moved to cells at the drop location 806. As a result, the contents of the cells at the drop location are replaced with the contents of the dragged cells. In one embodiment, new rows may be inserted at the drop location to accommodate the new values 806. The target cells at the drop location may be selected 806 to provide visual feedback to the user.

FIG. 8C illustrates an exemplary scenario where the drag and drop operation results in a copy, rather than a move, of content from the source region 810 to the target region 812. In one embodiment, the user may indicate a copy operation by holding down a specially designated key on the keyboard at the time of the drop.

Various embodiments allow the user to manipulate cells on a document page without regard to hierarchy. In the example of FIG. 8A, the contents of selected cells 802 are dragged to a new location 806 (FIG. 8B) without concern as to the compatibility of the hierarchical structure of the rows underlying the source region 802 where the drag operation was initiated and that of the target region 806 where the drop operation is performed. In the example of FIGS. 8A and 8B the contents of selected cells 802 are removed leaving the hierarchy intact 804. Only the selected cells participate in the operation. In particular, any invisible child rows under a parent row 808 are not affected by the operation. The contents are then pasted at the new location 806 on the existing hierarchy, which in the illustrative example of FIGS. 8A and 8B happens to be flat.

Likewise, in various embodiments, the user may select the cells 806 at the bottom of FIG. 8B and drag them to a hierarchical area 804. Dropping the selected cells 806 there 804 would result in the content of those cells being pasted to the target area 802 (FIG. 8A). The fact that the original cells 806 and the target cells 802 are located on rows with different hierarchical structures does not factor into this edit.

Cells—Row/Column Insertion—FIGS. 9-13

Certain operations on cells may result in the insertion of new rows. In one embodiment, if the mouse pointer is within a certain threshold distance of the top or bottom of a target row at the time of the drop, new rows are inserted above or below the target row, respectively, and the dragged cells are moved to the newly inserted rows. The number of new rows inserted may be determined based on the number of rows from which cells were dragged.

Likewise, certain operations on cells may result in the insertion of new columns. In one embodiment, if the mouse pointer is within a certain threshold distance of the left or right of a target cell at the time of the drop, new columns are inserted to the left or right of the column containing the target cell, respectively, and the dragged cells are moved to the newly inserted columns. The number of new columns inserted may be determined based on the number of columns from which cells were dragged.

Figure 9A:
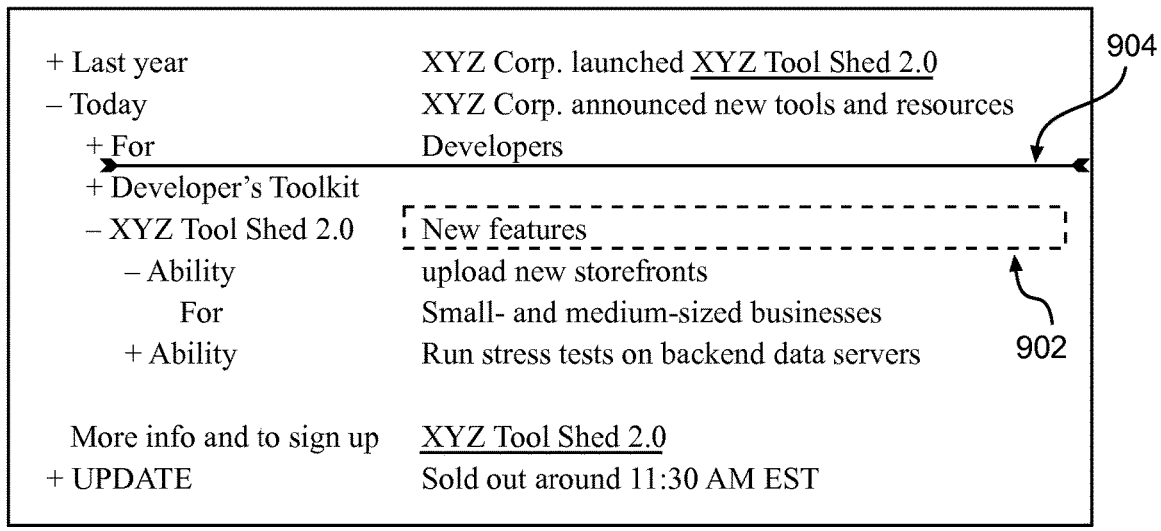
FIG. 9A and FIG. 9B illustrate the scenario where dragging a cell results in the insertion of a row.
Figure 9B:
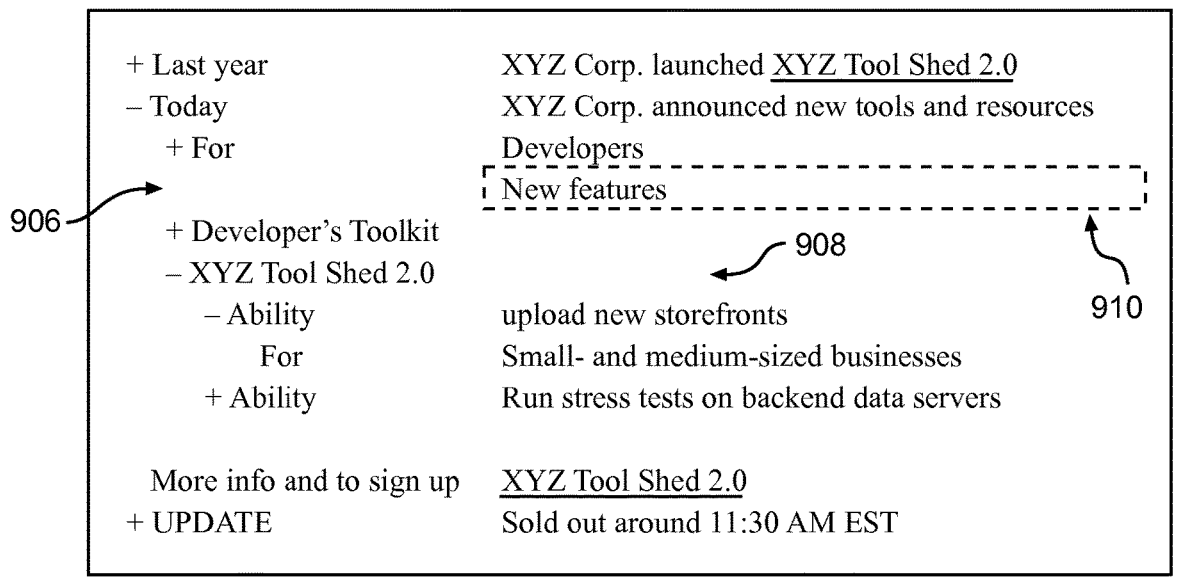

FIG. 9A is an exemplary embodiment where a cell has been selected 902 and dragged to within the threshold region of a target row. As a result, a line 904 is displayed on the corresponding boundary of the target row to provide visual feedback to the user. FIG. 9B illustrates what happens if a drop is performed at this point. A new row 906 is inserted at the position indicated by the line 904, the selected cell 902 is cleared 908, and its content is moved to the target cell 910. The target cell is selected 910 to provide visual feedback to the user.

FIG. 9B illustrates the result of the drop operation if the mouse pointer is positioned over the right column at the time of the drop. In that case, the cell in the right column of the newly inserted row 906 is chosen as the target cell 910. FIG. 9C illustrates the result of the drop operation if the mouse pointer is positioned over the left column at the time of the drop. In that case, the cell in the left column of the newly inserted row 906 is chosen as the target cell 912.

Figure 10A:
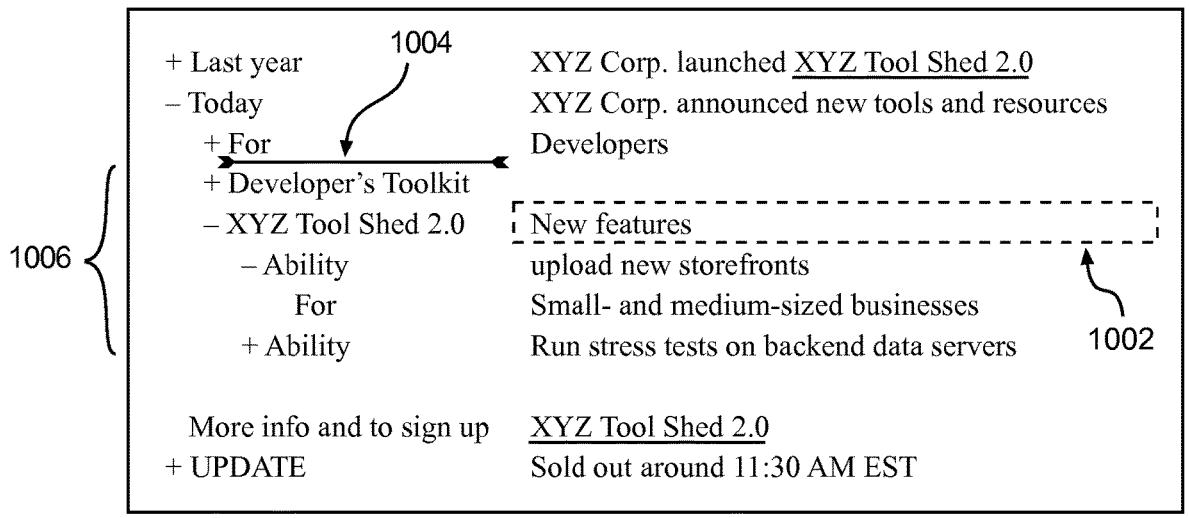
FIG. 10A and FIG. 10B illustrate the scenario where a cell is dragged and inserted in a column, resulting in the content in the column to be shifted down.

FIG. 10A is an exemplary embodiment where a cell has been selected 1002 and dragged to within the threshold region of a target row. As a result, a line 1004 is displayed on the corresponding boundary of the target row to provide visual feedback to the user. In the exemplary embodiment of FIG. 10A, the line 1004 spans only one column to signify that a cell, rather than a row, will be inserted at the designated location. In one embodiment the user may choose cell insertion, rather than row insertion, by holding a specially designated key on the keyboard at the time of the drop. The target column for insertion may be determined by positioning the mouse pointer over the column of interest.

Figure 10B:
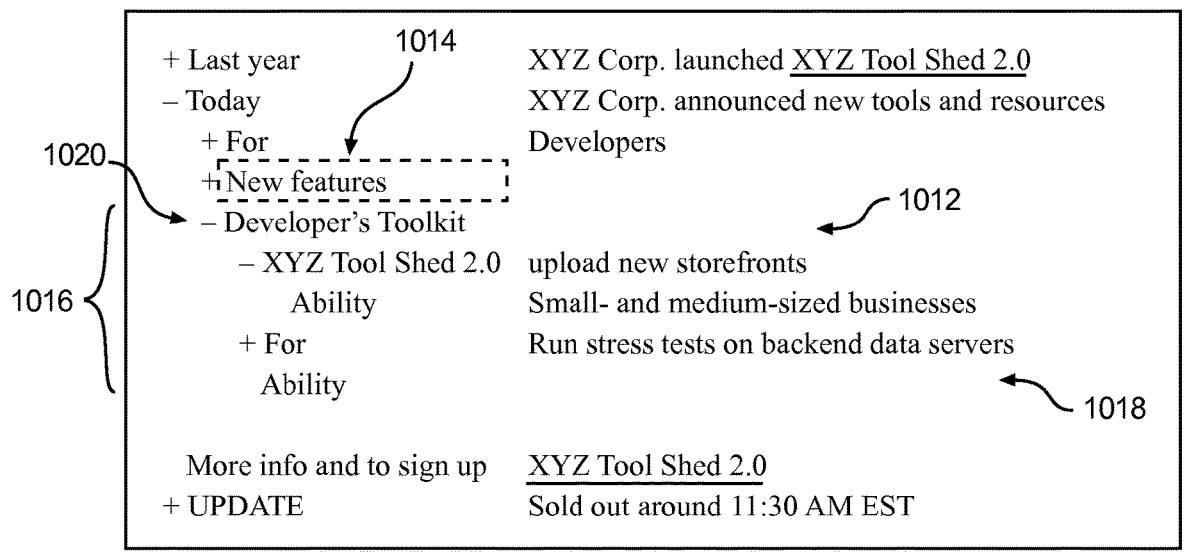

FIG. 10B illustrates the result of the drop operation. A new cell 1014 is inserted at the position indicated by the line 1004. The cells 1006 below the insertion line 1004 in the left column are shifted down 1016 as a result of the new cell 1014 having been inserted. The source cell 1002 is cleared 1012, and its content is moved to the new cell 1014. The new cell is selected 1014 to provide visual feedback to the user.

As the cells 1006 below the insertion line 1004 are shifted down, new rows may be added to accommodate them. In the exemplary embodiment of FIGS. 10A and 10B, new row 1018 is added as the last child of the closest parent row 1020 affected by this drag and drop operation.

Figure 11A:
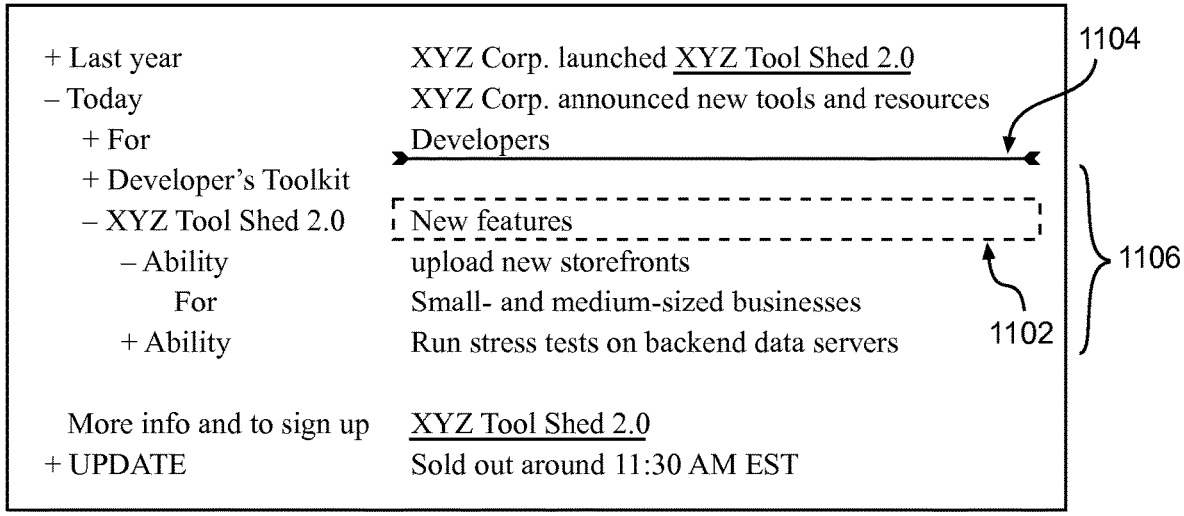
FIG. 11A and FIG. 11B illustrate an example of dragging a cell to insert it elsewhere in a column, causing the content in the column to be shifted down.

FIG. 11A is an exemplary scenario similar to FIG. 10A, except that the selected cell 1102 is dragged to within the threshold region of a target row, with the mouse pointer positioned over the right column. As a result, a line 1104 is displayed on the corresponding boundary of the target row, spanning the right cell only.

Figure 11B:
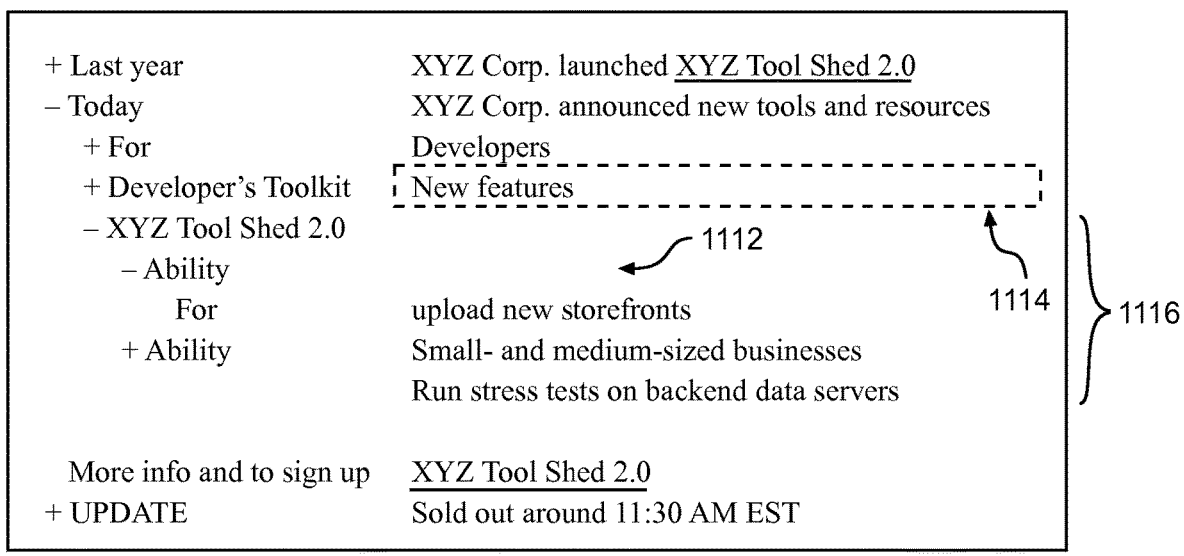

FIG. 11B illustrates what happens if a drop operation is performed at this point. A new cell 1114 is inserted in the right column at the position indicated by the line 1104. The cells 1106 below the insertion line 1104 in the right column are shifted down 1116 as a result of the new cell 1114 having been inserted. The source cell 1102 is cleared 1112, and its content is moved to the new cell 1114. The new cell is selected 1114 to provide visual feedback to the user. The operation has left the cells in the left column unchanged.

Figure 12A:
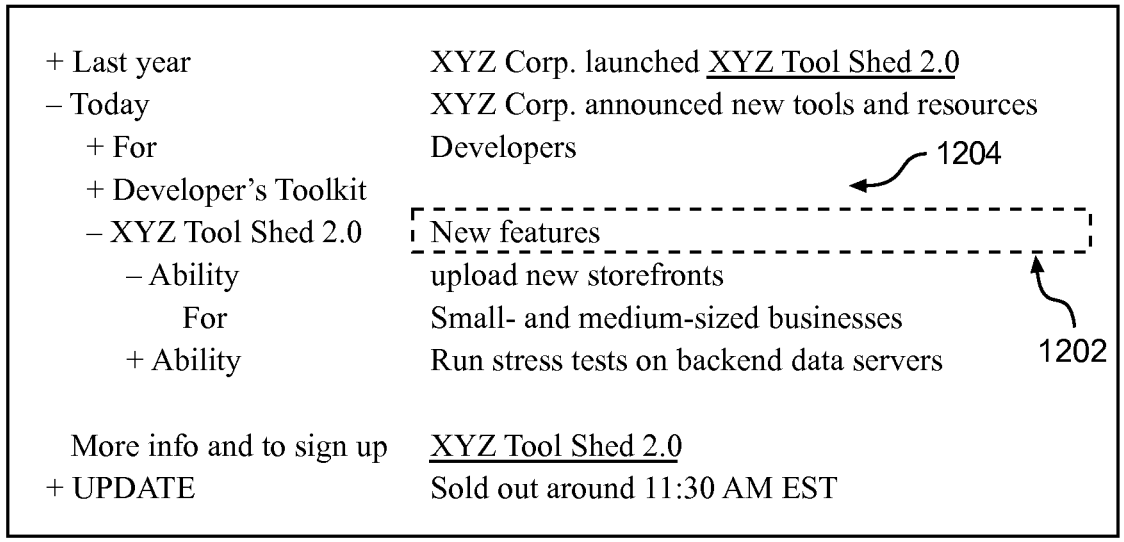
FIG. 12A and FIG. 12B illustrate a scenario where a cell is dragged to a new location.
Figure 12B:
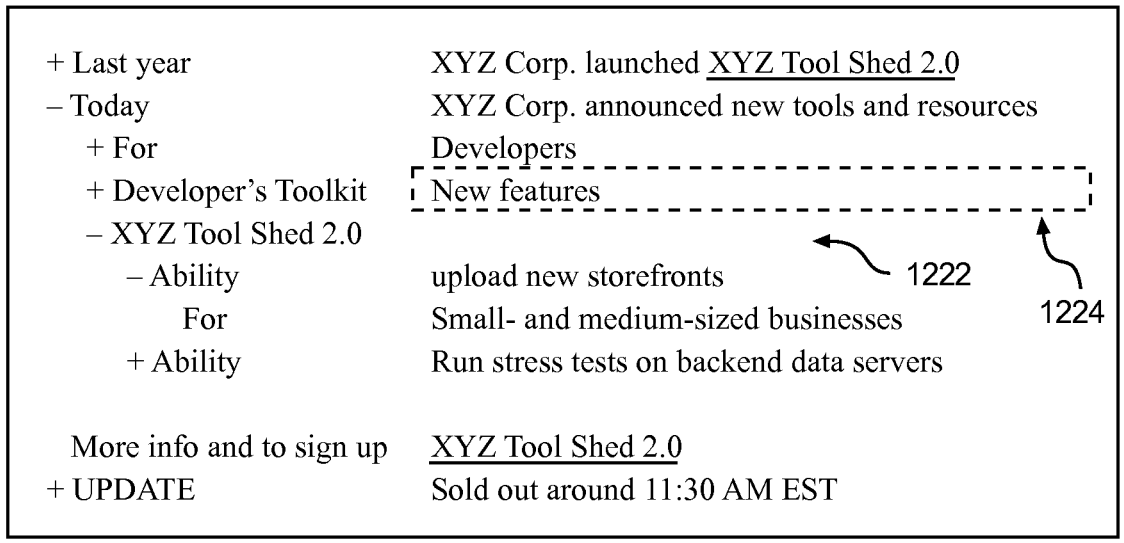

FIGS. 12A and 12B illustrate the result of a simple move operation for comparison. The source cell 1202 is selected and dragged to another cell 1204 in the same column. FIG. 12B illustrates the result of the drop operation in this exemplary scenario. The source cell 1202 has been cleared 1222 and its content has been moved to the target cell 1224. The target cell 1224 is selected to provide visual feedback to the user. The other cells in both columns have remained unchanged.

Certain operations on cells may result in the insertion of child rows. In one embodiment, dropping cells on a specially designated region on a target row would result in new rows being inserted as children of the target row. Alternatively, a specially designated key on the keyboard may be held down at the time of the drop to indicate that the new rows are to be inserted as children of the target row.

FIG. 13A is an exemplary embodiment where a cell 1302 has been selected and dragged. FIG. 13B illustrates what happens if a drop operation is performed while the mouse pointer is positioned on the left column on the same row 1304, and a specially designated key on the keyboard is pressed to indicate that the new row is to be inserted as a child of the target row 1304. As a result, a new row 1312 is inserted as the last child of the target row 1314. The source cell 1302 is cleared 1316 and its content is moved to the left cell 1318 of the newly inserted row 1312. The target cell 1318 has been selected to provide visual feedback to the user.

FIG. 13C illustrates an alternative scenario where the drop operation is performed while the mouse pointer is positioned on the right column on the source row 1304 in FIG. 13A. The result of this exemplary scenario is the same as that illustrated in FIG. 13B, except that the content of the source cell 1302 is moved to the right cell 1322 of the newly inserted row. The target cell 1322 has been selected to provide visual feedback.

In one embodiment, new rows and columns may be inserted via keyboard shortcuts. For example, one or more cells may be selected and a specially designated key combination may be pressed to indicate that new rows are to be inserted above the topmost selected row and the selected cells are to be moved to the newly inserted rows. Other key combinations may be available for inserting new rows as children of the row containing the currently selected cell, or for inserting columns.

Cells—Insertion—FIGS. 14-16

In one embodiment, when a selected cell is moved to another location, the content of the selected cell may be inserted into the target cell, rather than overwriting it completely. To specify that the content of the dragged cell is to be inserted into, rather than replace, the target cell, the user may hold down a specially designated key on the keyboard when performing the drop operation.

FIG. 14A is an exemplary embodiment where the user has selected a cell 1402 and dragged it to a target cell 1404. FIG. 14B illustrates an exemplary scenario where the user performs a drop operation at that point while holding a specially designated key on the keyboard to indicate that an insert operation is desired. As a result, the selected cell 1402 is cleared 1412 and its content is appended to the content in the target cell 1414. A separator character such as a whitespace character is appended to the content of the target cell 1404 if necessary before appending the content from the source cell 1402. The target cell 1414 is selected to provide visual feedback to the user.

FIG. 14C illustrates another exemplary scenario. A cell 1422 is selected and dragged to the same target cell as before. The mouse pointer is positioned at the point 1424 where the text is to be inserted and the drop is performed as before. FIG. 14D illustrates the result. The source cell 1422 is cleared 1432 and its content is inserted into the content of the target cell 1434. Separator characters such as whitespace characters are added as necessary to separate the inserted text 1422 from the surrounding text. The target cell 1434 is selected to provide feedback to the user.

FIG. 15A is an exemplary embodiment where two cells have been selected 1502. The cells are dragged to a target cell 1504. FIG. 15B illustrates the exemplary scenario where a drop operation is performed while pressing a specially designated key on the keyboard to indicate that an insert operation is desired. As a result, the selected cells 1502 are cleared 1512 and their contents are appended to the content in the target cell 1504. Whitespace characters are appended to the content of the participating cells 1502,1504 as necessary before they are appended together. The target cell 1514 is selected to provide visual feedback to the user.

Figure 16A:
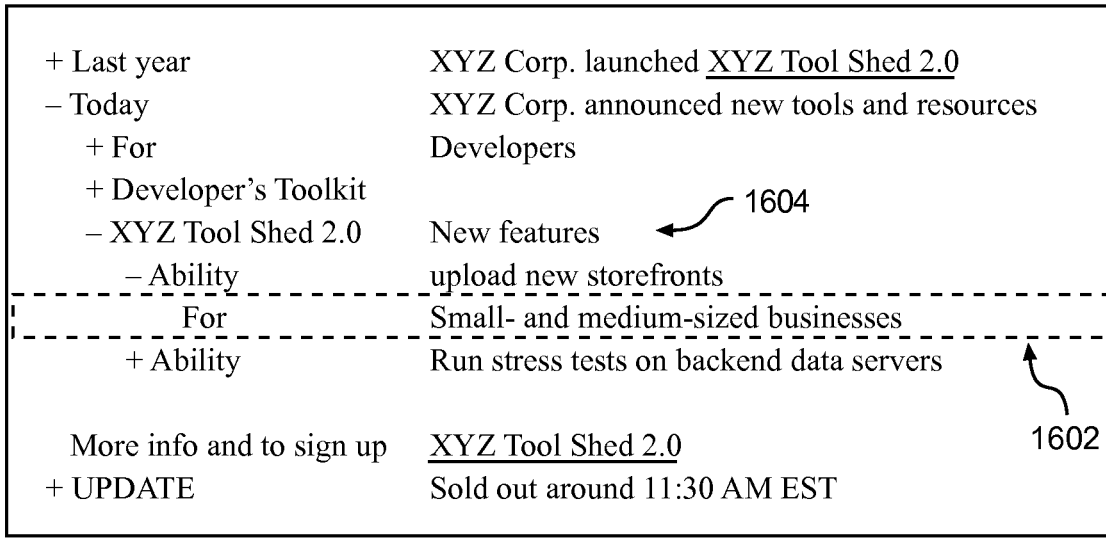
FIG. 16A and FIG. 16B illustrate a scenario where the content from a row is inserted into a cell.
Figure 16B:
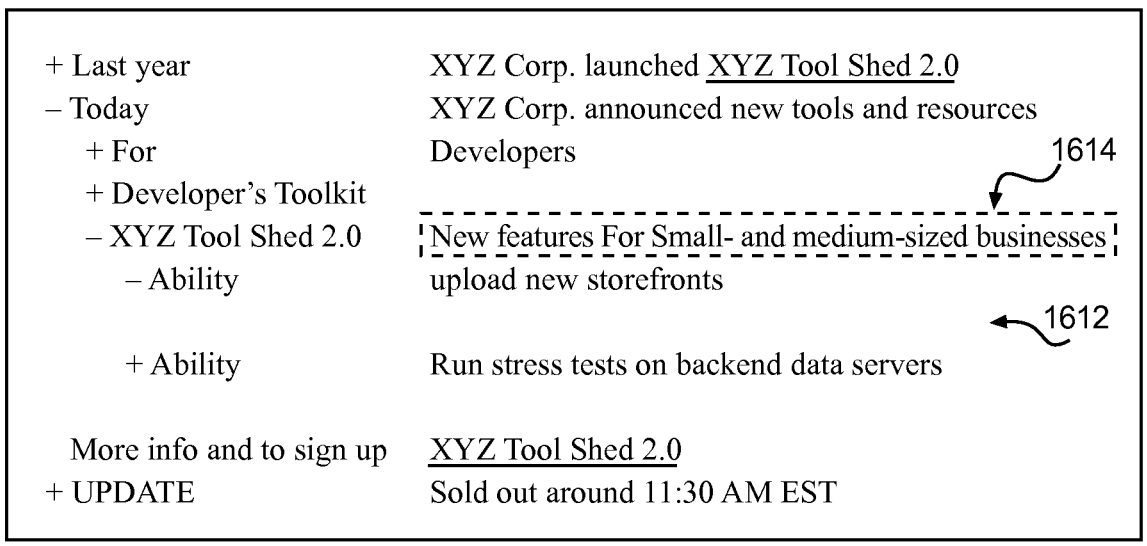

FIGS. 16A and 16B illustrate an exemplary embodiment where a row is selected 1602, dragged to a target cell 1604, and dropped there while pressing a specially designated key on the keyboard to indicate that an insert operation is desired. As a result the cells on the selected row 1602 are cleared 1612 and their contents are appended to the content in the target cell 1604. Whitespace characters are added to the content of the participating cells as necessary before they are appended together.

In various embodiments a plurality of cells on a plurality of rows and columns may be selected for insertion into a target cell. In one embodiment, entire rows or columns may be selected for insertion into a target cell.

In various embodiments, the user may indicate that the content of the source cells should not be cleared as a result of the insertion operation. The user may hold down a specially designated key on the keyboard at the time of the drop to indicate that the content of the source cells are to be copied, not removed, as a result of the insertion operation.

Text

In one embodiment the user may edit the content of an individual cell directly by double clicking on it. In response, the cell is placed in edit mode and a boundary or other visual feedback is displayed to alert the user to that fact. The cursor is automatically placed in the text at the location of the mouse pointer when the double click was issued to simulate the placement of the cursor via mouse click when editing a document in a word processor.

Text—Move and Copy—FIG. 17

Figure 17A:
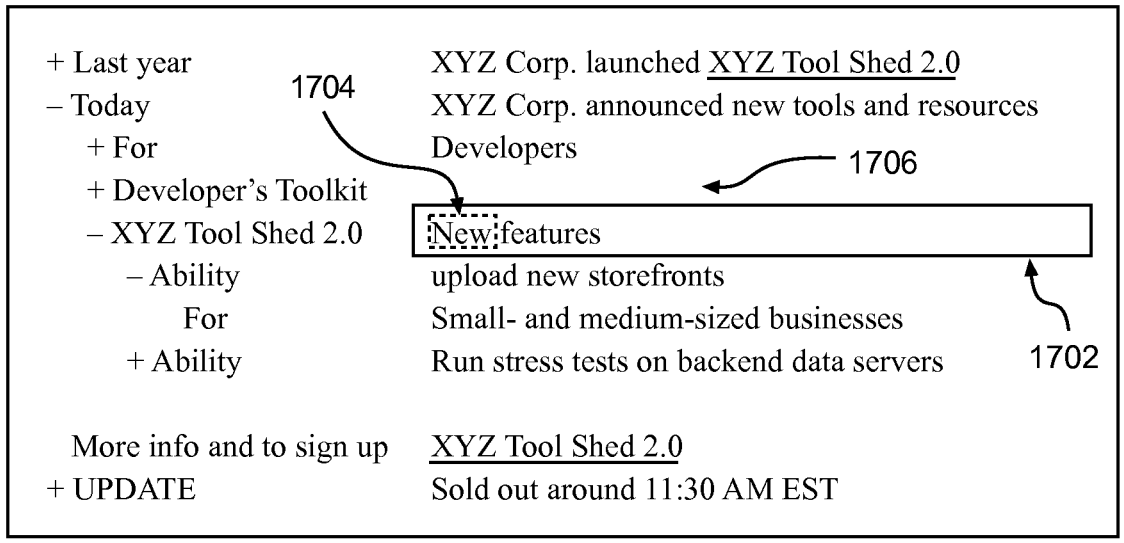
FIG. 17A and FIG. 17B illustrate a scenario where text from a cell is extracted and placed in another cell.
Figure 17B:
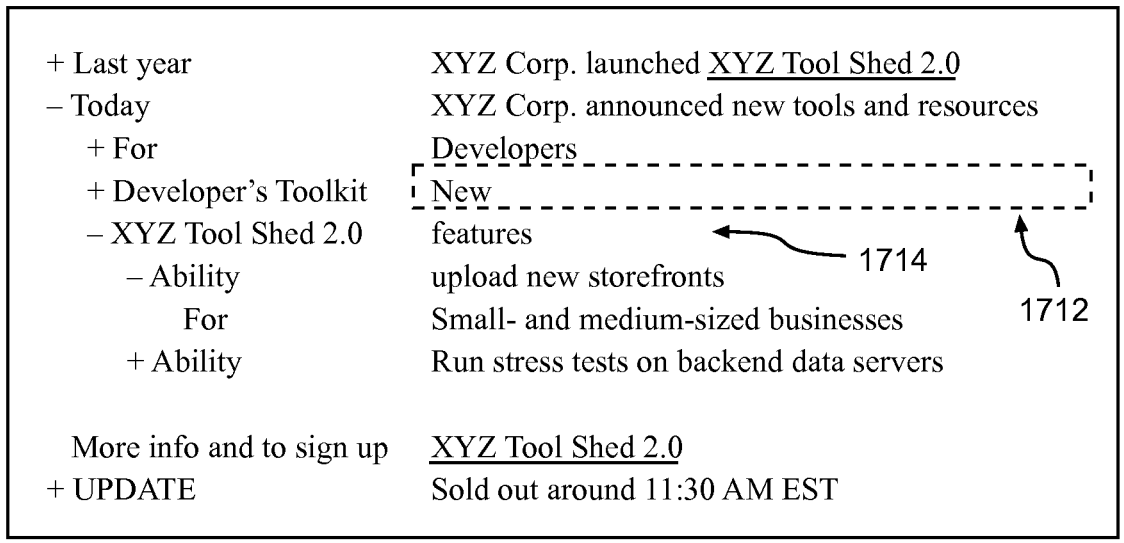

FIG. 17A is an exemplary embodiment where a cell 1702 is placed in edit mode and a portion of its content is selected 1704. In this exemplary scenario, the user drags the selected text 1704 and drops it on another cell 1706. FIG. 17B illustrates the result of this operation. The selected text 1704 is removed from the source cell 1702 and is copied to the target cell 1712. As a result, the content of the target cell is replaced with the dragged text. The source cell 1702 is taken out of edit mode 1714 and the target cell is selected 1712 to provide visual feedback to the user.

The following is an exemplary sequence of events following the drop command
1. The target cell's content is replaced with the selected text.
2. If the operation is a move (as opposed to a copy operation), the selected text is removed from the original cell.

Text—Row/Column Insertion—FIG. 18

Figure 18A:
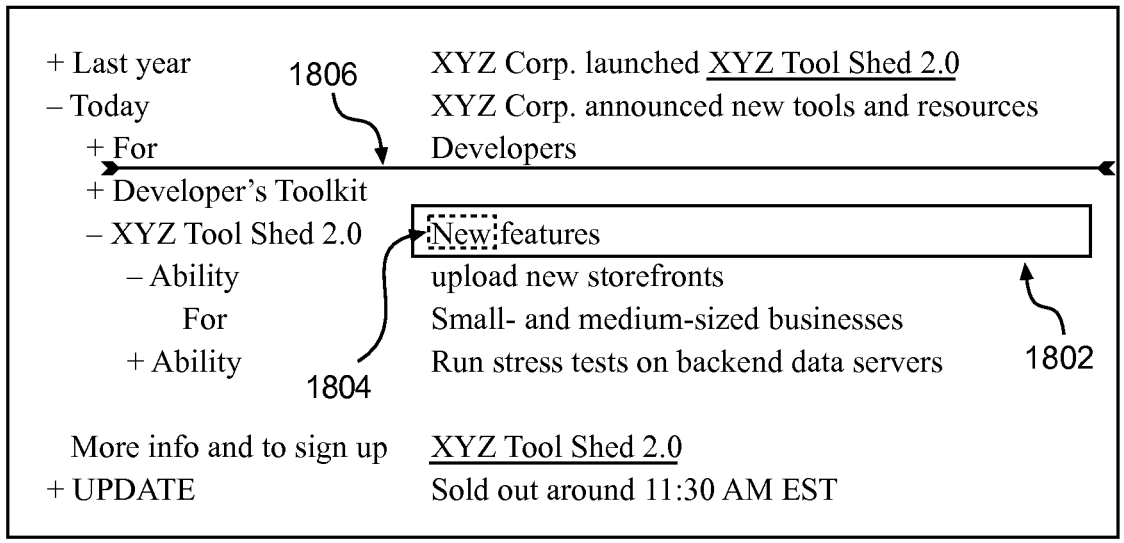
Figure 18B:
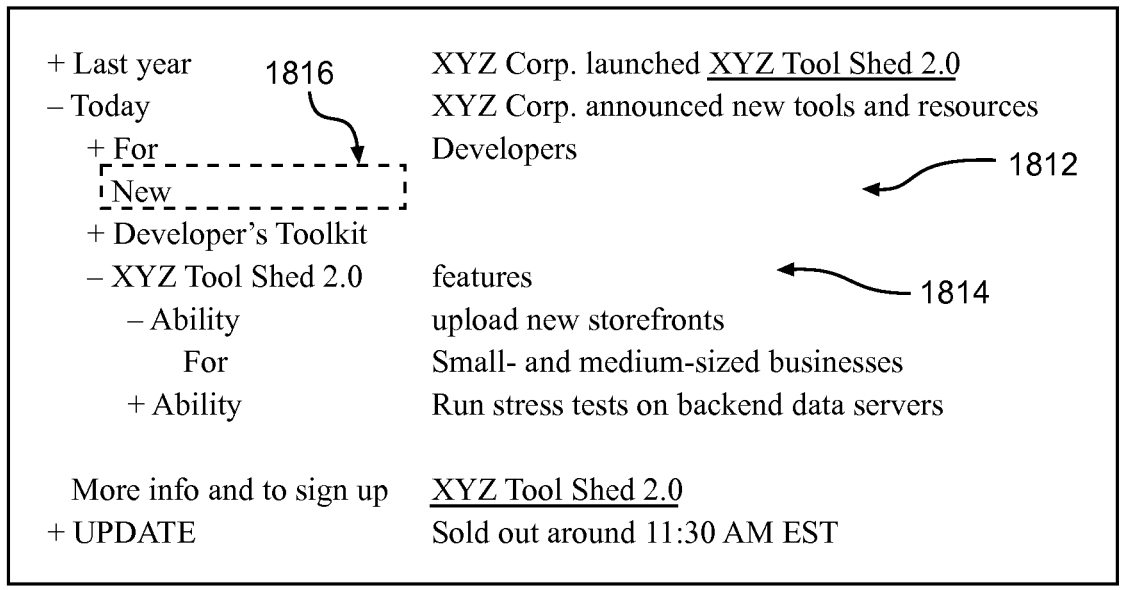

Dragging and dropping text may result in the insertion of new rows and columns, in a manner similar to that described in connection with cell operations above. FIG. 18A is an exemplary embodiment where a cell 1802 has been placed in edit mode and a portion of its content has been selected 1804. In this exemplary scenario, the user has dragged the selected text 1804 to within a threshold region of a target row. As a result, a line 1806 is displayed on the corresponding boundary of the target row to provide visual feedback to the user. FIG. 18B illustrates what happens if a drop is performed at this point. A new row 1812 is inserted at the position indicated by the line 1806 and the selected text 1804 is removed from the source cell 1802 and is copied to the target cell 1816. The source cell 1802 is taken out of edit mode 1814 and the target cell is selected 1816 to provide visual feedback.

FIG. 18B illustrates the result of the drop operation if the mouse pointer is positioned over the left column at the time of the drop. In that case, the cell 1816 in the left column of the newly inserted row 1812 is chosen as the target cell. If the mouse pointer had been positioned over the right column at the time of the drop, the cell in the right column of the newly inserted row 1812 would have been chosen as the target cell 1822 (FIG. 18C).

In one embodiment, dragging and dropping text is treated in a manner analogous to dragging and dropping a cell. For example, an individual cell, rather than a row, may be inserted in a column in a manner analogous to the exemplary scenarios discussed in connection with FIGS. 10 and 11. Similarly, a new row may be inserted as a child under a target row in a manner analogous to the exemplary scenario discussed in connection with FIG. 13. The operations are similar and are therefore not repeated here.

Text—Insertion—FIG. 19

Figure 19A:
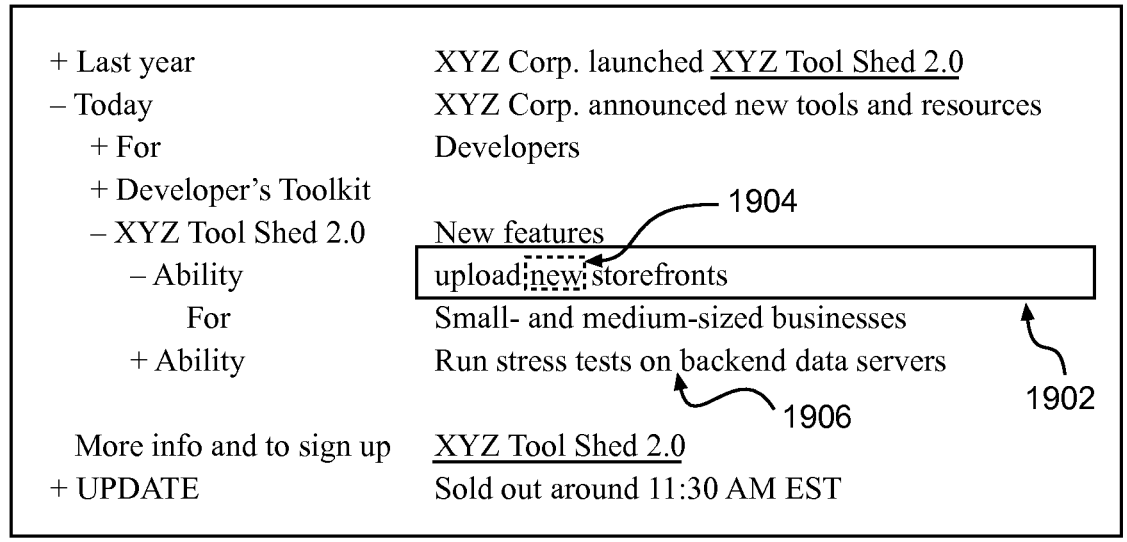
FIG. 19A-FIG. 19D illustrate scenarios where text from a cell is extracted and inserted into another cell.
Figure 19B:
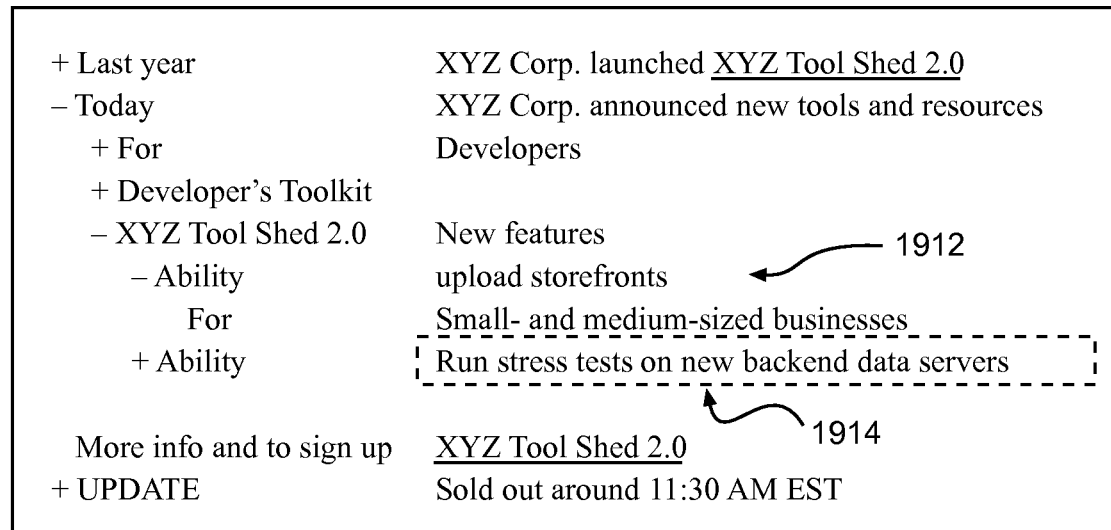

In one embodiment, dragged text may be inserted into the target cell, rather than replacing it's content completely. FIG. 19A is an exemplary embodiment where a cell 1902 is placed in edit mode and a portion of its content has been selected 1904. In this exemplary scenario, the user drags the selected text 1904 to a target cell 1906. The user places the mouse pointer at the point 1906 where the text is to be inserted and while pressing a specially designated key on the keyboard, performs the drop. The specially designated key on the keyboard is a means of specifying that the dragged content is to be inserted into, rather than replace, the content of the target cell. FIG. 19B illustrates the result. The selected text 1904 is removed from the source cell 1902 and is inserted into the target cell at the specified position 1914. The source cell 1902 exits edit mode 1912 and the target cell is selected 1914 to provide visual feedback to the user.

The following is an exemplary sequence of events following the drop command
1. The selected text 1904 is inserted into the target cell at the location under the mouse pointer at the time of the drop 1906.
2. If the operation is a move (as opposed to a copy operation), the selected text 1904 is removed from the original cell 1902.

Figure 19C:
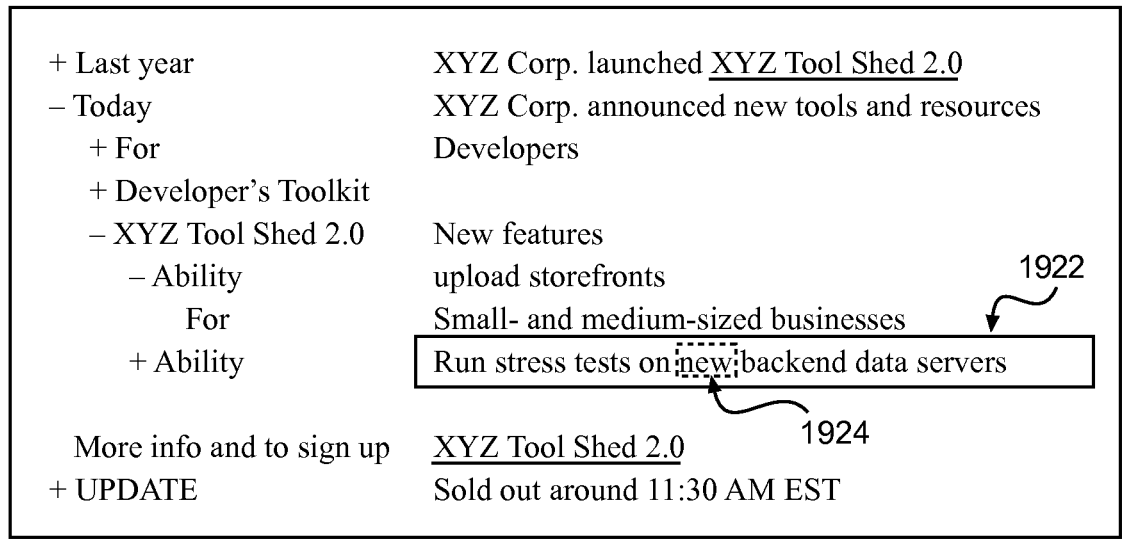
Figure 19D:
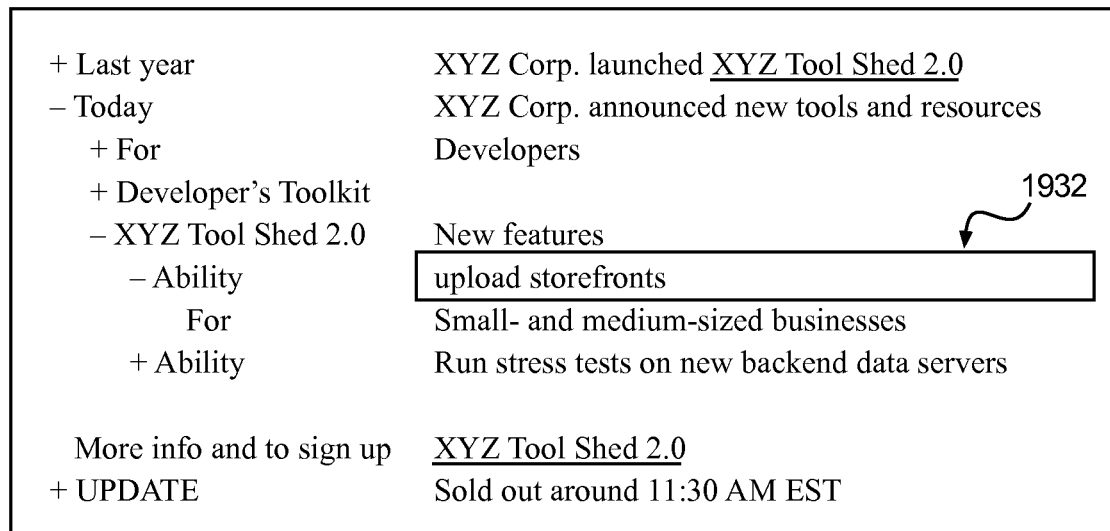

FIG. 19C is an exemplary embodiment where after the drop operation has been performed, the target cell 1914 is placed in edit mode 1922 and the newly inserted text is selected 1924 to simulate the drag and drop behavior in a word processor. FIG. 19D illustrates an alternative embodiment where the source cell 1902 remains in edit mode 1932 after the drop operation has been performed to facilitate further extraction of content from it.

Text—Edit Mode

In one embodiment, performing drag and drop on partial cell content as described above in connection with FIGS. 17-19 does not require that the source cell be in edit mode. The partial content that is to be dragged may be specified by dragging the mouse pointer over it while pressing a specially designated key on the keyboard. The text under the path of the mouse pointer as it is being dragged is highlighted to provide visual feedback to the user. Once highlighted, the partial content may then be dragged to the target area in the usual way. The embodiment may require the user to press a specially designated key on the keyboard as the highlighted content is being dragged to distinguish it from dragging the entire cell.

The following is an exemplary sequence of events in this scenario
1. The source cell is not in edit mode.
2. The user drags the mouse over the desired area of the cell while pressing a specially designated key on the keyboard. The text under the mouse pointer as it is being dragged is highlighted to provide visual feedback to the user.
3. The user completes the drag by releasing the mouse button and the specially designated key on the keyboard. The desired content is now highlighted and ready for the next operation. The underlying cell is still not in edit mode.
4. The user places the mouse pointer over the highlighted text and, while pressing a specially designated key on the keyboard, drags the mouse pointer to the desired target location.
5. The user performs a drop by releasing the mouse button and the specially designated key on the keyboard. The highlighted text is inserted at the location under the mouse pointer at the time of the drop and the newly inserted text is highlighted. The target cell being modified is not in edit mode.

Text—Misc. Sources and Targets—FIG. 20

Although in the illustrative embodiments of FIGS. 17-19 the selected text or partial cell content is dragged from a source and dropped on a target in the same document, various embodiments allow the source or target of the drag and drop operations to be in different documents, GUI widgets, or applications.

FIG. 20A illustrates an exemplary embodiment comprising a block display area 2000 and a structured display area 2002. The block display area 2000 presents a block of traditional text, such as the full article presented in FIG. 1. The structured display are 2002 presents a hierarchical document, which is currently blank. A portion of the content in the block display area 2000 has been selected 2004.

FIG. 20B illustrates the result of a drag and drop operation in accordance with one embodiment. The selected text 2004 has been dragged from the block display area 2000 and dropped on the right column of the first row 2012 of the structured display area 2002. As a result, the selected text 2004 has been copied to the target cell 2012 in the target display area 2002. The target cell is selected 2012 to provide visual feedback to the user. The selected text 2004 in the source display area 2000 is removed 2014 and replaced by an empty area 2014 to preserve the visual layout of the source text block. The selected area 2004 remains selected 2014 to provide visual feedback to the user. The block display area 2000 remains in edit mode to facilitate further extraction of content from it.

In one embodiment, the selected text 2004 in the source display area 2000 is replaced with whitespace characters 2014 to preserve the visual layout of the source text block. Alternatively, in another embodiment, the selected text 2004 in the source display area 2000 is not removed or replaced as a result of the drag operation, but simply displayed in the same color as the background of the source display area to hide the dragged text 2014. Other strategies may be used to mark the selected text 2004 after the drag operation. In one embodiment, the background of the dragged text is shaded to provide visual feedback to the user.

Figure 20C:
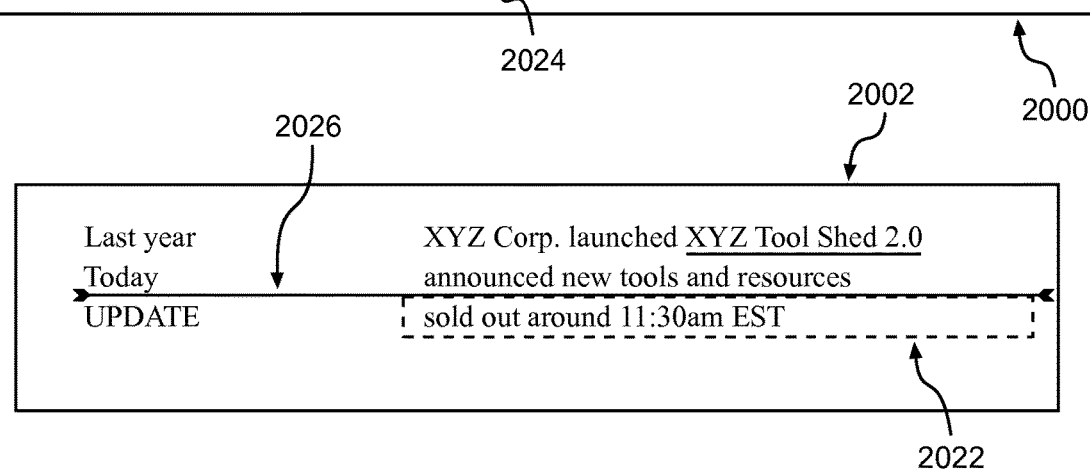

FIG. 20C illustrates the situation after a few more pieces of text have been removed from the block display area 2000 and added to the structured display area 2002. The last cell that was the target of a drop operation is still selected 2022. A portion of text in the block display area 2000 is now selected 2024 and dragged to the structured display area 2002. In the exemplary scenario of FIG. 20C, the mouse pointer is within a threshold distance at the top or bottom of a target row. As a result, a line 2026 is displayed to provide feedback to the user.

FIG. 20D illustrates what happens if the user performs a drop operation at this point. A new row 2032 is inserted in the structured display area 2002 and the selected text 2024 is removed 2034 from the block display area 2000 and replaced by an empty area 2034. The selected text 2024 is inserted into the left cell 2036 on the newly inserted row 2032. The target cell 2036 and the empty area 2034 are selected to provide visual feedback to the user.

FIG. 20D illustrates the result of the drop operation if the mouse pointer is positioned over the left column at the time of the drop. In that case, the cell in the left column of the newly inserted row 2032 is chosen as the target cell 2036. If the mouse pointer had been positioned over the right column at the time of the drop, the cell in the right column of the newly inserted row 2032 would have been chosen as the target cell.

In one embodiment, dragging and dropping text is treated in a manner analogous to dragging and dropping a cell. For example, an individual cell, rather than a row, may be inserted in a column in a manner analogous to the exemplary scenarios discussed in connection with FIGS. 10 and 11. Similarly, a new row may be inserted as a child row under a target row in a manner analogous to the exemplary scenario discussed in connection with FIG. 13. The operations are similar and are therefore not repeated here.

Figure 20E:
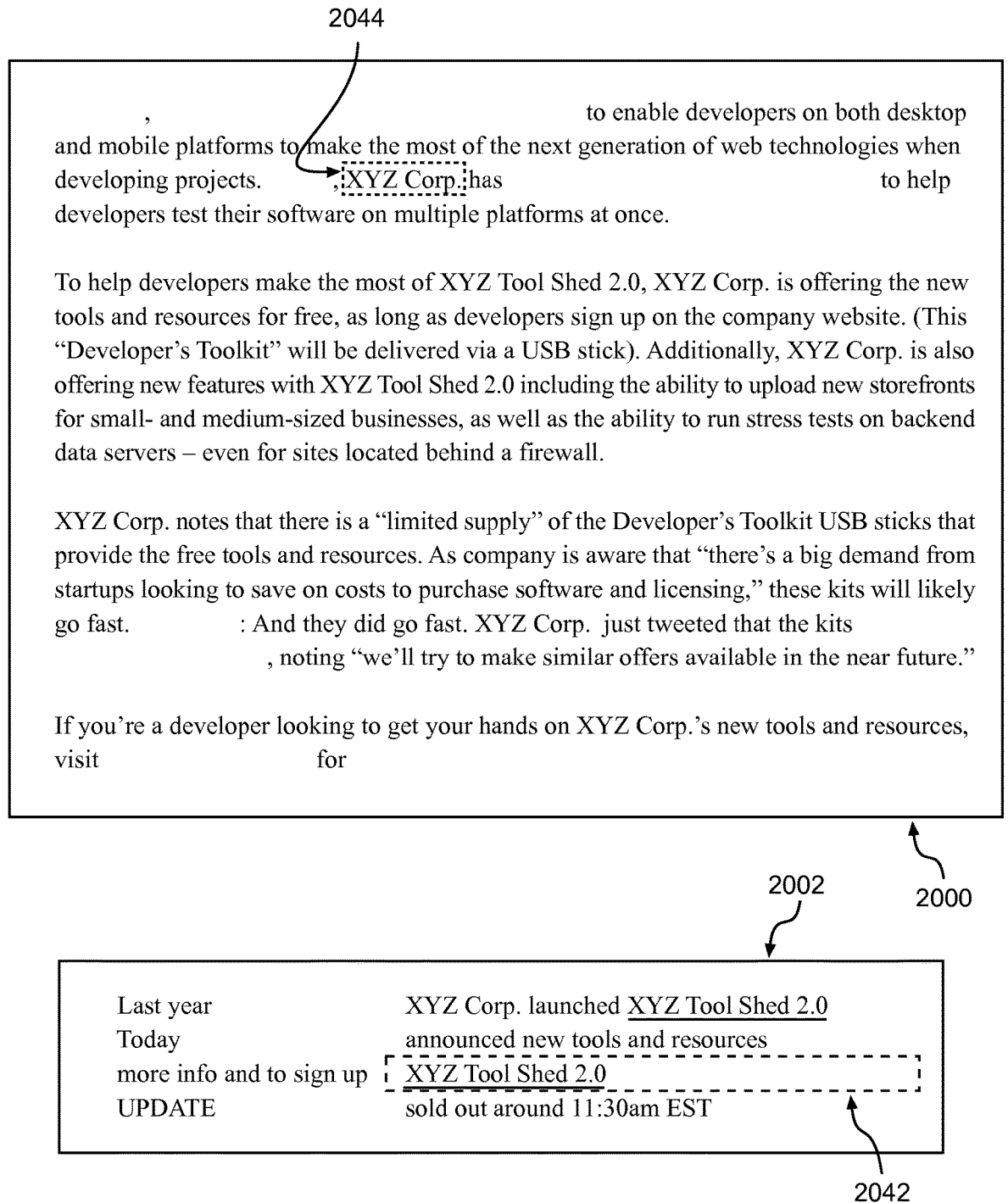

FIG. 20E illustrates the situation after another piece of text has been dragged from the block display area 2000 and dropped on a cell 2042 in the structured display area 2002. The target cell 2042 has been selected to provide visual feedback to the user. Another piece of text has been selected 2044 in the block display area.

FIG. 20F illustrates an exemplary scenario where the selected text 2044 is dragged to a target cell 2052 and inserted at the beginning. In one embodiment the user may press a specially designated key on the keyboard at the time of the drop to indicate that the selected text 2044 is to be inserted into the target cell 2052, rather than overwriting its content. The position of the mouse pointer at the time of the drop determines the insertion point. In the illustrative scenario of FIG. 20F, the mouse pointer was placed at the beginning of the target cell 2052 at the time of the drop. The selected text 2044 is replaced with an empty area 2054. The target cell 2052 and the empty area 2054 are selected to provide visual feedback to the user.

Figure 20G:
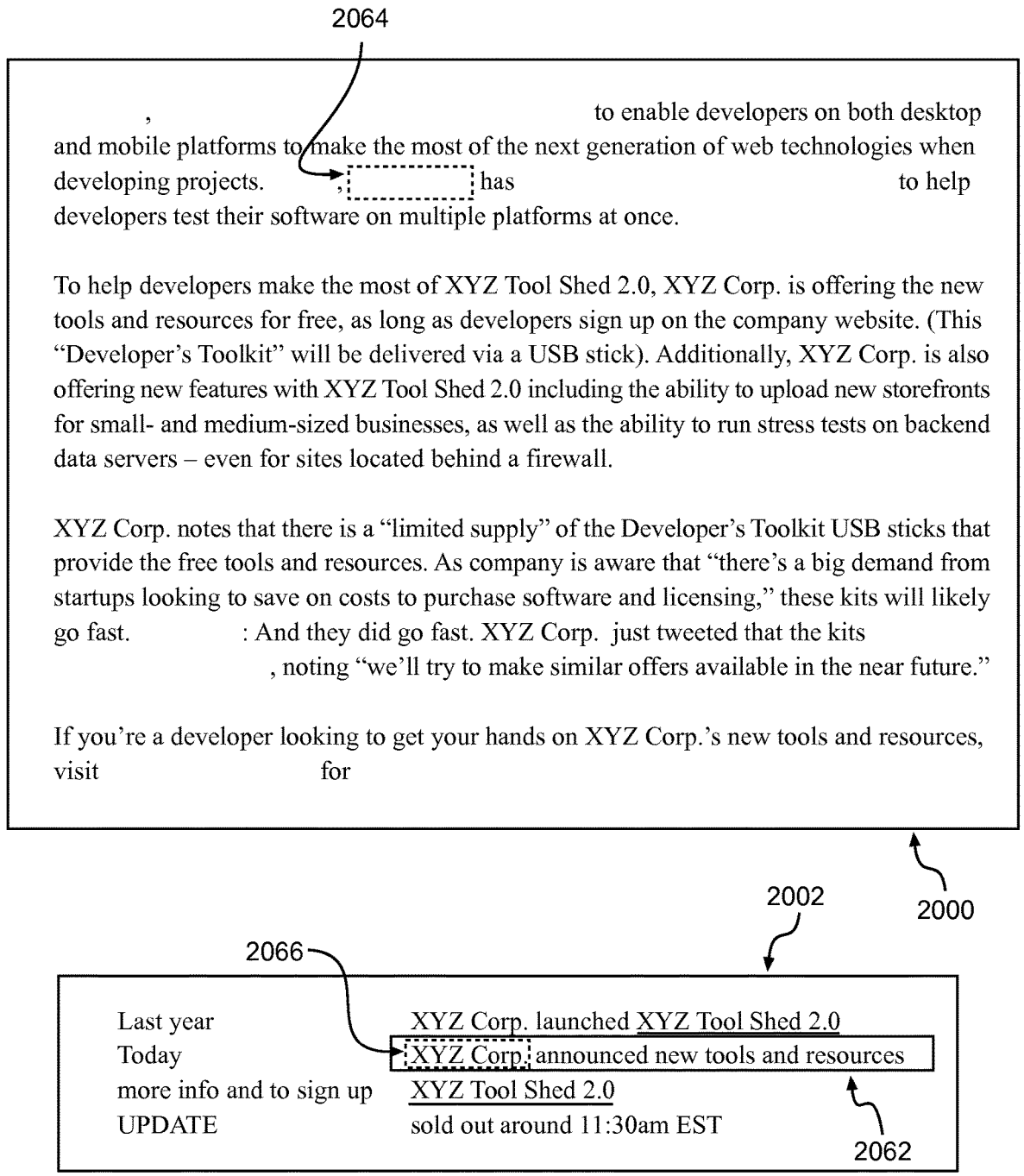

FIG. 20G illustrates an alternative embodiment to that illustrated in FIG. 20F. In the illustrative embodiment of FIG. 20G, at the end of the text insertion operation, the target cell 2062 is placed in edit mode and the newly inserted text is selected 2066.

Extraction Via Keyboard—FIG. 21

In various embodiments, editing the content of a cell via keyboard may result in the insertion of new rows or columns. For example, if while editing a cell the user presses carriage return or CR while simultaneously pressing a specially designated key such as the control key or CTRL, a new row may be inserted immediately below the current row.

The following is an exemplary sequence of events in this scenario in response to the user pressing CR while holding down CTRL, or CTRL+CR on the keyboard
1. The current cell exits edit mode.
2. A new row is inserted immediately below the row that was being edited.
3. A cell on the new row is placed in edit mode.

Figure 21A:
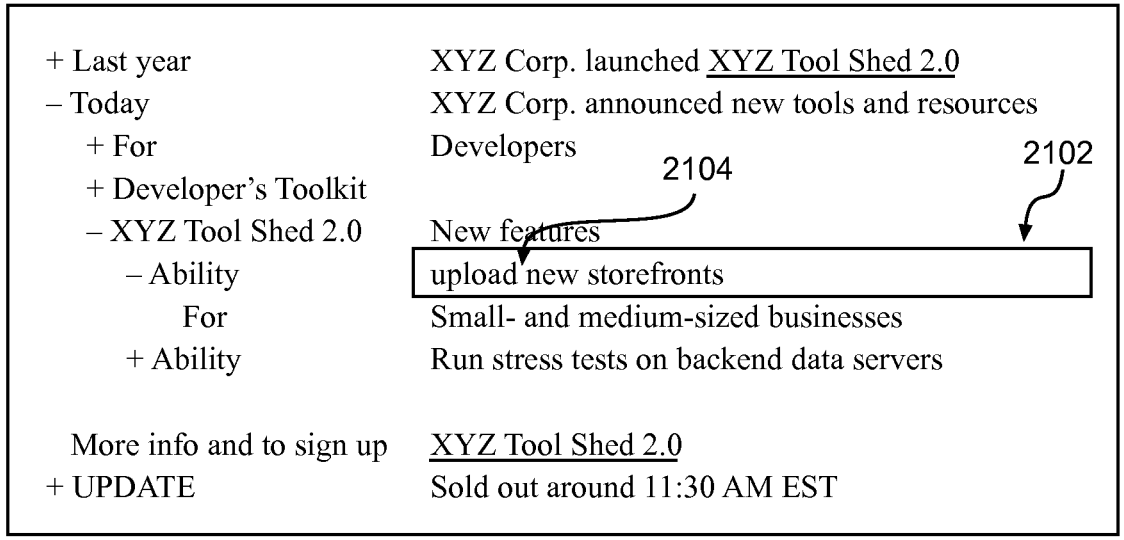
Figure 21B:
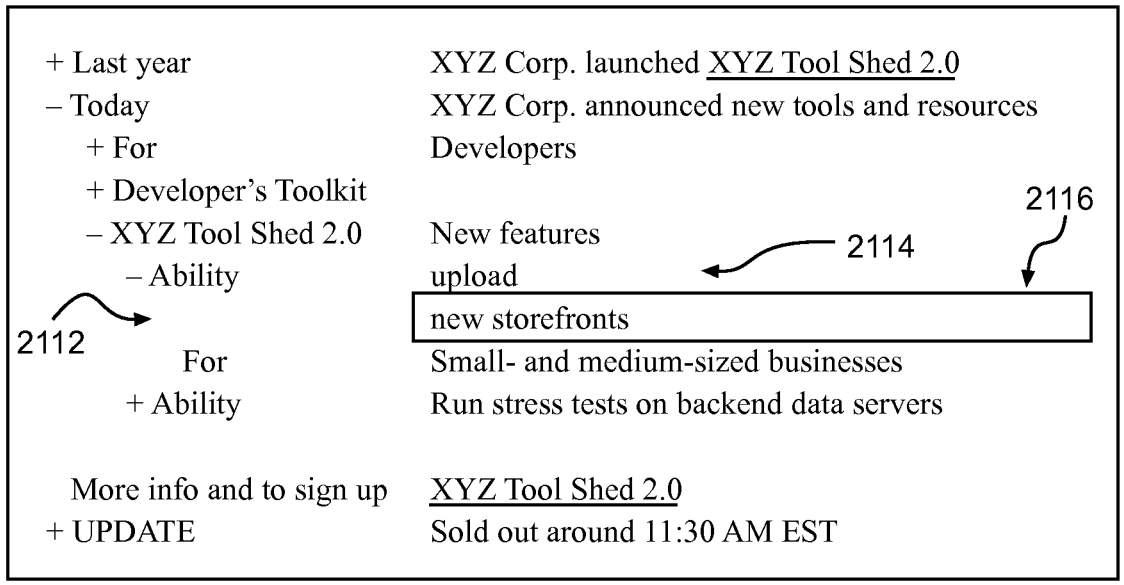

FIG. 21A is an exemplary embodiment where a cell 2102 is placed in edit mode and the cursor is placed somewhere in the middle of the text 2104. FIG. 21B illustrates the result if the user presses CTRL+CR at this point. A new row 2112 is inserted immediately below the row containing the cell 2102 that was being edited. The content of the cell 2102 that was being edited is split at the cursor position 2104 and the content to the right of the cursor is removed from the cell 2114 and moved to the cell 2116 immediately below it. The source cell 2102 exits edit mode 2114. The target cell 2116 enters edit mode and the cursor is placed at the beginning of its content.

Alternatively, in one embodiment, the user may select a portion of the text in a cell and issue a command such as CTRL+CR from the keyboard to extract the selected text to a different cell. In this scenario, it is the selected text, rather than the text to one side of the cursor, that is extracted.

In the interest of clarity, the following description proceeds in terms of splitting the text in a cell at the position of the cursor. It is to be understood however that analogous operations are possible where the portion of the text to be extracted is determined via selection rather than the position of the cursor. For example, the user may select a portion of the text in a cell and then press a specially designated key or key combination on the keyboard to extract the selected text.

Other or additional specially designated keys on the keyboard may be pressed while issuing a CR to specify which cell should receive the extracted text.

FIG. 21C illustrates the result of an exemplary scenario where the user has pressed the key combination SHIFT+CTRL+CR on the keyboard in FIG. 21A. The content of the source cell 2102 is split at the cursor position 2104 and the content to the right of the cursor is removed from the cell 2122 as before, but moved to the first cell 2124 on the newly inserted row.

Figure 21D:
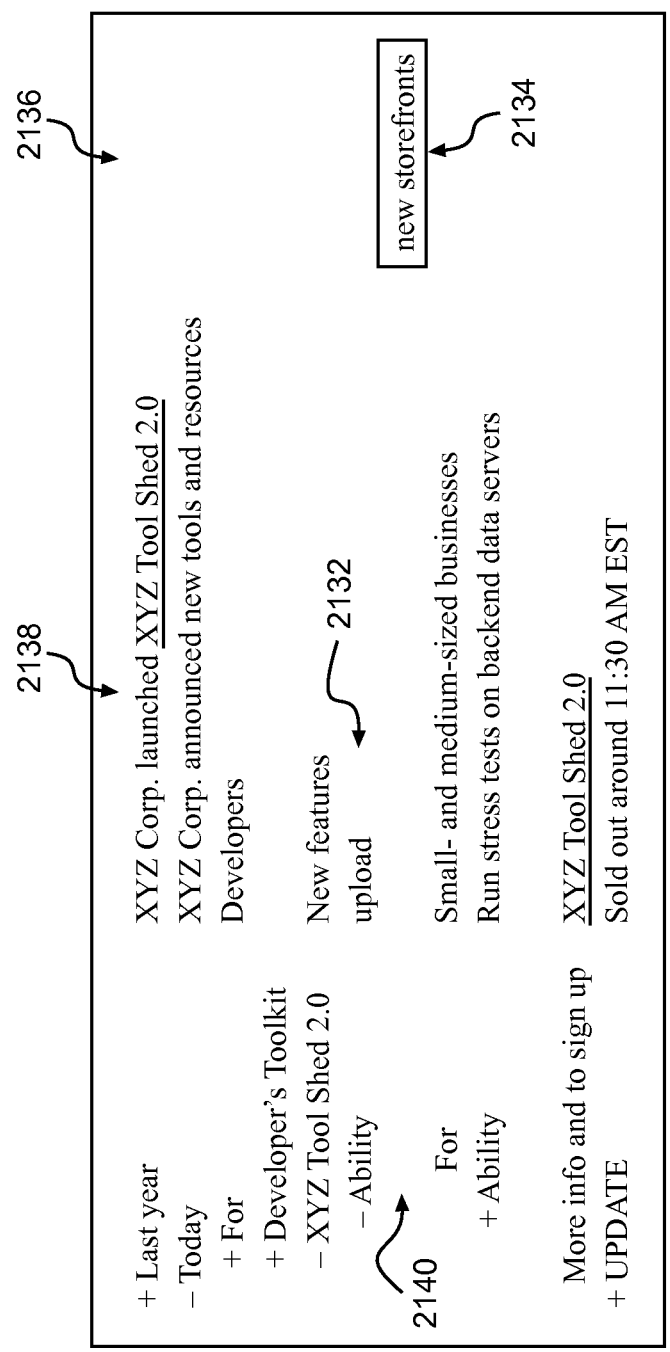

FIG. 21D illustrates the result of an exemplary scenario where the user has pressed the key combination ALT+CTRL+CR on the keyboard in FIG. 21A. The content of the source cell 2102 is split at the cursor position 2104 and the content to the right of the cursor is removed from the cell 2132 as before, but moved to the cell 2134 on the next column 2136 to the right of the source column 2138 on the newly inserted row 2140. A column 2136 is inserted to the right of the source column 2138 if necessary to accommodate the operation.

Figure 21E:
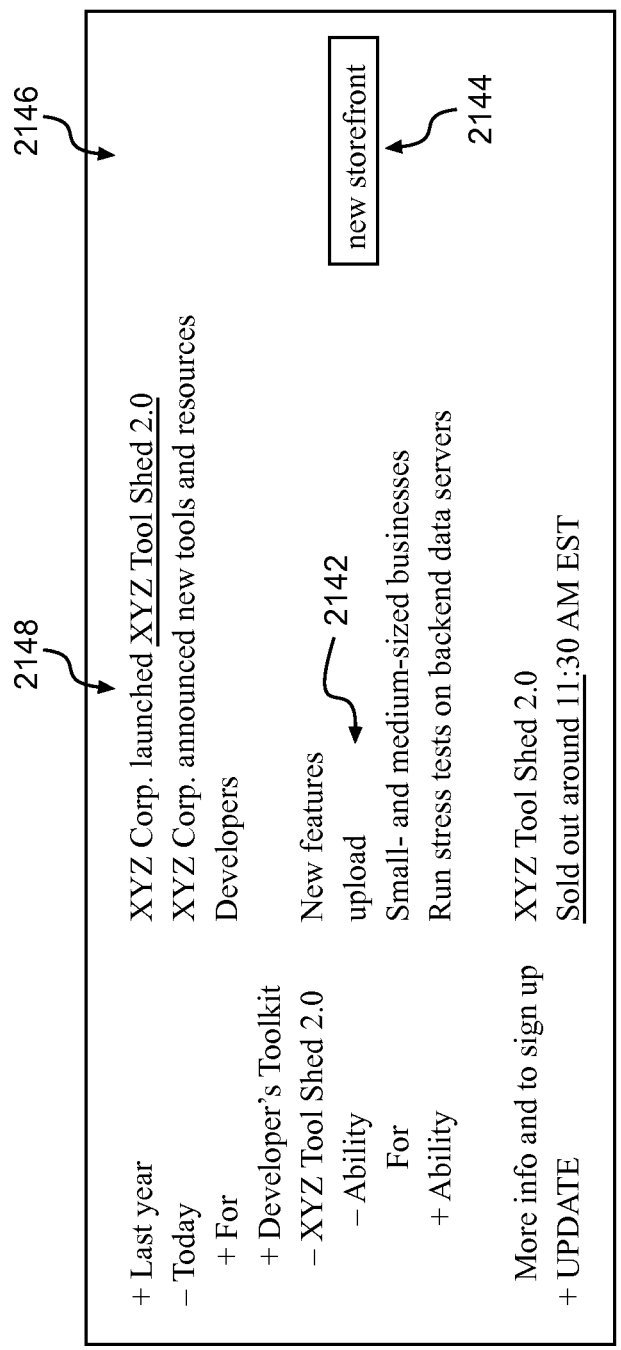

FIG. 21E illustrates the result of an exemplary scenario where the user has pressed the key combination ALT+CR on the keyboard in FIG. 21A. No new rows are inserted in this scenario. The content of the source cell 2102 is split at the cursor position 2104 and the content to the right of the cursor is removed from the cell 2142 as before, but moved to the cell 2144 on the next column 2146 to the right of the source column 2148. A column 2146 is inserted to the right of the source column 2148 if necessary to accommodate the operation.

The above description is illustrative only and is not intended to be in any way limiting. Various other embodiments are possible. For example, embodiments may use different commands or key combinations; may insert rows above the row containing the source cell; may insert columns to the left of the column containing the source cell; may extract the portion of the text that lies to the left of the cursor; may extract a portion of the text that is selected.

Extraction Via Keyboard—New Row Placement—FIG. 22

In the illustrative scenario of FIGS. 21A and 21B, the cell 2102 that is being edited resides on a row that is expanded to show its child rows. When the keyboard command is issued, a new row 2112 is inserted as the first child of the row containing the source cell 2102. This causes the newly inserted row 2112 to appear immediately below the row containing the source cell 2102 on the display.

FIG. 22A illustrates a different scenario, where a cell 2202 is placed in edit mode and the cursor is placed somewhere in the middle of the text 2204. The cell 2202 that is being edited resides on a row that does not have any children 2206. FIG. 22B illustrates the result if the user presses CTRL+CR at this point. A new row 2212 is inserted as a sibling, rather than a child, of the row 2206 containing the source cell 2202. This causes the newly inserted row 2212 to appear immediately below the row 2206 containing the source cell 2202 on the display. The row 2206 containing the source cell 2202 still has no children 2214.

The remainder of the operation proceeds in a manner similar to that illustrated in connection with FIG. 21B. The content of the source cell 2202 is split at the cursor position 2204 and the content to the right of the cursor is removed from the cell 2216 and moved to the cell 2218 immediately below it. The source cell 2202 exits edit mode 2216. The target cell 2218 enters edit mode and the cursor is placed at the beginning of its content.

The following is an exemplary sequence of events in accordance with one embodiment
1. The user issues CTRL+CR while editing a cell in row R.
2. If row R is in expanded state (i.e., row R has children and its children are visible on the user interface), insert a new row as the first child of row R; otherwise, insert the new row as a sibling of row R immediately after row R.
3. The new row visually appears immediately below row R on the display.

Keyboard Shortcuts

In various embodiments, similar keyboard shortcuts are provided for row, cell and text operations to help provide the user with a more uniform editing experience.

Keyboard Shortcuts—New Line

In one embodiment, if at the time CTRL+CR is issued one or more cells are selected, but none is in edit mode,
1. A new row is inserted immediately below the row containing the lowest selected cell on the display.
2. The cell immediately below the lowest selected cell is placed in edit mode. If more than one cell are selected on the last row, the cell immediately below the leftmost selected cell on the last row may be placed in edit mode.

In one embodiment, if at the time CTRL+CR is issued one or more rows are selected,
1. A new row is inserted immediately below the lowest selected row on the display.
2. The leftmost cell in the newly inserted row is placed in edit mode.

In one embodiment, if at the time CTRL+CR is issued no rows or cells are selected and no cell is in edit mode,
1. A new row may be inserted at the beginning of the document, at the end, or at the top or bottom of the visible area on the display.
2. The leftmost cell in the new line is placed in edit mode.

Keyboard Shortcuts—Delete

In one embodiment, pressing DELETE results in the deletion of the contents of any cells that are selected. If rows are selected, pressing DELETE may result in the deletion of the contents of all the cells on the selected rows. The rows themselves are not deleted.

In one embodiment, pressing CTRL+DELETE results in the deletion of entire rows. The rows that are to be deleted may be specified as follows
Rows may be selected
Cells on desired rows may be selected
A cell on a desired row may be in edit mode.

In one embodiment, pressing ALT+DELETE results in the deletion of entire columns. The columns that are to be deleted may be specified as follows
Cells on desired columns may be selected
A cell on a desired column may be in edit mode

Keyboard Shortcuts—Restructuring Rows

In one embodiment, specially designated key combinations may be used to restructure hierarchies. The row or rows that are to be restructured may be specified as follows
Rows may be selected
Cells on desired rows may be selected
A cell on a desired row may be in edit mode.

In one embodiment, when the user presses CTRL+TAB, the specified rows are repositioned in the hierarchy as children of the nearest unselected row preceding them. If a cell on a row was in edit mode at the time CTRL+TAB was issued, the cell remains in edit mode after the restructuring operation.

In one embodiment, pressing SHIFT+CTRL+TAB results in the reverse of the above process. The specified rows are repositioned in the hierarchy as the siblings of the row that was their parent at the time the command was issued.

Keyboard Shortcuts—Cell Traversal

In various embodiments the user may move the cursor from one cell to another while the cell is in edit mode by holding down a modifier key (e.g., CTRL or ALT) while pressing the arrow keys. For example, in one embodiment, pressing CTRL+ARROW_UP (or CTRL+ARROW_DOWN) while editing a cell would result in the following sequence
1. The editing in the current cell is completed.
2. The cell immediately above (or below) goes into edit mode.
3. The cursor is placed at the same position in the cell as it was in the previous cell.

In one embodiment, pressing CTRL+ARROW_LEFT while editing a cell would result in the cell to the left going into edit mode, but the cursor is placed at the end. Pressing CTRL+ARROW_RIGHT while editing a cell would result in the cell to the right going into edit mode, and the cursor is placed at the beginning of the text.

Multi-Cell Editing—FIGS. 23, 24

Figures 23A, 23B:
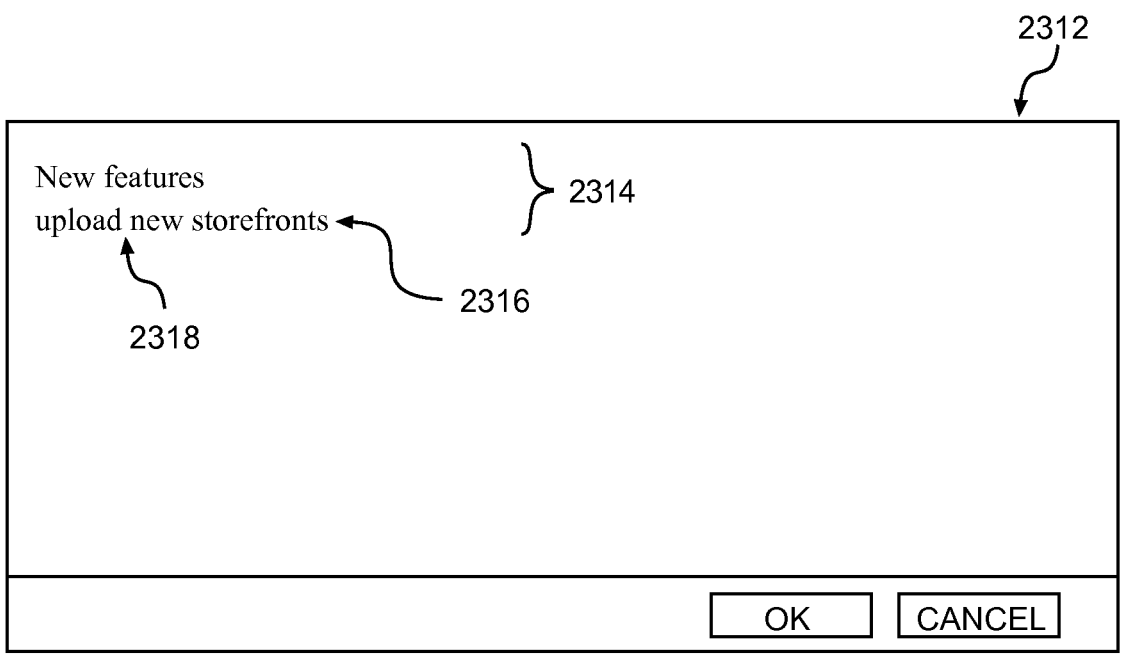
FIG. 23A-FIG. 23D illustrate a multi-cell editing scenario.

FIG. 23A is an exemplary embodiment where a plurality of cells has been selected 2302. The user may edit the selected cells 2302 together in a single text editor. The text editor may be displayed to the user via a command, such as pressing a menu item.

Figure 23C:
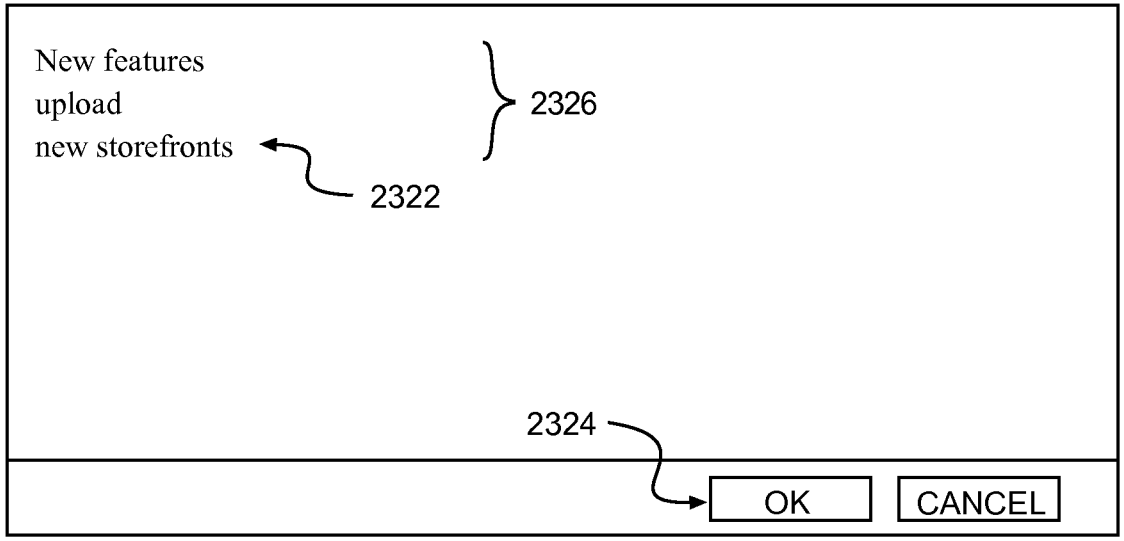

FIG. 23B illustrates a text editor widget 2312 displaying the contents 2314 of the selected cells 2302. In the exemplary embodiment of FIG. 23B, the contents of the selected cells 2302 are separated from one another in the text editor 2312 via a carriage return. The user may split a line 2316 by placing the cursor at the desired position 2318 and pressing CR on the keyboard. FIG. 23C illustrates the result. The line 2316 is split at the position of the cursor 2318, and the content to the right of the cursor 2318 is moved to a new line 2322. When finished editing, the user may press the OK button 2324.

Figure 23D:
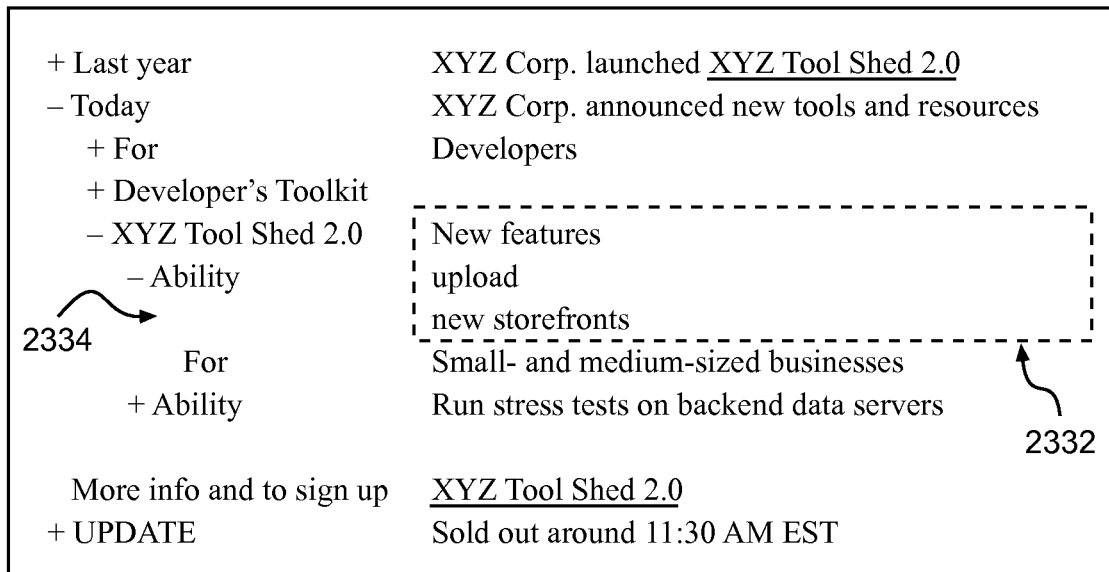

FIG. 23D illustrates the result of pressing the OK button 2324. The contents 2326 of the text editor are copied 2332 to the originally selected cells 2302. Each carriage return in the contents 2326 of the text editor is interpreted as the start of the content for a new cell. If more cells are needed to accommodate the content post edit, the selected region 2302 is expanded 2332 by creating new rows 2334. In the illustrative scenario of FIG. 23A, only two cells were selected 2302. But three cells are needed to accommodate the content 2326 in the text editor of FIG. 23C. As a result, a new row 2334 is inserted immediately below the selection range 2302 to accommodate the additional content 2322.

Figure 24A:
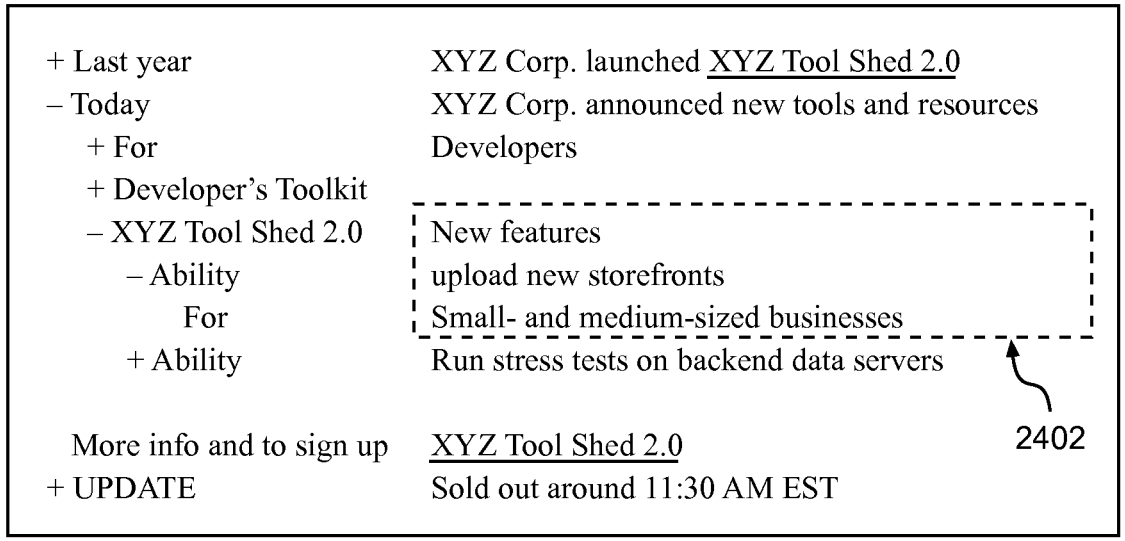
FIG. 24A-FIG. 24D illustrate another example of multi-cell editing.
Figure 24B:
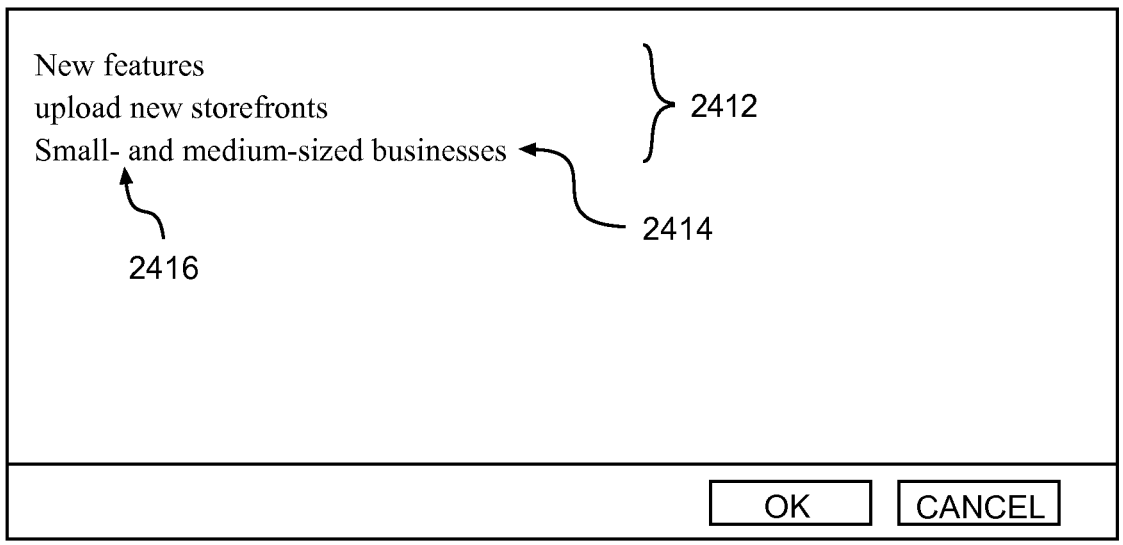

FIG. 24A is an alternative scenario where a plurality of cells has been selected 2402. The user then issues a command to view and edit the selected cells 2402 together in a single text editor. FIG. 24B illustrates a text editor widget displayed in response to the user command. The text editor displays the contents 2412 of the selected cells 2402. The user may split a line 2414 by placing the cursor at the desired position 2416 and pressing CR on the keyboard.

The user may further edit the text in the text editor in the usual way, including adding and removing text and lines. The user may combine the contents of cells by deleting the carriage return that separates them.

Figure 24C:
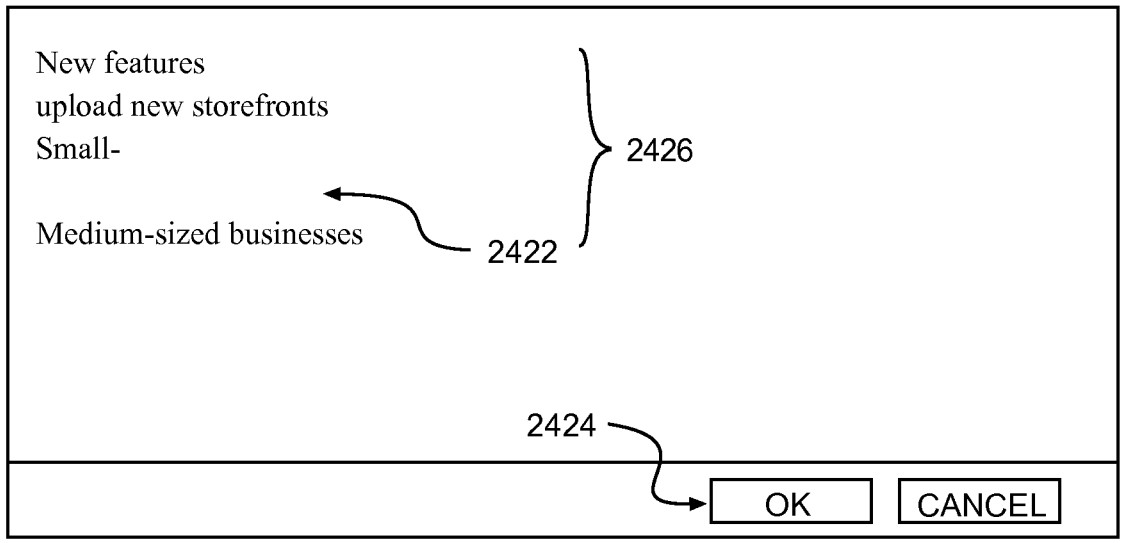
Figure 24D:
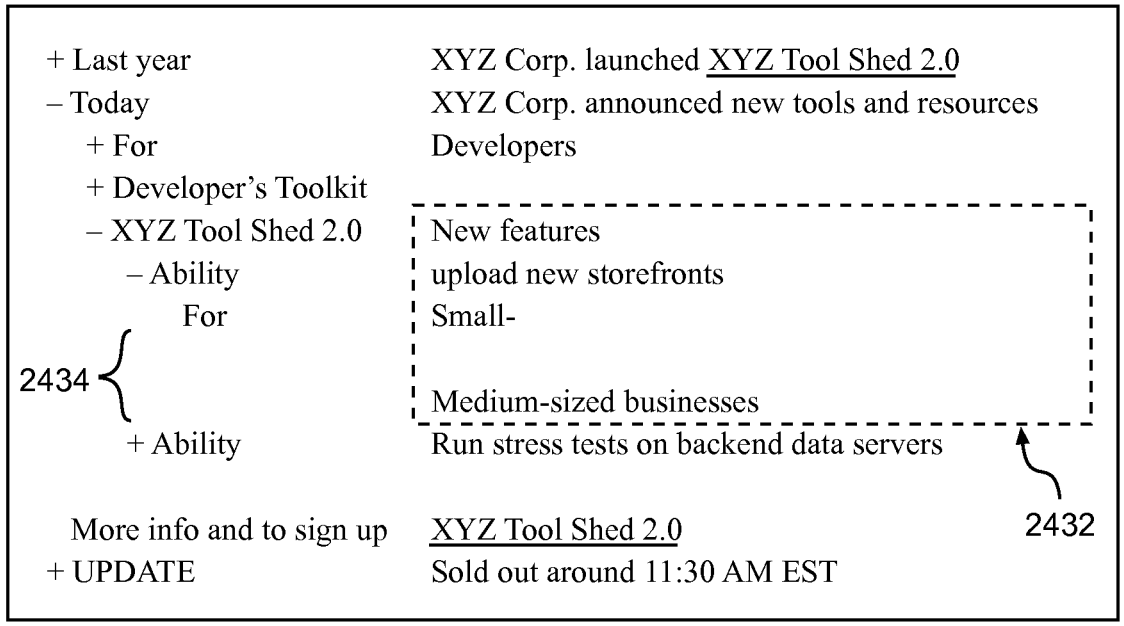

FIG. 24C illustrates the text editor after a few edits, including the addition of a blank line 2422. When finished editing, the user may press the OK button 2424. FIG. 24D illustrates the result. The contents 2426 of the text editor are copied 2432 to the originally selected cells 2402. Each carriage return in the contents 2426 of the text editor is interpreted as the start of the content for a new cell. To accommodate the content post edit, the selected region 2402 is expanded 2432 by creating new rows 2434.

Multi-Cell Editing—New Rows

In the illustrative scenario of FIGS. 23A-D, the last selected cell 2302 resides on a row that is expanded to show its child rows. The new row 2334 is inserted as the first child of the row containing the last selected cell 2302. This causes the newly inserted row 2334 to appear immediately below the row that contained the last selected cell 2302 on the display.

In an alternative scenario illustrated in FIGS. 24A-D, the last selected cell 2402 resides on a row that does not have any children. The new rows 2434 are inserted as siblings, rather than children, of the row that contained the last selected cell 2402 on the display. This causes the newly inserted rows 2434 to appear immediately below the row that contained the last selected cell 2402 on the display.

In one embodiment, the row-insertion process in multi-cell editing is analogous to the row-insertion process discussed in connection with FIGS. 21 and 22. The following summarizes the process in accordance with one embodiment:

To insert a new row in such a way that it appears immediately below a row R on the display at the time of insertion, do
If row R is in expanded state (i.e., row R has children and it's children are visible on the user interface), insert the new row as the first child of row R; otherwise, insert the new row as a sibling of row R immediately after row R.

Multi-Cell Editing—Delimiters

In the exemplary embodiments of FIGS. 23 and 24, CR was used as delimiter to separate the content of cells in the text editor widget 2312. In various embodiments, other characters or sequences of characters may be used for that purpose. Different characters may be used to separate the content of cells along columns and rows. For example, to separate the content of cells in a selection spanning multiple columns and rows, tabs may be used to separate the content of cells on a row, and CR may be used to separate rows.

Multi-Cell Editing—Block Input—FIG. 25

Figures 25A, 25B:
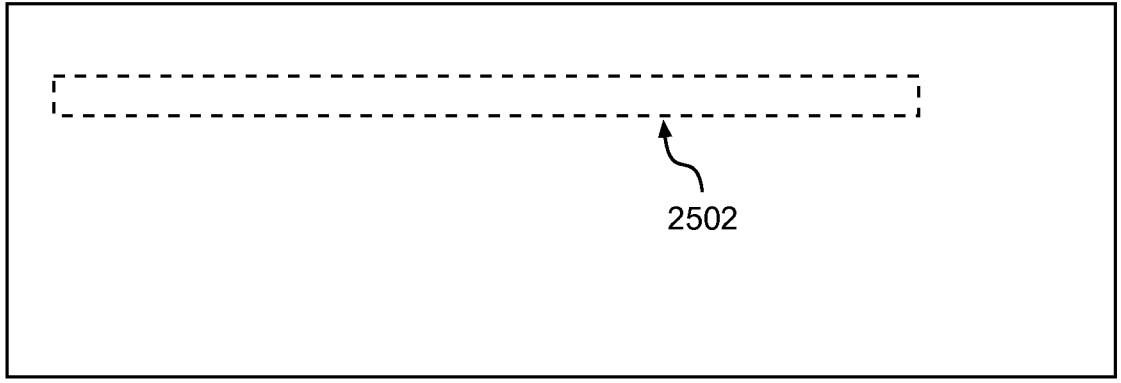
FIG. 25A-FIG. 25D illustrate an exemplary scenario where multi-cell editing is automatically invoked as a result of importing content from an outside source, e.g., via drag and drop.

In various embodiments, a block of text may be copied or dragged from another application, GUI widget, or display area and pasted or dropped on a structured document. FIG. 25A is an exemplary scenario in accordance with one embodiment. In this illustrative scenario, the user has copied the first paragraph of the article depicted in FIG. 1 to the system clipboard and wants to paste it to a blank structured document. The first cell on the second row of the structured document has been selected 2502 as the target of the paste operation.

FIG. 25B illustrates the result of the paste operation in accordance with one embodiment. The content to be pasted is first displayed to the user in a text editor. The sequence of characters is too long to fit on a single line; hence, it is wrapped, spanning multiple lines in the text editor. There are no carriage returns in the sequence of characters, so, if the user were to press OK at this point, the entire content would be copied into a single target cell 2502 in the structured document.

Figure 25C:
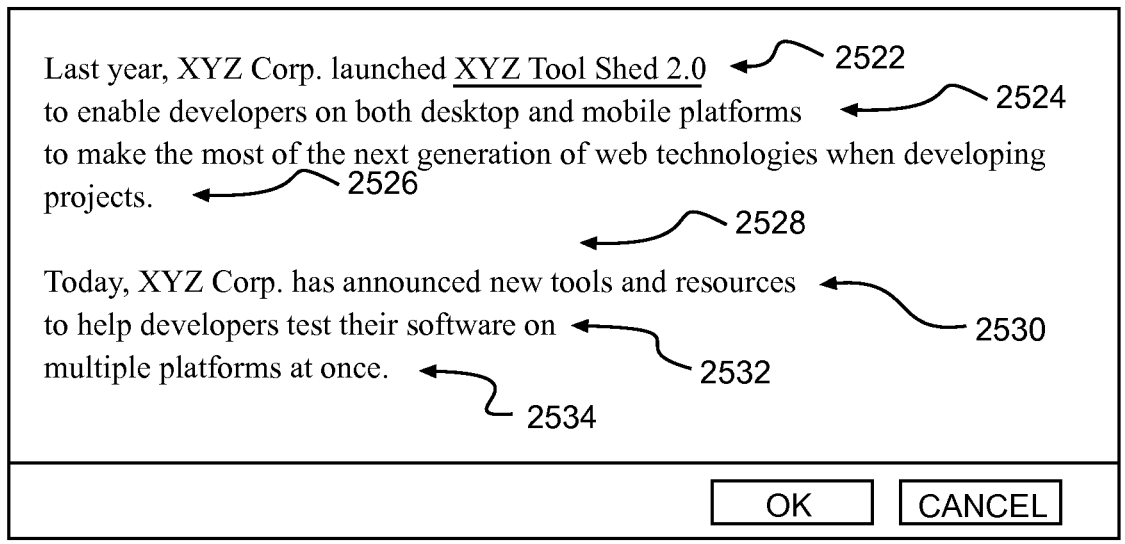

FIG. 25C illustrates the exemplary scenario after the user has split the content in several places via pressing CR on the keyboard. The text editor now contains three sequences of characters 2522, 2524, 2526, followed by a blank line 2528, followed by three more sequences of characters 2530, 2532, 2534. One of the character sequences 2526 is too long to fit on a single line; hence, it is wrapped.

Figure 25D:
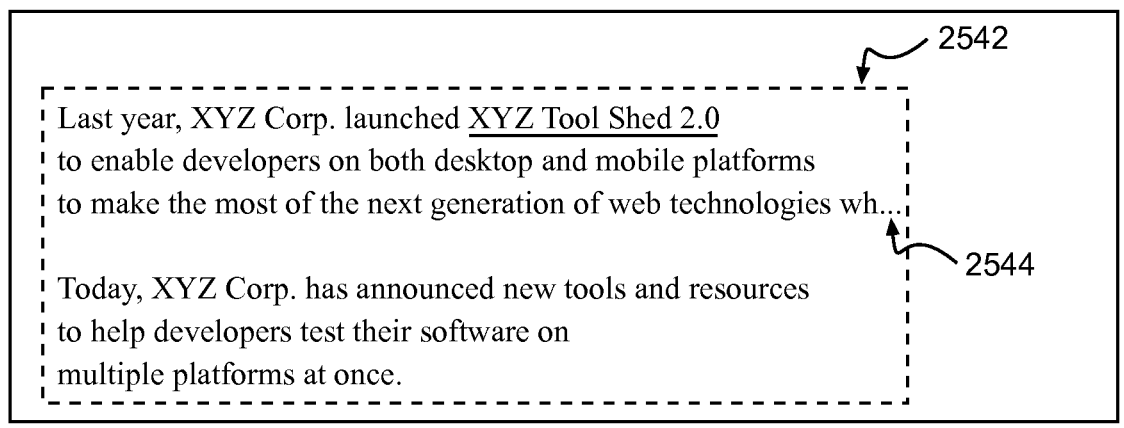

FIG. 25D illustrates the result if the user clicks OK at this point. The contents of the text editor are copied to the target selection 2502. Each carriage return in the contents of the text editor is interpreted as the start of the content for a new cell. To accommodate the content post edit, the selected region 2502 is expanded 2542 by creating new rows. In the exemplary embodiment of FIG. 25D, if the content of a cell is too long to fit in the visible area of the cell 2544, part of the content is hidden.

Splitting and Joining—FIG. 26

Figure 26A:
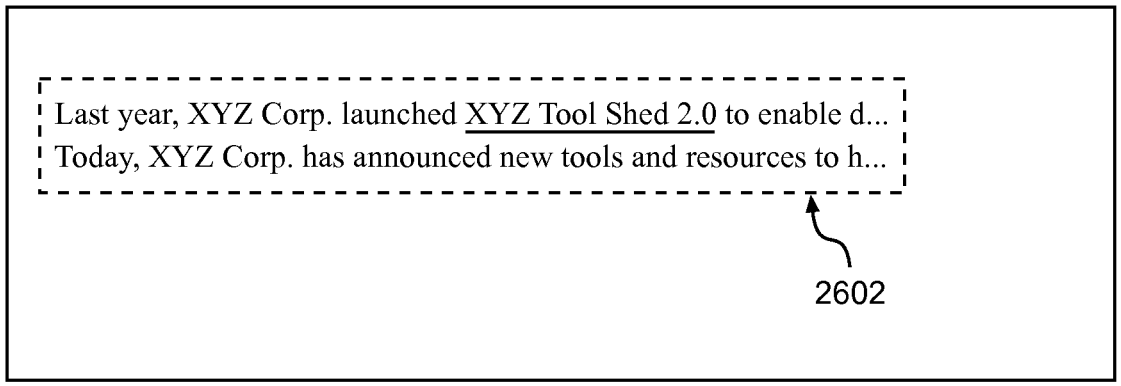

FIG. 26A illustrates an alternative scenario for pasting or dragging a block of text into a structured document in accordance with one embodiment. In this exemplary scenario, the first paragraph of the article depicted in FIG. 1 has been dropped on the first cell on the second row of an empty structured document such as illustrated in FIG. 25A. Unlike the embodiment of FIG. 25A however, in the embodiment of FIG. 26A the dropped content has been automatically split into its constituent sentences and each sentence has been placed in a separate cell 2602. The cells have been selected to provide visual feedback to the user.

Figure 26B:
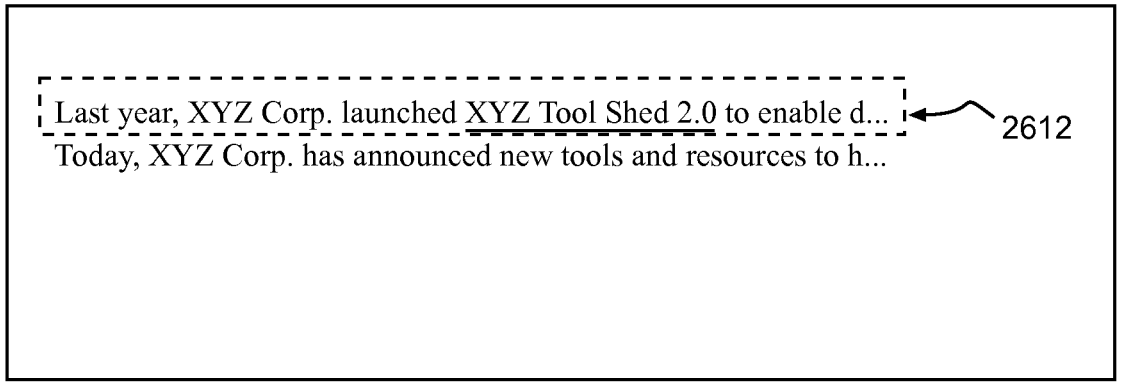

In FIG. 26B the user has selected one cell for further processing. The user may issue a command to split the content of the selected cell 2612 along word boundaries. The user may issue the command via the menu, keyboard, or other means.

Figure 26C:
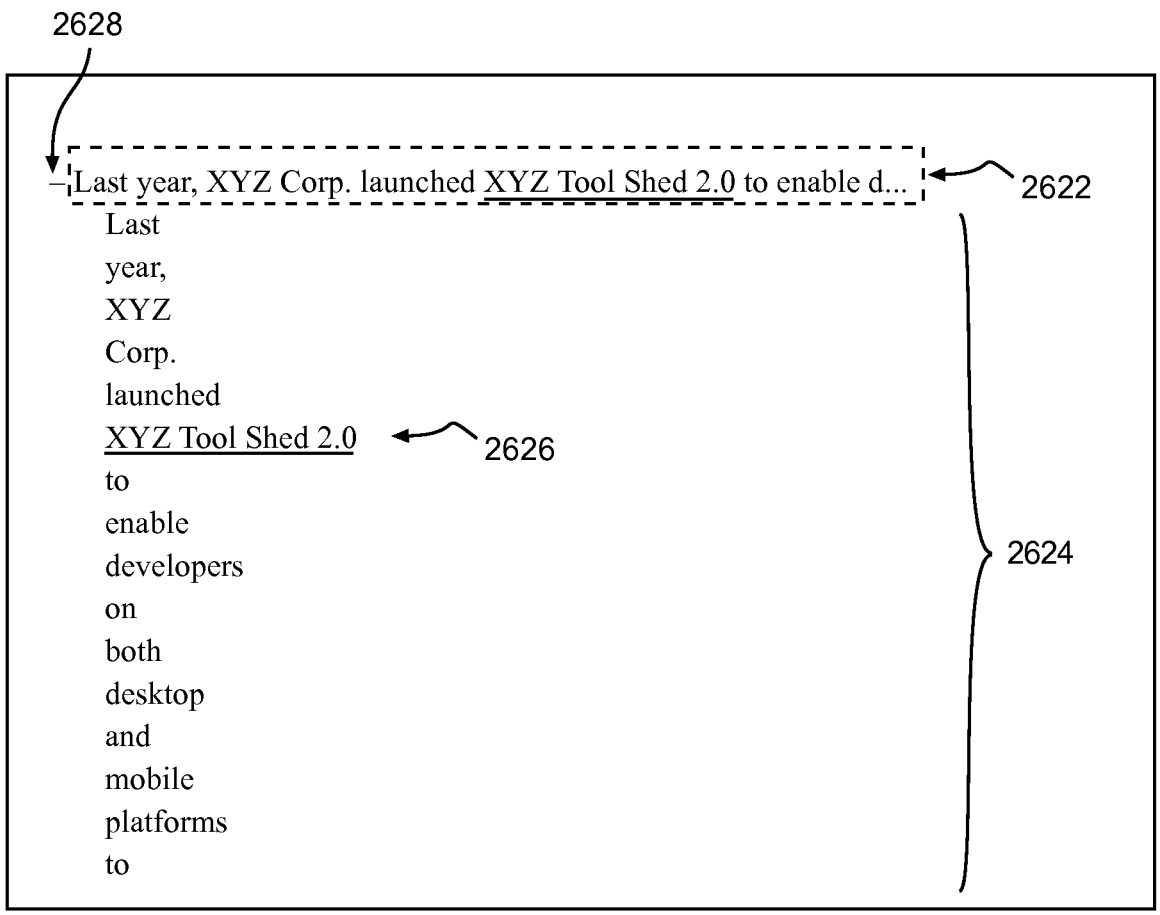

FIG. 26C illustrates the result. The content of the source cell 2622 has not changed. The source cell 2622 is still selected as before 2612. The content of the source cell 2622 has been copied and split along word boundaries, and each word has been placed in a cell on a new row 2624. In the exemplary embodiment of FIG. 26C, hyperlinks are treated as single words and are therefore not split 2626. The new rows 2624 have been inserted as children of the row containing the source cell 2622. The parent row has been expanded 2628 to show the newly inserted child rows 2624. The rows that contain textual content extend beyond the bottom of the display area. As a result, several such rows are not visible in FIG. 26C.

In various embodiments, textual content may be split along word or sentence boundary, or according to other criteria such as character count. Various options may be available for the placement of the split content, such as in child rows, sibling rows, different columns and others.

In FIG. 26D the user has selected several cells 2632. The user may issue a command to combine the content of the selected cells 2632. FIG. 26E illustrates the result. The content in the selected cells 2632 are appended 2644 and separator characters, such as whitespace characters, are added as necessary to keep the words separate. The result is placed in the topmost cell 2644 in the selected region 2642. The remaining cells in the selected region 2642 are cleared 2646.

In various embodiments, the selected cells may span a plurality of rows and columns. The content of selected cells may be combined along columns, rows, or an entire region. For columns, the contents of the selected cells 2632 in each column may be combined separately and placed in the topmost selected cell 2644 in that column. For rows, the contents of the selected cells may be combined separately for each row and placed in the leftmost selected cell in that row. For regions, the contents of selected cells may be combined in row- or column-major order and placed in the top-left cell in the selected region.

Import and Export

Embodiments may provide operations to facilitate the importing and exporting of content. Examples of such operations in connection with importing block textual content were discussed in the above in connection with FIG. 20—cherry picking of imported content into cellular chunks.

FIG. 25—multi-cell editing of imported content.

FIG. 26—splitting of imported content into cellular chunks.

Additional operations are possible. In one embodiment, if a block of text from a source document is copied to, or otherwise imported into, a structured document, the block of text is automatically split into smaller chunks and distributed among cells in the structured document. How the imported content is split and how the various chunks of resulting text are distributed in the structured document is determined by automatic analysis of the grammatical structure of the important text.

In one embodiment, if a bullet list is copied from a source document to a structured document, the bullet list is automatically split into its components or bullet points, and the text from each bullet point is placed in a separate row. The rows are structured to preserve the hierarchical representation of the original bullet list. Conversely, pasting a range of cells from a structured document to a text document (e.g., a word processor document) would represent the transferred content as a bullet list representing the hierarchical structure of the transferred content, with cells from a row as a bullet point of appropriate indentation. The plurality of cells from a row may be delineated from each other on a single bullet point using whitespace characters such as the tab character.

Alternatively, the contents of the exported cells may be combined into paragraphs and the resulting paragraphs pasted into the target application. In one embodiment, the user may select a range of cells in a structured document and paste or drag them to another application (e.g., a word processor or email application). As a result, the content from the selected cells are appended to form one or more paragraphs. Any blank cells in the selected range are interpreted as paragraph breaks.

Tile Editing

Much of the editing of the content in a structured document may be accomplished by manipulating cells like tiles on a game board. One or more aspects, such as the text splitting and joining features described above, transform textual information into cellular units that can be manipulated as objects. In this way, editing a structured document may be experienced as a visual and tactile experience.

Embodiments may provide additional commands for processing the content of selected cells all at once and reduce the need for keyboard operations. The user may instruct the system to strip off whitespace characters from the beginning of the text in cells (e.g., to line up the text neatly in a column), may change the capitalization of the text in cells, may style cells (e.g., font, text color, background color), etc. This may be done by selecting the region of interest and invoking the appropriate command from the context menu.

Additional processing of textual information may be performed as a part of the various row, cell, and text processing operations described above and elsewhere in the present application. In one embodiment, operations that result in the insertion of text into a cell, such as the operations described in connection with FIGS. 14, 15, 16, and 19, may change the capitalization of the to-be-inserted text to match the formatting of the text surrounding the insertion point. Drag and drop editing operations may also trim excess whitespace characters and perform other processing as part of move and copy operations.

In one embodiment, the user may swap the contents of cells residing in different columns on the same row. The user may select a region of the document such that the leftmost and the rightmost selected cells are to be swapped. The user may then issue the swap command (e.g., from menu or keyboard shortcut), or may just drag one of the selected cells in one of the to-be-swapped columns (e.g., one of the rightmost selected cells) and drop it on a cell in the other column (e.g., one or the leftmost selected cells). As a result, the leftmost and the rightmost selected cells are swapped. The cells sandwiched between the leftmost and the rightmost selected cells are unaffected.

Voice Input

In one embodiment, the user may enter the content for a cell through voice input. The user may select a plurality of cells and, while pressing a specially designated key on the keyboard, may speak the content that is to be placed in the selected cells. The spoken content is automatically transcribed into textual form and copied to the selected cells. The selected cells exit edit mode when the user releases the specially designated key on the keyboard.

Cellular Text Editor—FIGS. 27, 28

Although the description above has focused on structured documents that are based on a hierarchical grid structure, these should not be construed as limitations on the scope, but rather as illustrations of several embodiments thereof. Many other variations are possible. For example, a structured document may be structured as a flat, rather than a hierarchical, grid. Alternatively, a structured document may be modeled as a canvas that provides more freedom in the placement of cellular units.

Figure 27A:
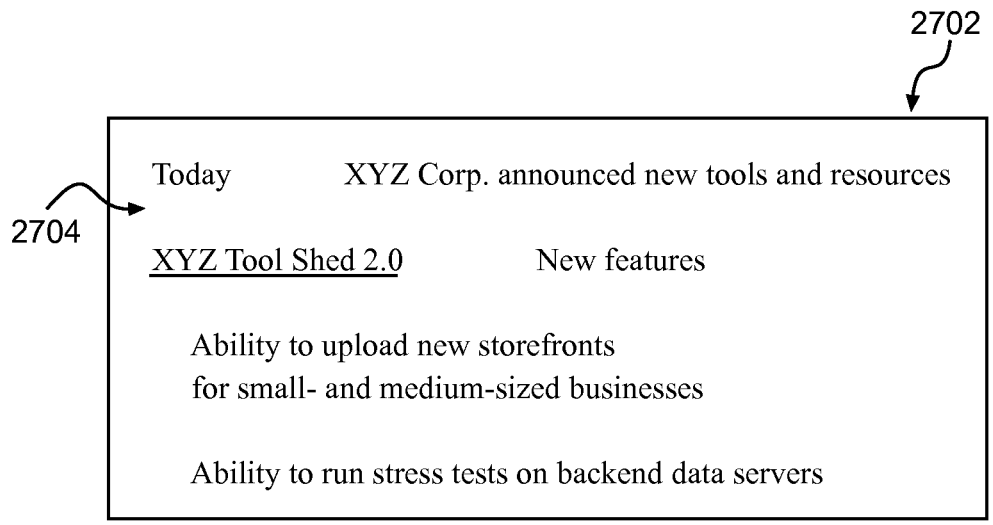
FIG. 27A-FIG. 27N illustrate an exemplary embodiment and editing scenario where the structured document is non-tabular.

FIG. 27A illustrates an exemplary organization of information in cellular units on a canvas in accordance with one embodiment. The canvas contains a single cell 2702 containing some textual content. The cell 2702 is in edit mode, as represented by a solid border. The user may split the cell 2702 into two by issuing the appropriate command. For example, the user may place the cursor in a desired location 2704 and press CTRL+CR on the keyboard.

Figure 27B:
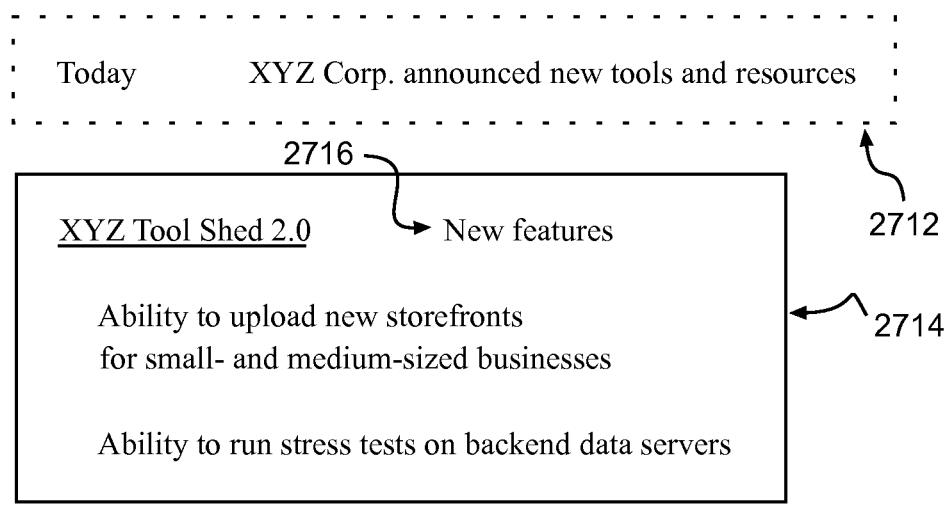

FIG. 27B illustrates the result. The source cell 2702 has been split in two 2712,2714 and the newly inserted cell 2714 has been placed in edit mode. The content of the two cells 2712,2714 have been trimmed of excess whitespace characters 2704 and the newly inserted cell 2714 is placed below the source cell 2712.

Continuing with the illustrative scenario, the user places the cursor somewhere 2716 in the new cell 2714 and issues a command to split the cell 2714, for example by pressing SHIFT+CTRL+CR on the keyboard.

Figure 27C:
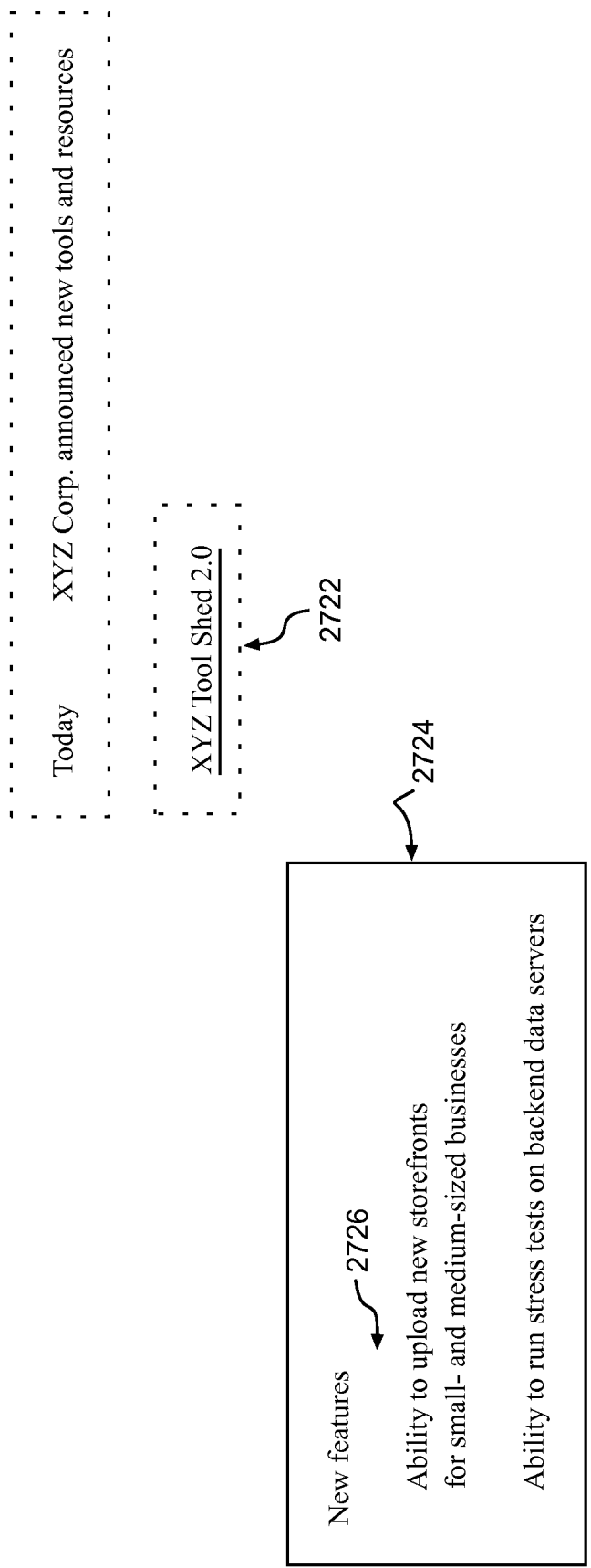

FIG. 27C illustrates the result. The source cell 2714 has been split at the position of the cursor 2716 into two cells 2722,2724. The newly inserted cell 2724 is placed below and to the left of the source cell 2722. Both cells 2722,2724 are trimmed of excess whitespace characters at the location of the split 2716. The newly inserted cell 2724 is placed in edit mode.

Continuing with the illustrative scenario, the user once again places the cursor at a desired location 2726 in the newly inserted cell 2724 and issues a command to split the cell 2724, for example by pressing ALT+CR on the keyboard.

Figure 27D:
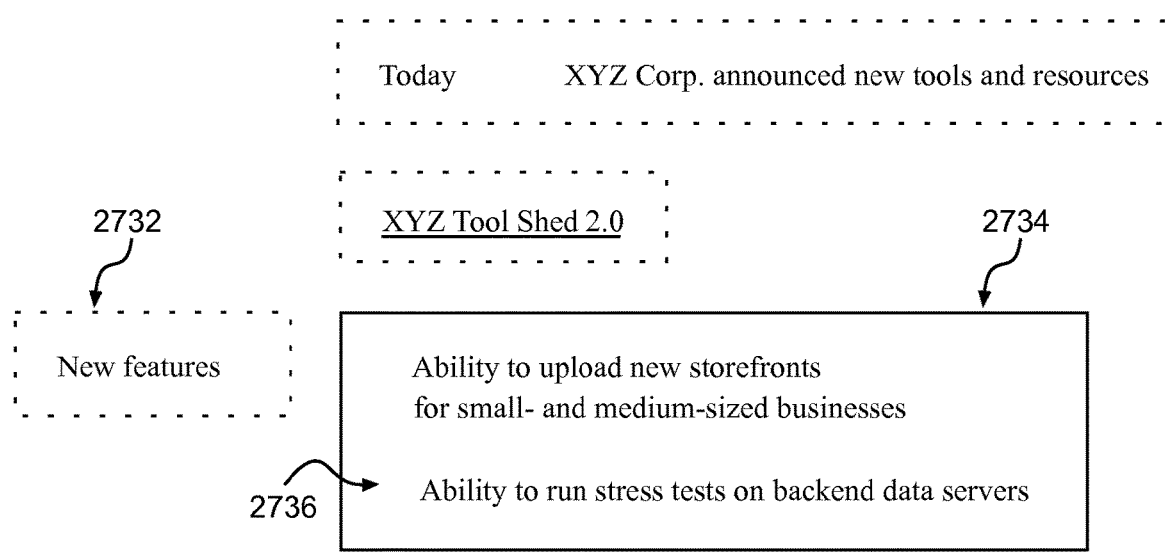

FIG. 27D illustrates the result. The source cell 2724 has been split 2732,2734 at the position of the cursor 2726. The new cell 2734 is inserted in the column to the right of the source cell 2732. The cells 2732,2734 are trimmed of excess whitespace characters at the location of the split 2726 and the source cell has been resized and repositioned 2732 to match the size of its remaining content. The newly inserted cell 2734 has been placed in edit mode.

Figure 27E:
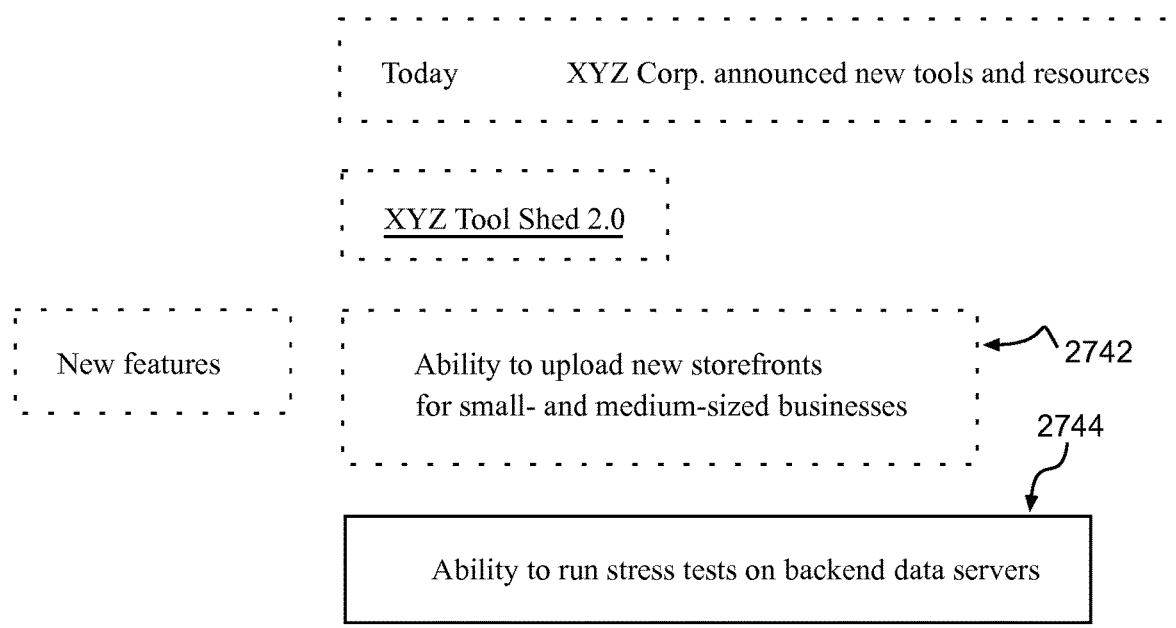

The user continues editing the document by placing the cursor somewhere 2736 in the content of the cell 2734 and issuing a command, such as pressing CTRL+CR on the keyboard. As a result, the cell 2734 is split into two, as illustrated in FIG. 27E. The user now wishes to edit the cell 2742 above the newly inserted cell 2744. In the illustrative embodiment of FIG. 27E, the user may double click on the cell 2742, or navigate to it using the keyboard. For example, while the newly inserted cell 2744 is in edit mode, the user may press a key combination such as CTRL+ARROW_UP to cause the cell 2742 above the newly inserted cell 2744 to enter edit mode.

Figure 27F:
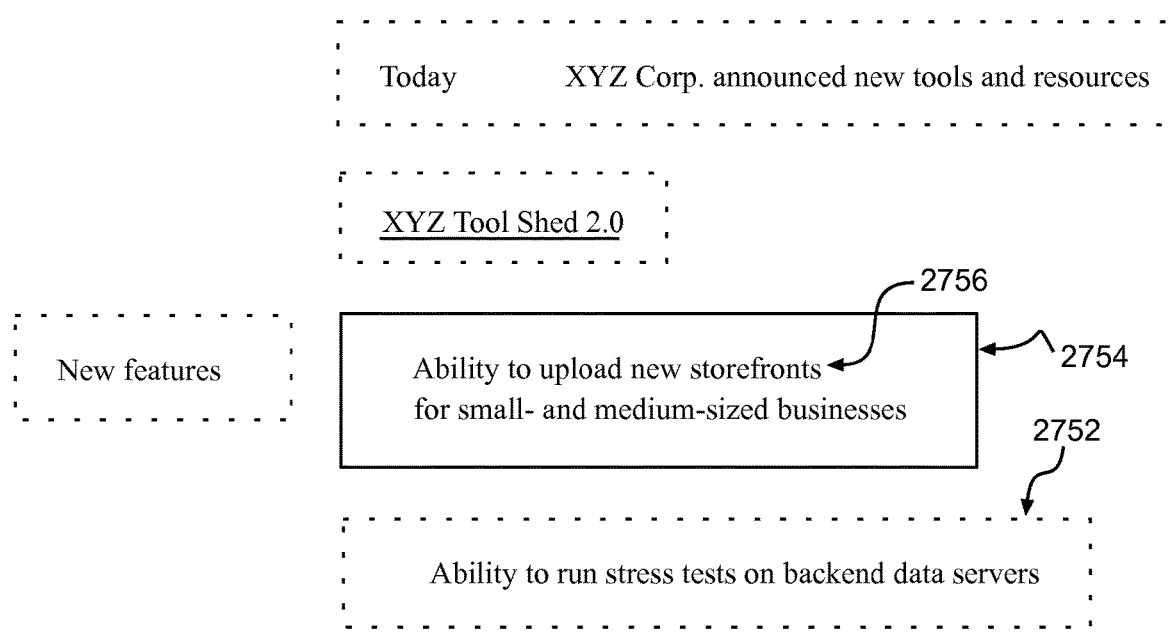

FIG. 27F illustrates the result. The desired cell 2742 has entered edit mode 2754. Continuing with the illustrative scenario, the user places the cursor at a desired location 2756 and presses ALT+CR on the keyboard.

Figure 27G:
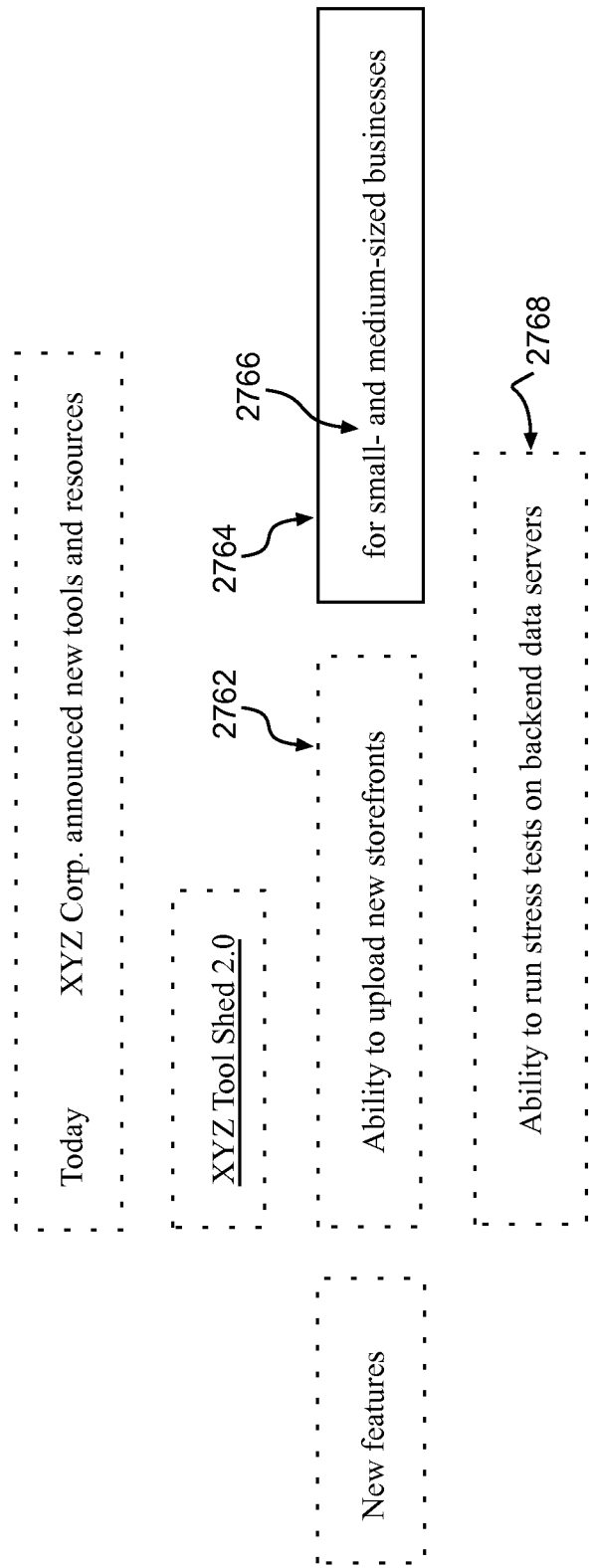

FIG. 27G illustrates the result. A new cell 2764 is inserted to the right of the source cell 2762. The source cell 2762 has been resized to match the size of its remaining content. The user once again places the cursor at a desired location 2766 and issues a command, such as CTRL+CR to split the cell 2764.

Figure 27H:
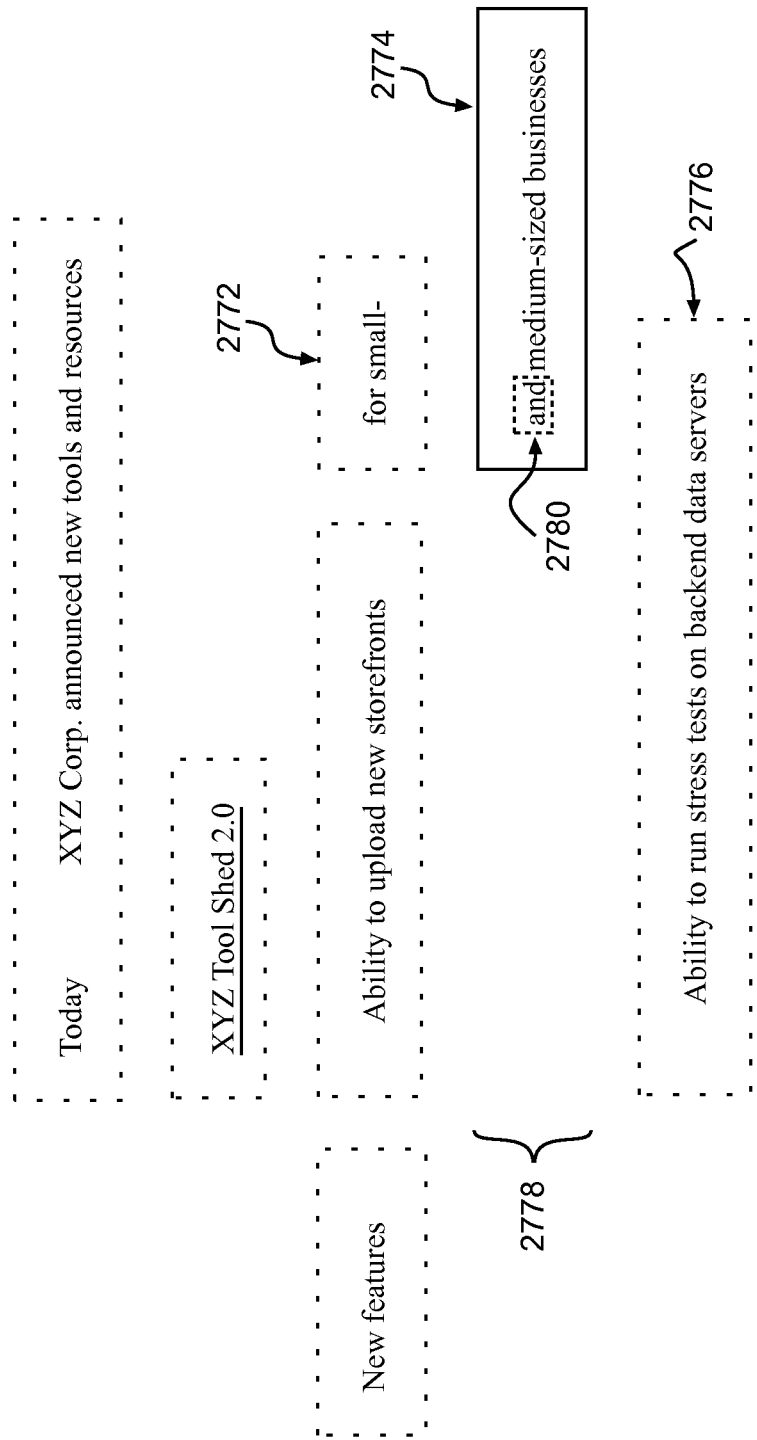

FIG. 27H illustrates the result. A new cell 2774 has been inserted below the source cell 2772. All the cells 2768 below the source cell 2764 (FIG. 27G) have been shifted down 2776 to create a row of space 2778 to accommodate the new cell 2774.

Continuing with the illustrative scenario, the user selects a portion of the content 2780 in the newly inserted cell 2774 and drags it outside the cell and drops it on the canvas, to the left of the source cell 2774.

Figure 27J:
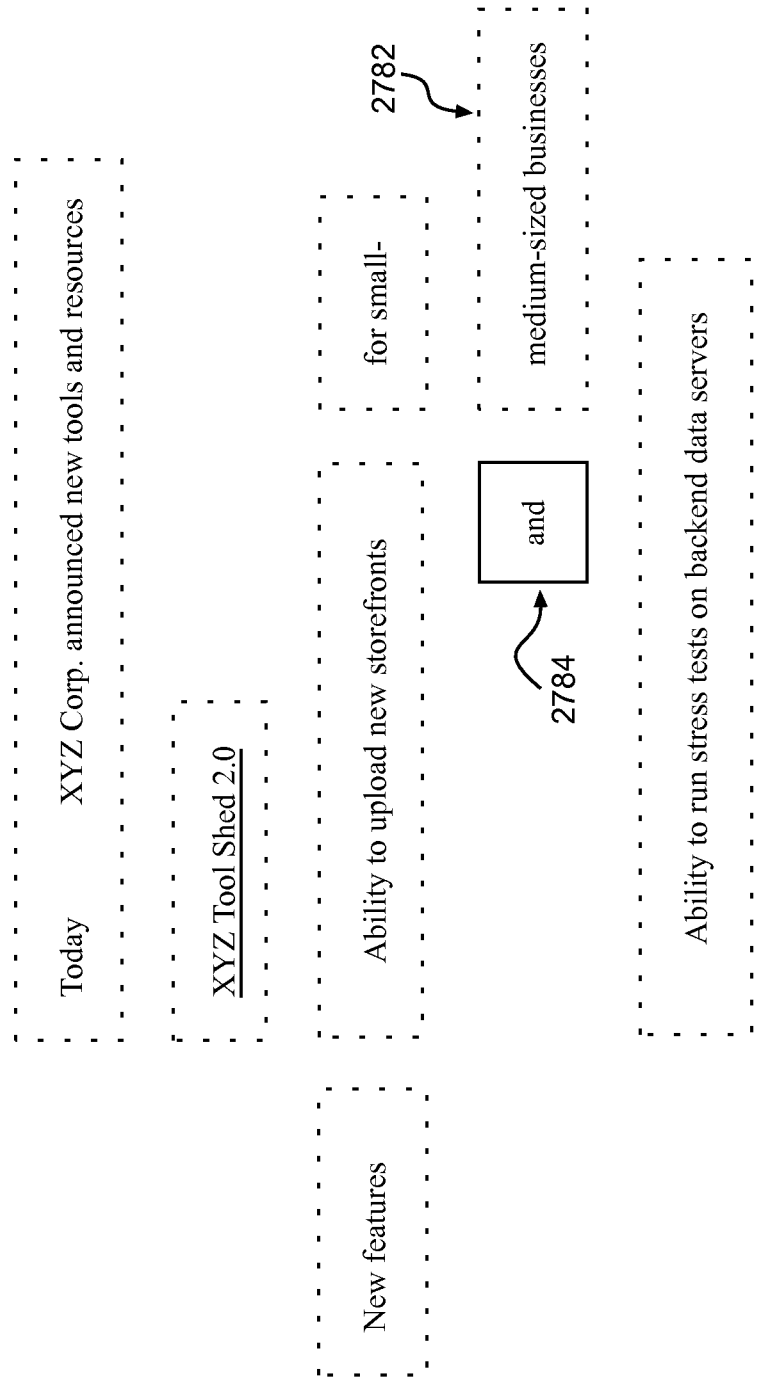

FIG. 27J illustrates the result. The selected text 2780 has been removed from the source cell 2782. A new cell 2784 has been inserted on the canvas to accommodate the removed content 2780. The newly inserted cell 2784 has been placed in edit mode.

In various embodiments cells may be grouped. Operations may be provided for the manipulation of groups as a whole, such as hiding/showing the cells contained in a group, dragging a group as one unit, and restructuring groups into hierarchies. In one embodiment, a row is defined as a group spanning the width of the page, canvas, or document, while a column may be defined as a group spanning the length of the page, canvas, or document.

Figure 27K:
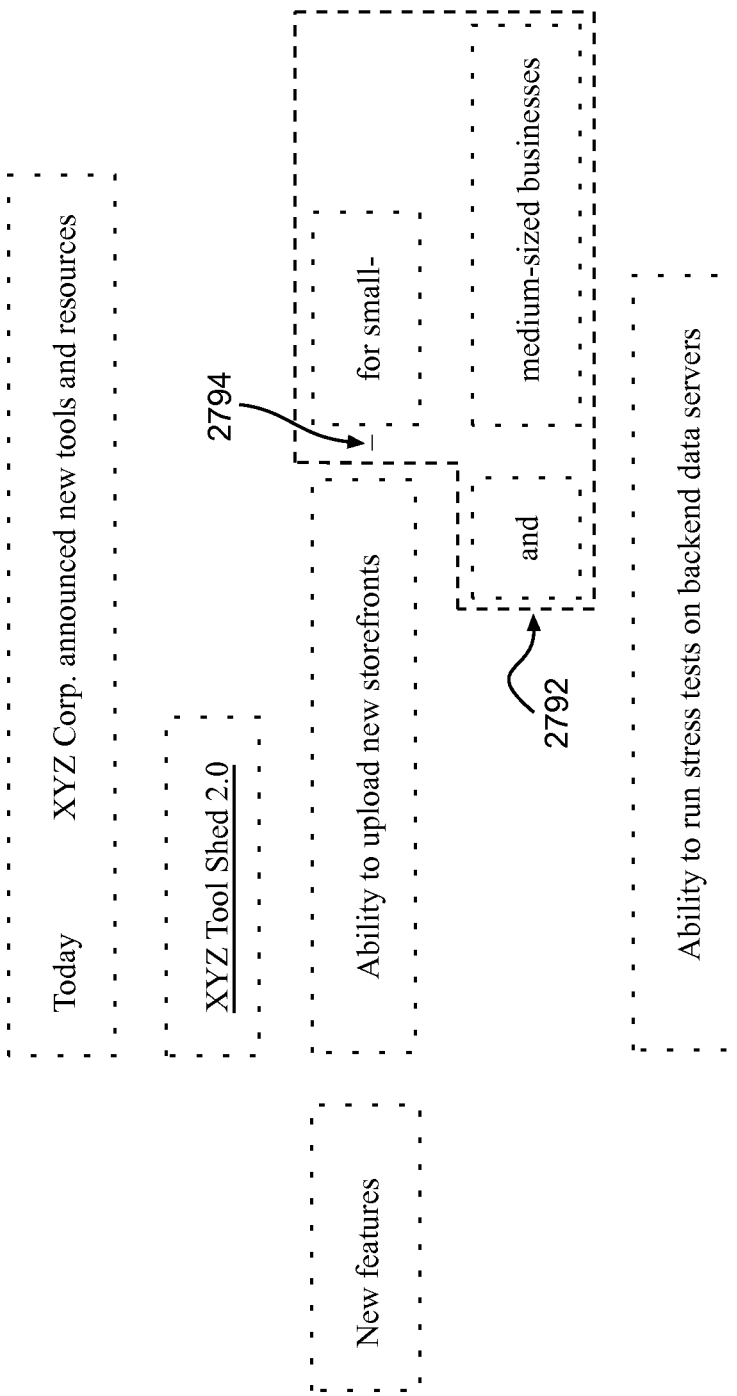

FIG. 27K illustrates an exemplary embodiment where the user has defined a group 2792 comprising three cells. In the illustrative embodiment of FIG. 27K, the user may select the desired cells by clicking on them while simultaneously holding down a specially designated key, such as CTRL, on the keyboard. The user may then select the appropriate item from the menu to instruct the system to group the selected cells.

Figure 27L:
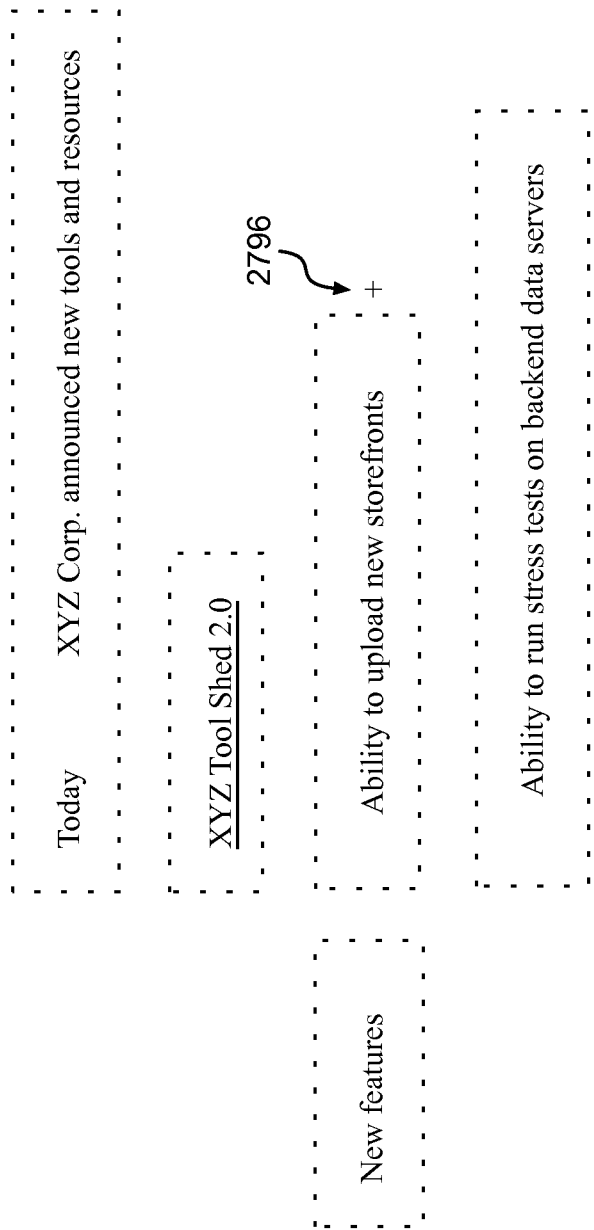

In the illustrative embodiment of FIG. 27K, an icon 2794 provides a means for hiding/showing the cells in a group. FIG. 27L illustrates the result of clicking on the icon 2794 in accordance with one embodiment. Clicking on the icon while the group is in expanded state has resulted in the group collapsing to hide its contents (FIG. 27L). The icon has changed 2796 to indicate the presence of a group in a collapsed state. In the illustrative embodiment of FIG. 27L, the cells still visible on the graphical user interface have been repositioned automatically for a more compact presentation.

In one embodiment, groups may be repositioned on the page or canvas by dragging them to a new location. The user may drag the group while in expanded or collapsed state. A group in collapsed state may be repositioned by dragging its visual handle, such as the hide/show icon 2796 associated with the group.

Figure 27M:
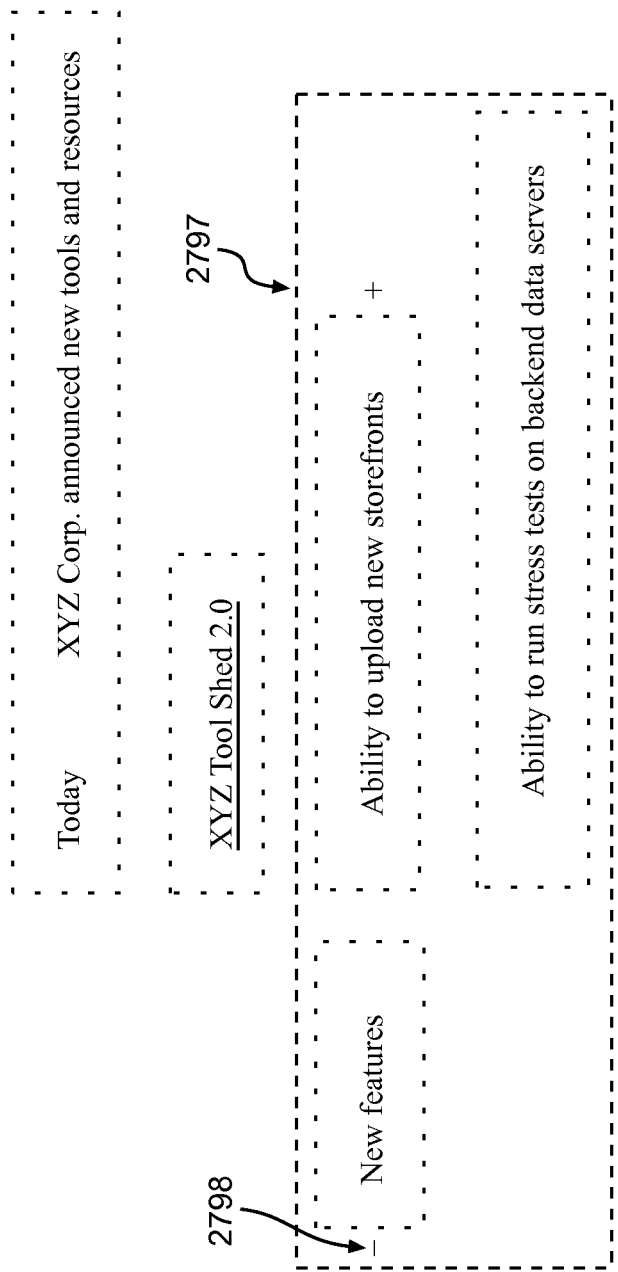

In one embodiment, groups may form hierarchies. FIG. 27M illustrates an exemplary embodiment where the user has defined a group 2797 comprising three cells and another group. In the exemplary embodiment of FIG. 27M, the user has defined the new group via rubber banding, that is, by dragging the mouse on the graphical user interface in such a way as to draw a rectangle around the desired cells/groups. As a result, the cells and groups inside the rectangle are selected. Following the selection, the user has selected the appropriate item from a menu to indicate that the selected items are to be grouped together.

Figure 27N:
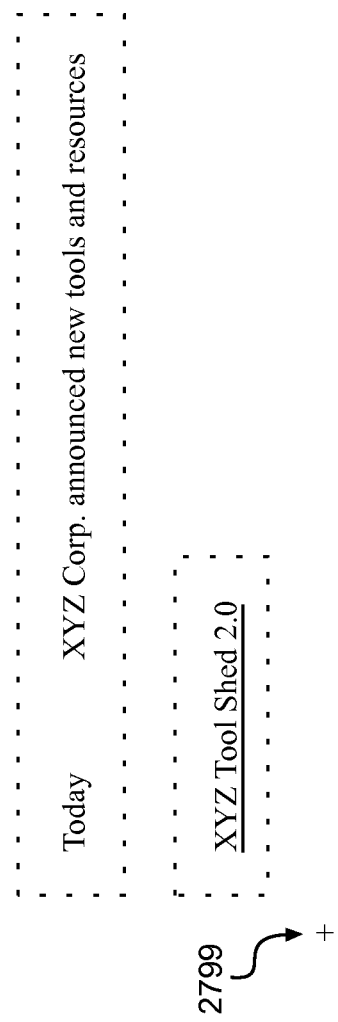

In the exemplary embodiment of FIG. 27M, an icon 2798 indicates that the group is in expanded state. FIG. 27N illustrates the result if the user clicks on the icon 2798. In the exemplary embodiment of FIG. 27N, the group is in a collapsed state, hiding its contents. The icon has changed shape 2799 to provide feedback to the user.

Figure 28A:
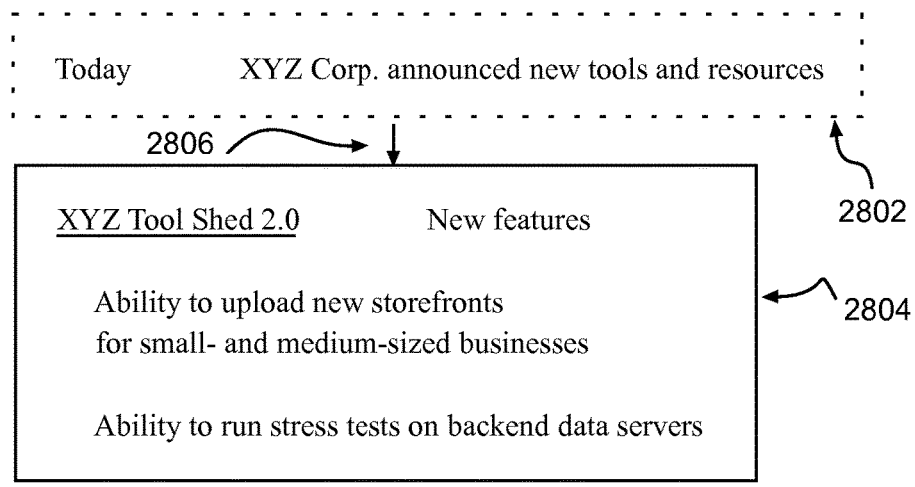
FIG. 28A-FIG. 28C illustrate another exemplary embodiment where the structured document is non-tabular and where editing operations result in arrows connecting cells.

The cellular units on the canvas may display additional information, such as connections that describe certain relationships among cells. FIG. 28A is an alternate representation of the document of FIG. 27B in accordance with one embodiment. An arrow 2806 is displayed going from the source cell 2802 to the newly inserted cell 2804 to provide the user with feedback on the direction of the edit.

Figure 28B:
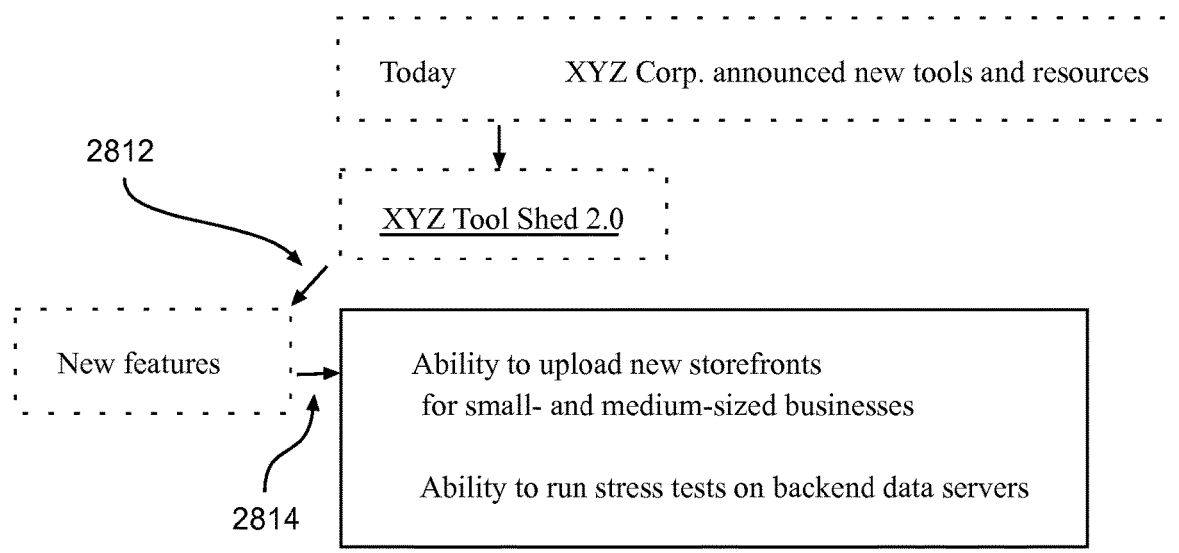

FIG. 28B illustrates the alternate representation of the document in FIG. 27D in accordance with one embodiment. Two more split operations have been performed since the scenario illustrated in FIG. 28A. As a result, two more arrows 2812,2814 are displayed to provide feedback to the user.

Figure 28C:
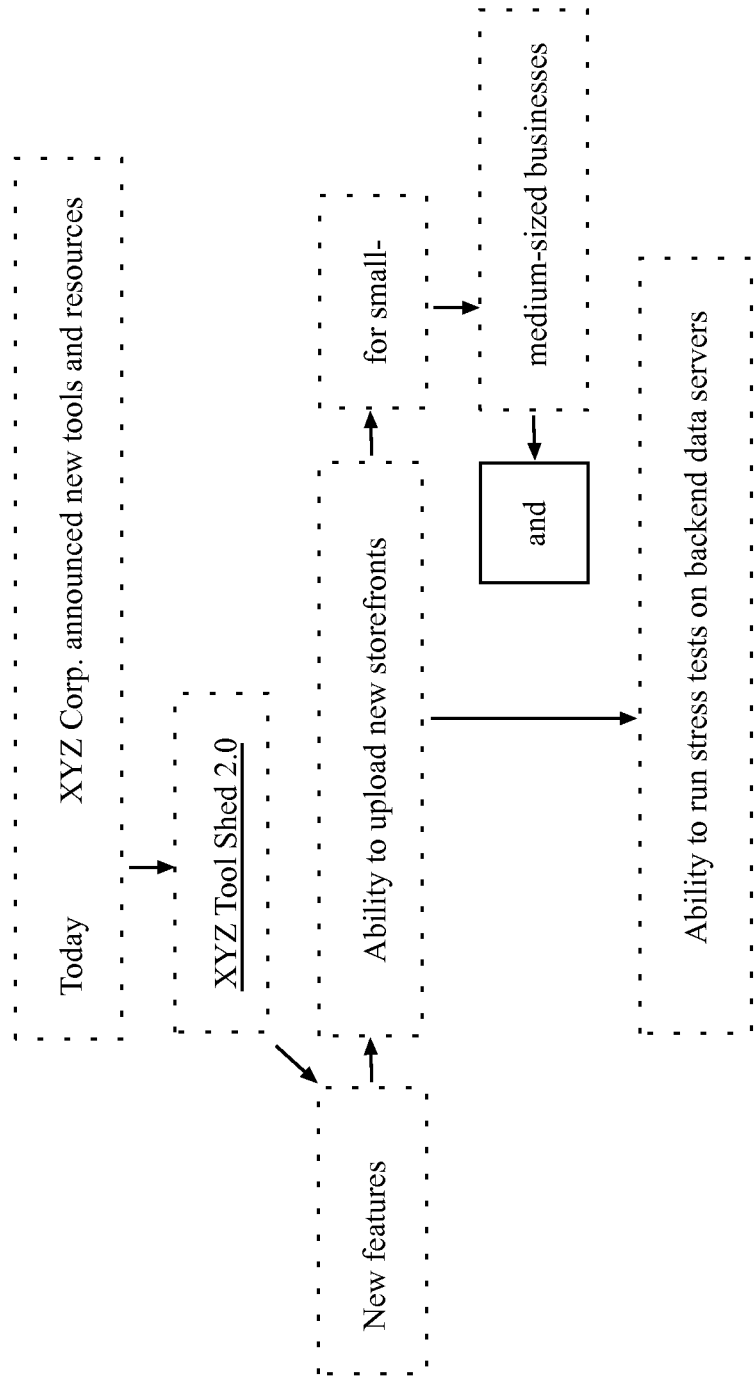

FIG. 28C illustrates the alternate representation of the document in FIG. 27J in accordance with one embodiment. The arrows show the direction of the editing operations.

Cellular Text Editor—Variations

The above description is illustrative only and is not intended to be in any way limiting. Various other embodiments are possible. For example, embodiments may display the cells differently; may size, resize and/or arrange the cells on the graphical user interface differently; may use different commands or key combinations; may insert cells above or below and/or to the left or right of the source cell; may extract the portion of the text that lies to the left of the cursor; may extract a portion of the text that is selected.

In the interest of clarity, the above description was presented in terms of splitting the text in a cell at the position of the cursor. It is to be understood however that analogous operations are possible where the portion of the text to be extracted is determined via selection rather than the position of the cursor. Such scenarios may proceed via drag and drop as described in connection with FIG. 27H and FIG. 27J, or may proceed via commands issued from the keyboard or other input device.

In one embodiment, a portion of the text in a cell may be selected and dragged to, and dropped on, another cell. As a result, the content of the target cell is replaced by the dragged text. In one embodiment, pressing a specially designated key on the keyboard while performing the drop would result in the dragged text being inserted into the content of the target cell (e.g., appended at the end of existing content).

In one embodiment, dragging text and dropping it in the space between two cells results in the insertion of a new cell. The original cells on the canvas may be repositioned to accommodate the new cell.

In one embodiment, dragging a cell and dropping it on a target cell results in the content of the target cell being replaced by the content of the dragged cell. In one embodiment, pressing a designated key on the keyboard while performing the drop would result in the content of the dragged cell being inserted into the target cell.

In one embodiment, dragging a cell and dropping it in the space between two cells results in the repositioning of the two cells to accommodate the new placement of the dragged cell.

In various embodiments groups are adorned with visual handles that may be dragged to reposition and restructure the groups in a manner similar to reordering and restructuring rows in a table or grid. In one embodiment, a group may be dragged to, and dropped on another group to create a parent-child association between the two groups.

Virtual Columns—FIG. 29

In various embodiments, a structured document may include cells or columns that contain synthesized information. For example, a column may display the computed time span between two date columns on the page.

Figure 29A:
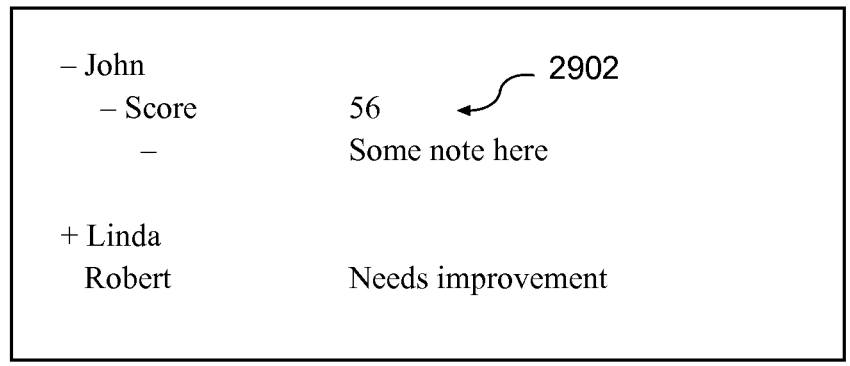
FIG. 29A-FIG. 29C illustrate virtual columns.
Figure 29B:
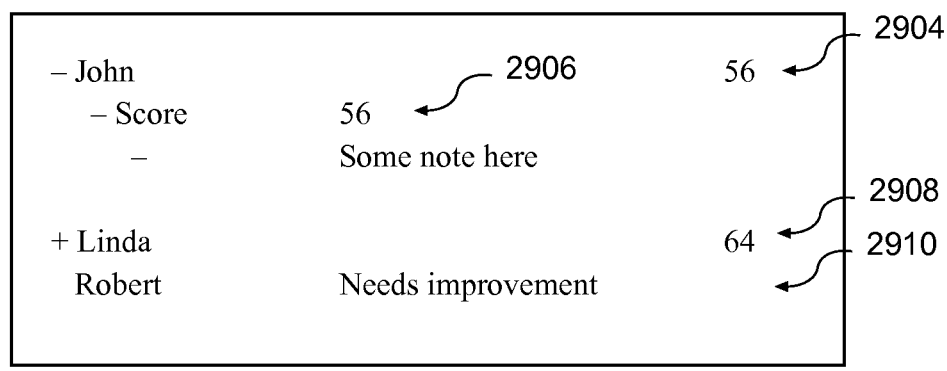

In one embodiment, information from rows that meet a certain criteria may be displayed in a synthesized, or virtual column. FIG. 29A illustrates an exemplary embodiment of a structured document displaying two columns. The first row has been expanded to show a score of "56" for "John" 2902. The other rows are not expanded, so any score information for the other rows is not visible.

To enable the display of scores without having to expand the nodes in turn, the user may add a virtual column to the document and instruct the system to populate it with the appropriate values. In one embodiment, only rows that match certain criteria are consulted for values. For example, in the exemplary embodiment of FIG. 29B, only rows where the content in the leftmost column matches the string "score" in a case-insensitive manner are included. The values for the virtual column are obtained from the second column of the rows that match the required criteria.

As a result, a third column is added to the right of the document and any row that has a child that contains the string "score" in its first text field displays the value of the second text field in the third column. Hence, the third column for "John" 2904 shows his score "56" 2906. The score for "Linda" is likewise placed in the third column 2908 and is visible even though the row for "Linda" has not been expanded. The row for "Robert" does not have any child rows, so the corresponding cell is left blank 2910.

Figure 29C:
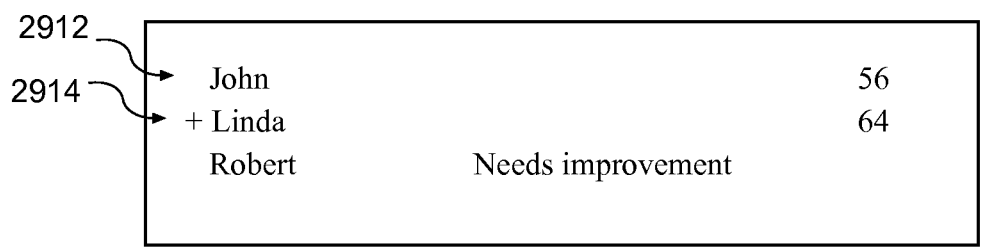

An embodiment may provide the option to hide any rows that match the criteria. FIG. 29C shows an exemplary scenario where the user has instructed the system to hide the rows that match the criteria. The third column still shows the values that were obtained by the matching process described above, but the original rows that matched the criteria are hidden. The row for "John" now displays no children 2912 since hiding the matched row "Score" also hides its children. The row for "Linda" still indicates that there are child rows present 2914, indicating that there are other rows in addition to the one that matched the criteria.

Virtual columns may prove helpful in situations where ad-hoc information is added to the document over time. At first the information may be sparse and the user may not have a clear idea of the best way to organize that information. Over time patterns may emerge and it may be more suitable to view certain information in row or column format.

In one embodiment, the user may instruct the system to convert a virtual column into a regular (i.e., non-virtual) one. In response a new text field is inserted into the underlying data structure for every row in the document and the matched value 2904 is copied into the newly created text field. The original matched row 2906 (FIG. 29B) may be deleted or retained, depending on user preferences.

In one embodiment, the user may instruct the system to convert a non-virtual column into a virtual column. In response, the system creates a new child row for every row that has a value 2912, 2914 (FIG. 29C) in the non-virtual column. The user may specify the string that is to be placed in the first text field for the new rows (e.g., "Score"). The user may choose to retain the non-virtual column or delete it.

The reference to first and second text fields in the above is for discussion purposes only. The embodiment may permit the user to specify any column as the search column and any column as the value column. This is true for both directions: (a) when displaying row values in a virtual column, or (b) when converting the values in a non-virtual column into rows.

Column Display—FIG. 30

In various embodiments, structured documents may be displayed on the graphical user interface showing different numbers and/or types of columns, and/or with columns in different orders. For example, FIG. 2B and FIG. 3 illustrate two representations on the graphical user interface of the same exemplary structured document in accordance with one embodiment. In the representation illustrated in FIG. 2B, the non-textual fields have been hidden.

In one embodiment, the contents of a row are represented in memory as a collection of elements, each element corresponding to a cell in the structured document. An element is identified by the combination of its type and index, for example <A,1>. Within a row, no two elements may have the same combination of type and index. The type of the element indicates the type of the content that can be represented by the element. Within each type group, the elements are indexed, for example <A,1>, <A,2>, <A,3>, etc.

Embodiments may provide various combinations of element types. In one embodiment, only one element type is provided, capable of representing content from a plurality of data types such as text, date, links, etc. In another embodiment, each element is capable of representing content from only one data type, such as text.

In one embodiment, an element type may indicate that the element may represent content from a plurality of data types, such as textual information, a number, or a date. The corresponding cell may at various times contain textual information, a number, or a date. Another element type may indicate that the element may only represent content from a single data type, such as textual information; the corresponding cell may only contain textual information.

Figures 30A, 30B, 30C:
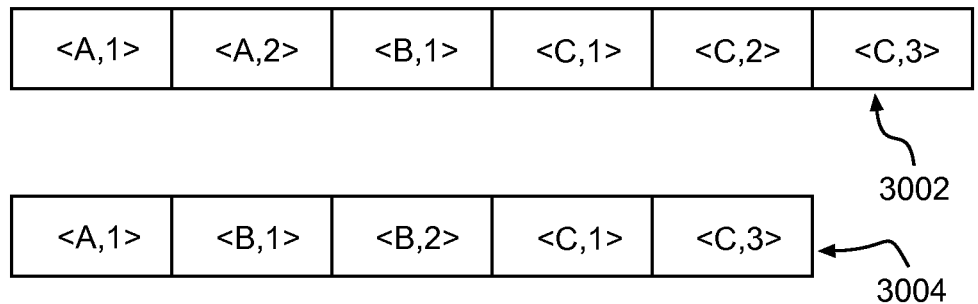
FIG. 30A-FIG. 30C are schematic illustrations of row data in memory and mappings of data to columns displayed on the graphical user interface in accordance with one embodiment.

FIG. 30A is a schematic illustration of the contents of two exemplary rows 3002, 3004 as represented in memory in accordance with one embodiment. In the exemplary embodiment of FIG. 30A, a row R1 3002 comprises two elements of type A, indexed 1 and 2; one element of type B, indexed 1; and three elements of type C indexed 1-3. A row R2 3004 comprises one element of type A, two elements of type B, and two elements of type C.

In one embodiment, rows may be moved or copied from one structured document to another, for example, by dragging a row from a source document and dropping it on a target document.

In one exemplary scenario, rows R1 and R2 are created, initialized, or otherwise configured in two different structured documents respectively. Subsequently, the two rows may end up in the same document via one or more edit operations. For example, R1 may be moved from its original document to the target document containing R2 by dragging R1 from the source document to the target document.

FIG. 30B is a schematic illustration of the columns displayed on the graphical user interface for a structured document in accordance with one embodiment. In the exemplary embodiment of FIG. 30B, five columns are displayed, numbered 1-5. Each column is associated with an element type and index, indicating which element in the representation of a row R in memory is to be displayed in the corresponding column on the display for row R. For instance, in the exemplary embodiment of FIG. 30B, the content to be displayed in column 2 for a row is to be obtained from the representation of the row in memory for the element of type B at index 1.

In the illustrative embodiment of FIGS. 30A and 30B, all the elements for row R2 3004 are displayed as expected. However, the elements <A,2> and <C,2> for row R1 3002 are not displayed. Furthermore, since R1 does not comprise an element <B,2>, column 3 for row R1 is left blank on the display. If the user subsequently edits column 3 for row R1, then an element <B,2> containing the new content is added to the representation of R1 in memory.

FIG. 30C is a schematic illustration of the columns displayed on the graphical user interface for a structured document in accordance with one embodiment. In the illustrative embodiment of FIG. 30C, none of the columns is associated with elements identified as <C,1> and <C,3>. As a result, elements <C,1> and <C,3> for any row, including R1 3002 and R2 3004, are not displayed on the graphical user interface.

In the exemplary embodiment of FIGS. 30A and 30C, column 6 is associated with elements identified as <A,4>, while neither of rows R1 3002 and R2 3004 contain an element <A,4>. As a result, column 6 for rows R1 and R2 is left blank on the graphical user interface.

In various embodiments, the user may choose the number, types, and order of columns visible on the display. In one embodiment, the user may specify the columns to be displayed by selecting the appropriate menu items. In one embodiment, any row containing one or more elements that are not displayed on the graphical user interface, such as rows R1 and R2 in the exemplary embodiment of FIGS. 30A and 30C, may be adorned with visual markers to notify the user of the presence of hidden data.

In various embodiments, only one element type is provided. For example, the cells in a row may correspond to elements identified as <A,1>, <A,2>, ..., <A,N>, where N is an integer. In one embodiment, N may be large, representing a spreadsheet-style grid on the graphical user interface.

In various embodiments, a plurality of element types is provided. For example, the cells in a row may correspond to elements identified as <A,1>, ..., <A,N1>, <B,1>, ..., <B,N2>, <C,1>, ..., <C,N3>, <D,1>, ..., <D, N4>, where N1, N2, N3, and N4 are integers. In one embodiment, one or more of N1, N2, N3, and N4 may be large, representing a multi-type spreadsheet-style grid on the graphical user interface.

The above description is illustrative only and is not intended to be in any way limiting. Various other embodiments are possible. In particular, embodiments may represent various artifacts such as rows and cells in memory in many different ways.

Structured Page

In various embodiments, one or more operations on a structured document may be concerned only with the visible surface of the page, without concern as to any relationships among the cells on a row or the hierarchical structure of the rows. Examples of such operations were discussed in the above in connection with FIG. 8—copying or moving a group of cells without regard as to the hierarchical compatibility of the source and target rows.

FIG. 10 and FIG. 11—inserting a cell into a column, causing the content of one or more cells in that column to be shifted down. The content of other columns is not shifted.

FIG. 21 and FIG. 22—splitting the content of a cell, resulting in the insertion of a new row immediately below the source row. Depending on the situation, the new row may be a child or a sibling of the source row.

FIG. 23 and FIG. 24—multi-cell editing of cells may result in the expansion of the content in one column. New rows are inserted as needed to accommodate the extra content.

In various embodiments, rows and cells do not have any significance beyond providing an area onto which information may be "written". As information is added, deleted, moved or otherwise manipulated on the page, rows and cells may come into, and go out of, existence frequently as part of the editing process.

In various embodiments, objects such as links, tags, textual descriptions, etc. may be attached to, or otherwise associated with, rows and cells. Icons or other visual adornments may be used to represent such objects on the graphical user interface.

In one embodiment, the user may drag the visual representation of an object associated with a row or a cell to another location. As a result, the association between the object and the original row or cell is removed and a new association between the object and the target row or cell is created. An icon or other visual adornment is placed on the target row or cell to represent the new association.

FIG. 3 illustrates an alternative embodiment where, instead of allowing objects to be attached to cells or rows, objects may be placed directly in cells 310 as non-textual content. An object may be moved to another cell by dragging the object's visual representation on the graphical user interface, in a manner similar to the textual content on the page.

Knowledge Management

The spatial organization of information in a structured document may result in a more transparent representation of ideas, a representation that relies more on the visual organization of information and less on parsing long blocks of text. It may make it easier to model abstract knowledge in a way that is informal, flexible, and easy to use.

The combination of flexible representation of ideas, plus operations to readily transform those representations to create new ones may enable the use of the structured document as a thinking and problem solving aid. This may be relevant in the context of note-taking applications, where new information has to be integrated with the old and the notes have to be remodeled over time as the user's knowledge evolves.

Some of the factors that may be considered in connection with a thinking aid or note-taking application are listed below. They are discussed in more detail in the sections that follow.

Ad-hoc notes may arrive at unpredictable times during the course of a day. They may have to be recorded quickly, leaving integration with other notes to a later time.

It may be helpful to be able to easily locate unprocessed notes at a later time in the same day, or even several days later.

Integration of the notes may require moving content from one document to another. It may be helpful to visualize documents side by side and edit them together.

Integration of notes may result in empty documents that must be deleted. It may be helpful to be able to delete a document from within its view, rather than having to search for the document in the database or the file system again.

Structured documents may live short, dynamic lives. It may reduce the incidence of link breakage if links point to anchor objects within structured documents, rather than to the documents themselves. The document management system may provide features to locate a document given the id of an anchor placed in the document. Features may be provided to enable the user to move anchor objects from one document to another.

A database backend may help in searching for documents, resolving anchor ids, etc.

Document Manager

In one embodiment, structured documents are stored in a database. A structured document is assigned a globally unique id at creation time. The id is generated by the local document manager 510 or an online document service 540 discussed in relation to FIG. 5.

One or more annotations may be associated with a structured document. An annotation may be a descriptive text, a time stamp of when the document was created or when it was last modified, or a tag or category identifier. Annotations may be user-defined, system-defined, or a combination thereof. For example, user-defined tags may be used to classify documents into user-defined categories, while system-defined tags may be used to flag structured documents that satisfy certain criteria. Annotations may be used in queries to the document manager or the database backend to locate structured documents matching desired criteria.

In one embodiment, a document category may be defined by pairing an icon with a short description. The user may choose an icon from a set of images provided by the system, or may define an icon by specifying a simple shape and a color, for example a red square or a green oval. Icons defined from simple high-contrast shapes and colors may be helpful in the visual identification of documents of interest from among a long list of structured documents returned from the database in response to a query.

Document Manager—Unprocessed Notes

In one embodiment a special annotation is used to mark a structured document as unprocessed or requiring further attention from the user. This annotation is applied to the structured document automatically at creation time. This may be useful in cases where the user needs to take notes or otherwise add content quickly, leaving more careful editing and integration to a later time. The user may also manually mark documents as requiring further attention, or remove such markings from a document at any time.

Embodiments may employ various techniques to mark a document as requiring further attention, including attaching an unprocessed tag, adding the document id to a list of unprocessed documents, storing the document in a special location in the database or a special folder in the file system, and others. In still other embodiments, absence of any annotation of a particular type, such as categories or tags, may be used as indication that the document requires further attention from the user.

In various embodiments, the user may query the database to view a list of documents that are marked as requiring further attention. In one embodiment a special query view may provide an up-to-date list of unprocessed documents. The user may open any structured document from this list via appropriate keyboard or mouse action.

Document Manager—Mobile Notes

In one embodiment, notes may be recorded via cell phones, tablets, or other hand-held devices in long-form text or voice recording. The notes may be typed from a keyboard, keypad, or touch screen, or transcribed automatically from spoken format. The notes are then marked appropriately and uploaded to a server automatically. This may be useful in situations where the device at hand is not suitable for editing structured documents. The user may process the notes at a later time using a more convenient computing device.

Document Manager—Views

In one embodiment, two or more documents may be opened for viewing and editing side by side on the graphical user interface. Operations may be provided to enable the user to easily move or copy content from one document to another via drag and drop.

In one embodiment, a document that is opened may be deleted as it is being viewed on the display. This may be accomplished by selecting the appropriate command from the menu while the document is being viewed on the display. The ability to delete a document in this way may help bypass the need to find the document again in a database or file system in order to be able to delete it. This may be helpful in systems designed to facilitate the quick creation and disposal of numerous small documents such as notes.

Document Manager—Links and Anchors

In one embodiment, associative links (e.g., hyperlinks) are represented as non-textual objects 310 on the structured page (FIG. 3). A link may point to a special anchor object placed in the target document, rather than point to a specific row or cell, or the target document itself. Anchor objects may be moved from one cell to another, or from one document to another. The document manager 510 (FIG. 5) maintains an up-to-date list L of associations between anchor objects and the target documents containing them. When an anchor object is moved from one document to another, the entry for the anchor in the list L of associations is updated to reflect the new target document containing the anchor.

In one embodiment, an anchor object is assigned a globally unique id at creation time. A link object maintains the id of the anchor object to which it points. When the user issues a command to open the document that is the target of a link (i.e., the document containing the anchor pointed to by the link), the data processing system 400 obtains the id of the anchor from the link object in the source document and queries the document manager 510. The document manager 510 consults the list L of associations between anchor objects and the documents containing them, locates the target document containing the anchor, and returns the document to the data processing system 400. The data processing system 400 opens the document and highlights the row containing the anchor object.

Document Manager—Links to Resources

In one embodiment, resources such as images and other files may be uploaded to an online document service 540 or managed locally by the document manager 510. A resource may be referenced from within a structured document via a special link object pointing to the resource. Different icons may be used to represent links to different types of resources.

In one embodiment, a link to a resource points directly to the resource rather than to an anchor. The user may move or copy the link objects in a structured document. The user may open or download a resource by selecting the link object pointing to it on the structured page and invoking the appropriate command. In response, the document manager 510 is queried for the resource, which is then located and downloaded to the data processing system 400.

Document Manager—Annotations

In one embodiment, an annotation or a tag object may be placed in a cell in a structured document. Tags may be used to annotate or draw attention to various items on the page. Tags may also be used as formalizations or shorthand for commonly used concepts. Once defined, a tag may be placed in a plurality of cells.

In one embodiment, a tag definition comprises an icon and a textual description, in addition to a unique id. Tags are defined at a global level (or per-user level in multi-user systems), and tag definitions are maintained in a central repository by the document manager.510. A tag object is created from a tag definition. Multiple tag objects may be created from the same tag definition and placed in a plurality of structured documents. A tag object contains the id of its tag definition. When a structured document is opened, the data processing system 400 queries the document manager 510 for the icon and the description associated with each tag id appearing in the document. In response, the document manager 510 consults the list of tag definitions for the attributes (e.g., icon and description) associated with the tag id and returns the result to the data processing system 400.

Conclusion, Ramifications, and Scope

Accordingly the reader will see that structured documents of various embodiments may be used to organize information in a form that is a more transparent representation of ideas and reduces the wall-of-text problem, that relies less on parsing long blocks of text and more on the visual organization of information, that may be easier to edit and more organized than diagrams, that may be used to model abstract knowledge, that is informal, flexible and easy to use. Other advantages of one or more aspects include: to provide a method of organizing information that makes it easier to organize, manipulate, express and explore ideas, that enables the editing and manipulation of ideas like physical game pieces on a game board, that allows for extensive editing while reducing the incidence of broken links, that reduces visual clutter by enabling the user to show or hide various pieces of information on command.

Although the description above contains many specificities, these should not be construed as limitations on the scope, but rather as illustrations of several embodiments thereof. Many other variations are possible. For example, the display area 410 (FIG. 4) may comprise a window in a graphical user interface (GUI) environment, a GUI pane, a physical surface such as a computer screen, a wall or a table, etc.; what is displayed may be in the form of spatial or holographic images, projections on a surface such as a wall or a table, or projections in a virtual-or augmented-reality device and/or headset, or directly on the retina. Touch, gestures, head/body orientation, eye tracking, sound, voice and other means may be used to complement, or instead of, mouse or keyboard operations.

A structured document may be represented in 2- or 3-dimensional, or other formats. A structured document may contain a table rather than a tree, or a plurality of tables and trees, or may be a canvas that provides more freedom in the placement of information and/or that may be folded locally to hide and show information; the structure of the document may be represented in graph format rather than trees, etc. A cell in a grid or on a canvas may show none, one, or a plurality of lines of text and/or other information on the display. In one embodiment, a structured document may be represented as a multi-field bullet list, with the hierarchical structure of rows represented as indented bullet points and the cells on a row separated visually via whitespace characters such as the tab character.

Though various aspects and operations are described with reference to specific user actions and editing outcomes, it is to be understood, however, that the various aspects and operations are not limited to the specific details provided, and numerous other variations may be provided by embodiments. Accordingly, the scope should be determined not by the embodiments illustrated, but by the appended claims and their legal equivalents.

The steps of a method or algorithm or the functions of a module, unit or block described in connection with the embodiments disclosed herein can be embodied directly in hardware, in a software module executed by a processor, or in a combination of the two Furthermore, those of skill in the art will appreciate that the various illustrative logical blocks, modules, units, and method steps described in connection with the above described figures and the embodiments disclosed herein can often be implemented as electronic hardware, computer software, or combinations of both. To clearly illustrate this interchangeability of hardware and software, various illustrative components, blocks, modules, units, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, unit or step is for ease of description. Specific functions or steps can be moved from one module, block or unit to another without departing from the invention.

Various illustrative embodiments have been described. However, one of ordinary skill in the art will see that additional embodiments are also possible and within the scope of those embodiments. For example, while the embodiments described above refer to particular features, the scope of this invention also includes embodiments having different types of features, embodiments having different combinations of features and embodiments that do not include all of the described features. Accordingly, the present invention is not limited to only those embodiments described above.

Figure 31:
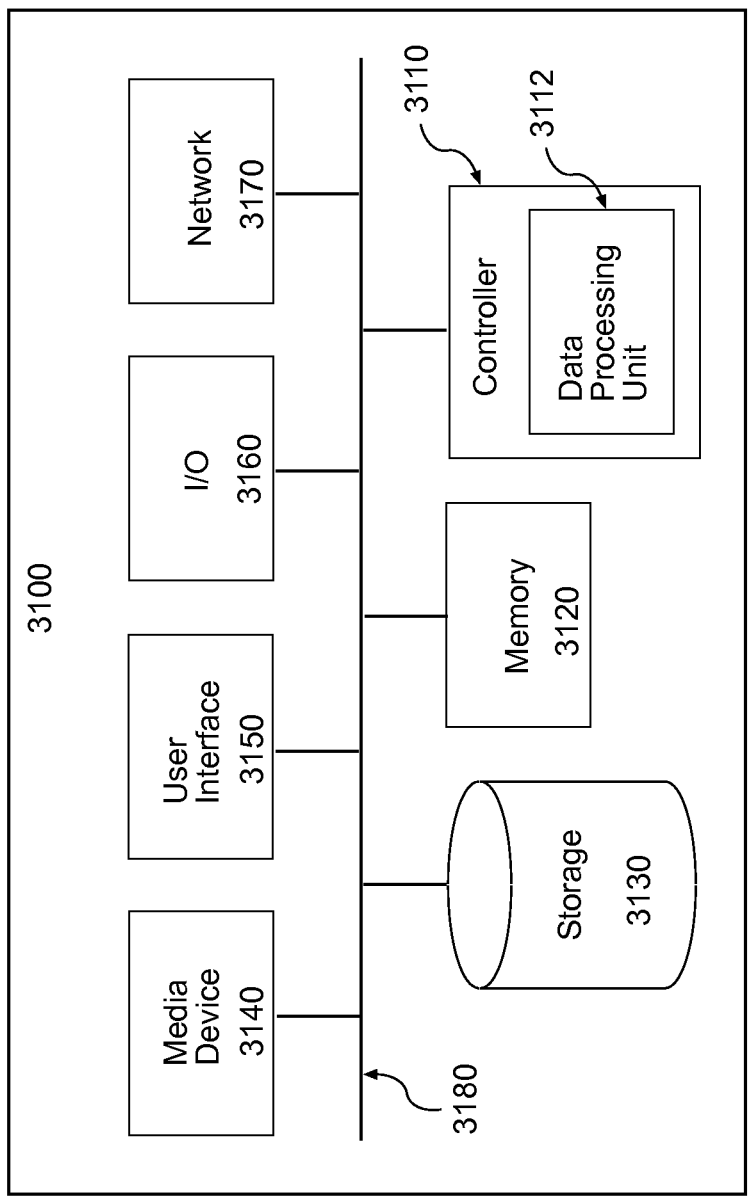
FIG. 31 shows a block diagram of one embodiment of a computer system upon which one or more aspects of the embodiments may be implemented.

Computing System—FIG. 31

Various embodiments are realized in electronic hardware, computer software, or combinations of these technologies. The various components of the embodiments may be located at one or more devices. The various modules and components may be combined, rearranged, or their functionality broken out into other modules and components in numerous different ways as appropriate to a particular embodiment.

FIG. 31 shows a block diagram of one embodiment of a computer system 3100 upon which embodiments of the present invention may be implemented and carried out. The computer system 3100 is configured to be suitable for practicing the embodiments by providing a data processing unit 3112 that allows the user to create, edit, and maintain structured documents in a GUI environment.

The computer system 3100 includes a controller 3110, a memory 3120, storage 3130, a media device 3140, a user interface 3150, an input/output (I/O) interface 3160, and a network interface 3170. These components are interconnected by a common bus 3180. Alternatively, different connection configurations can be used, such as a star pattern with the controller at the center.

The controller 3110 is a programmable processor and controls the operation of the computer system 3100 and its components. The controller 3110 loads instructions from a computer-readable storage medium such as the memory 3120 or an embedded controller memory (not shown) and executes these instructions to control the system. In its execution, the controller 3110 provides an integrated document editor as a software system. Alternatively, this service can be implemented as separate components in the controller 3110 or the computer system 3100.

Memory 3120 stores data temporarily for use by the other components of the computer system 3100, such as for storing document structure information. In one embodiment, memory 3120 is implemented as RAM. In one embodiment, memory 3120 also includes long-term or permanent memory, such as flash memory and/or ROM.

Storage 3130 stores data temporarily or long term for use by the other components of the computer system 3100. In one embodiment, storage 3130 is a hard disk drive. Storage 3130 stores information for use by the data processing unit 3112, such as document content or document structure information. Storage 3130 also stores data generated by the data processing unit.

The media device 3140 receives removable media and reads and/or writes data to the inserted media. In one embodiment, the media device 3140 is an optical disc drive.

The user interface 3150 includes components for accepting user input from a user of the computer system 3100 and presenting information to the user. In one embodiment, the user interface 3150 includes a keyboard, a mouse, audio speakers, and a display. The controller 3110 uses input from the user to adjust the operation of the computer system 3100.

The I/O interface 3160 includes one or more I/O ports to connect to corresponding I/O devices, such as external storage or supplemental devices (e.g., a printer or a PDA). In one embodiment, the ports of the I/O interface 3160 include ports such as: USB ports, PCMCIA ports, serial ports, and/or parallel ports. In another embodiment, the I/O interface 3160 includes a wireless interface for communication with external devices wirelessly.

The network interface 3170 includes a wired and/or wireless network connection, such as an RJ-45 or "Wi-Fi" interface (802.11) supporting an Ethernet connection.

The computer system 3100 includes additional hardware and software typical of computer systems (e.g., power, cooling, operating system), though these components are not specifically shown in FIG. 31 for simplicity. In other embodiments, different configurations of the computer system can be used (e.g., different bus or storage configurations or a multi-processor configuration).

Exemplary embodiments have been described with reference to specific configurations. The foregoing description of specific embodiments and examples have been presented for the purpose of illustration and description only, and although the invention has been illustrated by certain of the preceding examples, it is not to be construed as being limited thereby.

What is claimed is:

1. A method of structured text processing by a graphical user interface generated by a computer system, the method comprising:

storing a block of textual data of human-readable characters organized in a linear thread;

transforming the linear thread of the block of textual data into separate cellular information units, each of the cellular information units comprising a subsequence of characters of human-readable text from the block of textual data;

storing within a memory a data structure representing a grid including a plurality of rows, a plurality of columns and a plurality of cells, some cells of the plurality of cells containing a cellular information unit of the cellular information units, each cell of the plurality of cells being associated with a position in the grid in one of the plurality of rows and one of the plurality of columns, at least one cell of the plurality of cells having a cellular information unit being associated with a position in relation to at least one other cell of the plurality of cells having a cellular information unit according to a relationship between the cellular information units of the at least one cell and the at least one other cell, wherein the rows are visibly represented on the graphical user interface as a sequence of visual cells displaying the cellular information units, wherein the plurality of cells includes a first source cell having a first source cellular information unit, a second source cell having a second source cellular information unit, a first target cell having a first target cellular information unit, and a second target cell having a second target cellular information unit;

changing the memory to modify the data structure by:

dragging a visual representation of a first subsequence of characters from one location to another on the graphical user interface, the first subsequence of characters being selected from the first source cellular information unit of the first source cell and having fewer characters than the first source cellular information unit, and adding the first subsequence of characters to the first target cellular information unit of the first target cell, wherein the first target cell is different from the first source cell, and wherein the adding is in response to the dragging a visual representation of the first subsequence of characters; and changing the memory to modify the data structure by:

dragging a visual representation of a second subsequence of characters from one location to another on the graphical user interface, the second subsequence of characters being selected from the second source cellular information unit of the second source cell and having fewer characters than the second source cellular information unit of the second source cell, and replacing the second target cellular information unit of the second target cell with the second subsequence of characters, wherein the second target cell is different from the second source cell; and wherein the replacing is in response to the dragging a visual representation of the second subsequence of characters.

2. The method of claim 1, wherein the first target cell and the second target cell are associated with positions in a first column of the plurality of columns.

3. The method of claim 1, wherein the first target cell is associated with a first column of the plurality of columns and the second target cell is associated with a second column of the plurality of columns, wherein the first column is different from the second column.

4. The method of claim 1, wherein the plurality of cells includes a third cell and a fourth cell associated with adjacent positions in the grid; and the method further comprises changing the memory to modify the data structure by dragging a visual representation of a third sequence of characters from one location to another on the graphical user interface, wherein in response to the dragging a visual representation of the third sequence of characters, the third cell and the fourth cell are no longer associated with adjacent positions in the grid, and are separated by a fifth cell comprising the third sequence of characters.

5. A method of structured text processing by a graphical user interface generated by a computer system, the method comprising:

storing a block of textual data of human-readable characters organized in a linear thread;

transforming the linear thread of the block of textual data into separate cellular information units, each of the cellular information units comprising a subsequence of characters of human-readable text from the block of textual data;

storing within a memory a data structure representing a plurality of groups and a plurality of cells, each group having multiple cells of the plurality of cells, some cells of the plurality of cells containing a cellular information unit of the cellular information units, each cell of the plurality of cells being associated with a position in one of the plurality of groups and among the multiple cells in the group, at least one cell of the plurality of cells having a cellular information unit being associated with a position in relation to at least one other cell of the plurality of cells having a cellular information unit according to a relationship between the cellular information units of the at least one cell and the at least one other cell, wherein the groups are visibly represented on the graphical user interface as a collection of visual cells displaying the cellular information units; and wherein the plurality of cells represented within the data structure comprises a first source cell having a source cellular information unit, a first target cell having a first cellular information unit, a first cell, a second cell and a third cell; and hiding the third cell such that its visual representation is not displayed on the graphical user interface, and the first cell and the second cell are visibly represented on the graphical user interface wherein the first cell is displayed at a first position relative to the second cell; and displaying on the graphical user interface a visual element that, when selected, will cause the visual representation of the third cell to be displayed on the graphical user interface, and the first cell to be displayed at a second position relative to the second cell, wherein the second position relative to the second cell is different from the first position relative to the second cell; and changing the memory to modify the data structure by:
dragging a first visual representation of a first subsequence of characters from one location to another on the graphical user interface, the first subsequence of characters being selected from the source cellular information unit of the first source cell, wherein the first subsequence of characters has fewer characters than the source cellular information unit of the first source cell; and replacing the first cellular information unit of the first target cell with the first subsequence of characters, wherein the first target cell is different from the first source cell; and wherein the replacing is in response to the dragging a first visual representation of the first subsequence of characters.

6. The method of claim 5, wherein the plurality of groups is a plurality of rows and the data structure represents a grid including the plurality of rows and the plurality of cells, the grid further including two or more columns, each column having multiple cells of the plurality of cells, and the position in one of the plurality of groups and among the multiple cells in the group being a position in the grid in one of the two or more columns and one of the plurality of rows, wherein the rows are visibly represented on the graphical user interface as a sequence of visual cells; and wherein the method further comprises: changing the memory to modify the data structure by:

dragging a second visual representation of a second source cell from one location to another on the graphical user interface, and performing a second operation selected from the group consisting of: (i) creating a second new cell in the grid; (ii) changing a second cellular information unit of a second target cell having the second cellular information unit; and (iii) changing the position of a second target cell in the grid; and wherein the performing a second operation is in response to the dragging a second visual representation.

7. The method of claim 6, wherein the first source cell is associated with a first column of the two or more columns and the second source cell is associated with a second column of the two or more columns, wherein the first column is different from the second column.

8. The method of claim 5, wherein the method further comprises: changing the memory to modify the data structure by:

dragging a second visual representation of a second subsequence of characters from one location to another on the graphical user interface, the second subsequence of characters being selected from a second source sequence of characters, and adding the second subsequence of characters to a second cellular information unit of a second target cell having the second cellular information unit, wherein the second subsequence of characters is selected from a source other than the second target cell;

wherein the adding is performed in response to the dragging a second visual representation.

9. The method of claim 8, wherein the second subsequence of characters is selected from a cell of the plurality of cells containing a cellular information unit.

10. The method of claim 8, wherein the plurality of groups is a plurality of rows and the data structure represents a grid including the plurality of rows and the plurality of cells, the grid further including two or more columns, each column having multiple cells of the plurality of cells, and the position in one of the plurality of groups and among the multiple cells in the group being a position in the grid in one of the two or more columns and one of the plurality of rows, wherein the rows are visibly represented on the graphical user interface as a sequence of visual cells.

11. The method of claim 8, wherein the data structure represents a canvas including the plurality of groups and the plurality of cells.

12. The method of claim 5, wherein the data structure represents a canvas including the plurality of groups and the plurality of cells.

13. A method of structured text processing by a graphical user interface generated by a computer system, the method comprising:

storing a block of textual data of human-readable characters organized in a linear thread;

transforming the linear thread of the block of textual data into separate cellular information units, each of the cellular information units comprising a subsequence of characters of human-readable text from the block of textual data;

storing within a memory a data structure representing a plurality of cells, some cells of the plurality of cells containing a cellular information unit of the cellular information units, each cell of the plurality of cells being associated with a position, at least one cell of the plurality of cells having a cellular information unit being associated with a position in relation to at least one other cell of the plurality of cells having a cellular information unit according to a relationship between the cellular information units of the at least one cell and the at least one other cell, wherein the plurality of cells are visibly represented on the graphical user interface displaying the cellular information units, wherein the plurality of cells includes a source cell having a source cellular information unit, a first target cell having a first cellular information unit having a first sequence of characters, a second source cell having a second source cellular information unit, and a second target cell having a second cellular information unit; and changing the memory to modify the data structure by:
  selecting a visual representation of the source cell on the graphical user interface in response to receiving a user input signal representing a single click of a mouse or a pointing device, or a single tap of a finger or pointing device, on or in an immediate vicinity of, the visual representation of the source cell, and dragging the visual representation of the source cell selected in said manner from one location to another on the graphical user interface; and
  adding a sequence of characters from the source cellular information unit to the first target cell, wherein after the adding, the first target cell contains a modified sequence of characters having a combination of the sequence of characters from the source cellular information unit and the first sequence of characters originally in the first target cell;
  wherein the adding is in response to the dragging; and
  changing the memory to modify the data structure by:
    dragging a visual representation of a second sequence of characters from one location to another on the graphical user interface, the second sequence of characters being selected from the second source cellular information unit of the second source cell; and
    replacing the second cellular information unit of the second target cell with the second sequence of characters, wherein the second target cell is different from the second source cell, wherein the second sequence of characters has fewer characters than the second source cellular information unit of the second source cell; and
    wherein the replacing is in response to the dragging a visual representation of the second sequence of characters.

14. The method of claim 13, wherein the data structure represents a grid including a plurality of rows, a plurality of columns and the plurality of cells, and the position of each cell of the plurality of cells being a position in the grid in one of the plurality of rows and one of the plurality of columns, wherein the rows are visibly represented on the graphical user interface as a sequence of visual cells, one or more cells displaying the cellular information units.

15. The method of claim 13, wherein the data structure represents a canvas including the plurality of cells, and the position of each cell of the plurality of cells being a position on the canvas.

\* \* \* \* \*